(12) United States Patent
Kalantar et al.

(10) Patent No.: US 6,954,737 B2
(45) Date of Patent: Oct. 11, 2005

(54) METHOD AND APPARATUS FOR WORK MANAGEMENT FOR FACILITY MAINTENANCE

(75) Inventors: Sayed Javad Kalantar, Racine, WI (US); Carey W. Zimmerman, Racine, WI (US); Cameron Adams, Waukegan, WI (US); Thomas E. Blenkhorn, Frankenmuth, MI (US)

(73) Assignee: JohnsonDiversey, Inc., Sturtevant, WI (US)

( * ) Notice: Subject to any disclaimer, the term of this patent is extended or adjusted under 35 U.S.C. 154(b) by 824 days.

(21) Appl. No.: 09/992,406

(22) Filed: Nov. 5, 2001

(65) Prior Publication Data

US 2003/0088534 A1 May 8, 2003

(51) Int. Cl.[7] .............................. G06E 1/00; G06E 3/00; G06G 7/00; G06F 15/18; G06F 17/00
(52) U.S. Cl. .................................. 705/50; 705/7; 705/8
(58) Field of Search ................................ 706/50; 705/7, 705/8; 715/751

(56) References Cited

U.S. PATENT DOCUMENTS

| | | | |
|---|---|---|---|
| 4,852,001 A | | 7/1989 | Tsushima et al. |
| 4,896,269 A | | 1/1990 | Tong |
| 5,111,391 A | * | 5/1992 | Fields et al. ................... 705/9 |
| 5,343,387 A | * | 8/1994 | Honma et al. .................. 705/9 |
| 5,557,515 A | | 9/1996 | Abbruzzese et al. |
| 5,767,848 A | * | 6/1998 | Matsuzaki et al. ........... 715/751 |
| 5,819,263 A | | 10/1998 | Bromley et al. |
| 5,848,395 A | | 12/1998 | Edgar et al. |
| 5,867,823 A | * | 2/1999 | Richardson .................... 705/9 |
| 5,890,133 A | | 3/1999 | Ernst |
| 5,893,906 A | | 4/1999 | Daffin et al. |
| 5,907,829 A | | 5/1999 | Kida |
| 5,923,552 A | | 7/1999 | Brown et al. |

(Continued)

OTHER PUBLICATIONS

Bailey et al., "Preparing the Information Technology Workforce for the New Millenium," *ACM SIGCPR Computer Personnel*, 20 (4), pp. 4–15 (Oct. 1999).

(Continued)

Primary Examiner—Anthony Knight
Assistant Examiner—Michael B. Holmes
(74) Attorney, Agent, or Firm—Vernon W. Francissen; Gardner Carton & Douglas LLP

(57) ABSTRACT

A system and method are shown for work management for facility maintenance. The system includes a central management server configured to receive a first set of information including tasks to be performed at a first facility and to generate a first work schedule for a first user selected to perform the first work schedule at the first facility. The system further includes a first client device at the first facility, where the first client device is configured to receive the first work schedule from the central management server and display the first work schedule to the first user via an electronic management interface. The electronic interface is further configured to receive task completion data from the first user and send the data to the central management server. When the central management server receives the task completion data, the central management server is configured to update a status of the work schedule based upon the task completion data received from the first user.

62 Claims, 33 Drawing Sheets

U.S. PATENT DOCUMENTS

| | | |
|---|---|---|
| 5,963,911 A | 10/1999 | Walker et al. |
| 6,006,195 A | 12/1999 | Marchak et al. |
| 6,006,215 A | 12/1999 | Retallick |
| 6,073,109 A | 6/2000 | Flores et al. |
| 6,134,557 A | 10/2000 | Freeman |
| 6,138,104 A | 10/2000 | Marchak et al. |
| 6,151,583 A | 11/2000 | Ohmura et al. |
| 6,157,915 A | 12/2000 | Bhaskaran et al. |
| 6,263,313 B1 | 7/2001 | Milsted et al. |
| 6,345,256 B1 | 2/2002 | Milsted et al. |
| 6,389,403 B1 | 5/2002 | Dorak, Jr. |
| 6,389,538 B1 | 5/2002 | Gruse et al. |
| 6,398,245 B1 | 6/2002 | Gruse et al. |
| 6,418,421 B1 | 7/2002 | Hurtado et al. |
| 6,578,005 B1 * | 6/2003 | Lesaint et al. ............... 705/8 |
| 2001/0042001 A1 * | 11/2001 | Goto et al. ................. 705/9 |

OTHER PUBLICATIONS

Martin, "Training Help Desk Students: The Never Ending Task," User Services Conference, *Proceeding of the 27th Annual ACM SIGUCCS Conference on User Services: Mile High Expectations*, pp. 153–159 (1999).

Niederman et al., "Valuing the IT Workforce as Intellectual Capital," Special Interest Group on Computer Personnel Research Annual Conference, *Proceeding of the 1999 ACM SIGCPR Conference on Computer Personnel Research*, pp. 174–181 (1999).

* cited by examiner

TASK RECORD                    206
TASK ID = 12
    - TASK ICON
    - INSTRUCTION
        ENGLISH
        SPANISH
        POLISH
    - MAP
    - STATUS = SCHEDULED
        USER ID = SYSTEM
TASK ID = 17
    - TASK ICON
    - INSTRUCTION
        ENGLISH
        SPANISH
        POLISH
    - MAP
    - STATUS = SCHEDULED
        USER ID = SYSTEM
TASK ID = 29
    - TASK ICON
    - INSTRUCTION
        ENGLISH
        SPANISH
        POLISH
    - MAP
    - STATUS = SCHEDULED
        USER ID = SYSTEM
TASK ID = 32
    .
    .
    .
TASK ID = 82
    .
    .
    .
TASK ID = 97
    .
    .
    .

FACILITY RECORD                204
FACILITY ID = 131
DATE
    (20011007)
        WORK SCHEDULE
            TASK ID = 32; USER ID = 34
            TASK ID = 29; USER ID = 34
            TASK ID = 12; USER ID = 34
            TASK ID = 17; USER ID = 28
            TASK ID = 97; USER ID = 28
            TASK ID = 82; USER ID = 28

USER RECORD                    202
USER ID = 28
    WORK SCHEDULE
        TASK ID = 17
        TASK ID = 82
        TASK ID = 92
    ERRORCOUNT = 0
    MESSAGE(file)
    INSTRUCT = N
    LANGUAGE
USER ID = 34
    WORK SCHEDULE
        TASK ID = 12
        TASK ID = 29
        TASK ID = 32
    ERRORCOUNT = 3
    MESSAGE(file)
    INSTRUCT = Y
    LANGUAGE

FIGURE 4

CUSTOMER RECORD — 208
CUSTOMER ID = 355
   REGION ID = 110
      FACILITY ID = 131
      FACILITY ID = 133
      FACILITY ID = 134
   REGION ID = 111
      FACILITY ID = 135
      FACILITY ID = 136
      FACILITY ID = 137
   REGION ID = 112
      FACILITY ID = 138
      FACILITY ID = 139
      FACILITY ID = 140
   ACCESS
      USER ID = 56
      LEVEL = 110
      USER ID = 88
      LEVEL = 355
      USER ID = 34
      LEVEL = 34
      USER ID = 28
      LEVEL = 28
      USER ID = 30
      LEVEL = 131

CUSTOMER ID = 441
   REGION ID = 460
      FACILITY ID = 461
      FACILITY ID = 462
      FACILITY ID = 463
   REGION ID = 470
      FACILITY ID = 472
      FACILITY ID = 474
      FACILITY ID = 476
   ACCESS
     USER ID = 267
     LEVEL = 470
     USER ID = 332
     LEVEL = 441
      .
      .
      .

FIGURE 5

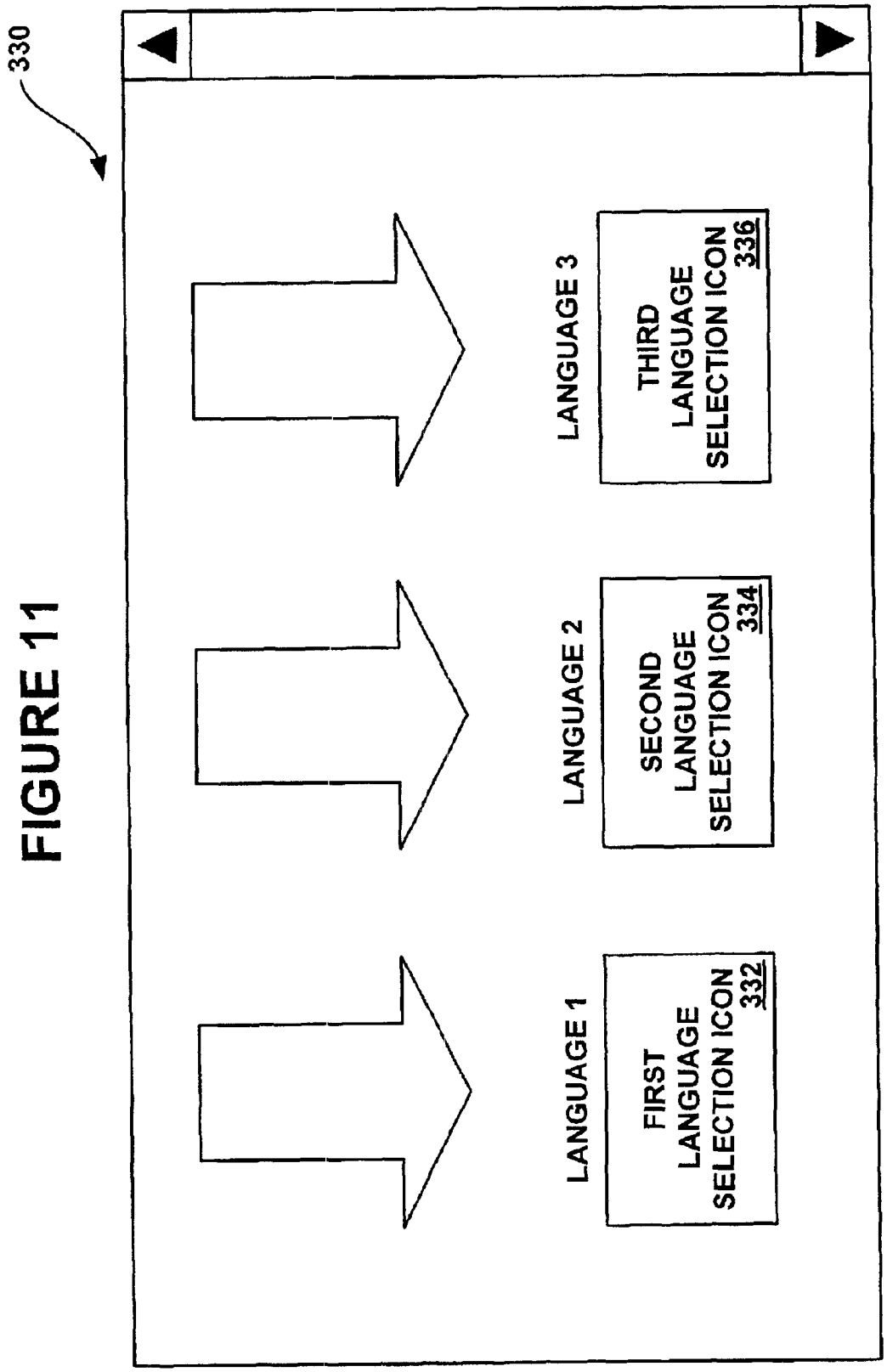

FIGURE 19

| CALENDAR | | | | | | |
|---|---|---|---|---|---|---|
| Month: ▼ Year: 2001 ▼ | | | | | | ⬆ Submit |
| August | 2001 ▼ Week ▲ | | | | | |
| Su\|26 | Mo\|27 | Tu\|28 | We\|29 | Th\|30 | Fr\|31 | |
| ▭ closed Vacuum Capet | 🕐 late Detail Vacuum Carpet | ▦ scheduled Detail Vacuum Carpet | ▦ scheduled Vacuum Carpet | ▦ scheduled Detail Vacuum Carpet | ▦ scheduled Detail Vacuum Carpet | |
| ▭ closed Autoscrub with NexGen | 🕐 late Vacuum Carpet | ▦ scheduled Vacuum Carpet | ▦ scheduled Autoscrub with NexGen | ▦ scheduled Vacuum Carpet | ▦ scheduled Vacuum Carpet | |
| ▭ closed Refill Scrubber | 🕐 late Autoscrub with NexGen | ▦ scheduled Autoscrub with NexGen | ▦ scheduled Refill Scrubber | ▦ scheduled Autoscrub with NexGen | ▦ scheduled Autoscrub with NexGen | |
| ▭ closed Autoscrub with NexGen | 🕐 late Refill Scrubber | ▦ scheduled Refill Scrubber | ▦ scheduled Autoscrub with NexGen | ▦ scheduled Refill Scrubber | ▦ scheduled Refill Scrubber | |

Canton
Store 1b

| Date Started | Status ID | User Updated | User Role |
|---|---|---|---|
| Fri Aug 17 03:16:54 | scheduled | SYSTEM | SYSTEM |
| Mon Sep 10 03:37:06 | late | SYSTEM | SYSTEM |
| Mon Sep 10 05:29:06 | open | Ter'Rance | Supervisor |
| Mon Sep 10 09:38:18 | done | Ter'Rance | Supervisor |
| Mon Sep 10 09:50:53 | done | Ter'Rance | Supervisor |
| Mon Sep 10 19:06:45 | approved by system | SYSTEM | SYSTEM |
| Mon Sep 10 19:06:45 | closed | SYSTEM | SYSTEM |

Canton
Store 1b

| Area | Work Order | Status | |
|---|---|---|---|
| 1 Total Facility | -Remove Carpet Spots<br>-Remove Carpet Spots | ⊙ Not Done ○ Passed ○ Failed<br>⊙ Not Done ○ Passed ○ Failed | [Comments]<br>[Comments] |
| 2 Entrance | -Clean Entrance<br>-Clean Entrance<br>-Wipe Baseboards<br>-Wipe Baseboards | ⊙ Not Done ○ Passed ○ Failed<br>⊙ Not Done ○ Passed ○ Failed<br>⊙ Not Done ○ Passed ○ Failed<br>⊙ Not Done ○ Passed ○ Failed | [Comments]<br>[Comments]<br>[Comments]<br>[Comments] |
| 3 2nd Floor Hard Surf. | -Dust Mop Floor<br>-Dust Mop Floor<br>-Wet Mop Floor<br>-Wet Mop Floor | ⊙ Not Done ○ Passed ○ Failed<br>⊙ Not Done ○ Passed ○ Failed<br>⊙ Not Done ○ Passed ○ Failed<br>⊙ Not Done ○ Passed ○ Failed | [Comments]<br>[Comments]<br>[Comments]<br>[Comments] |

1250

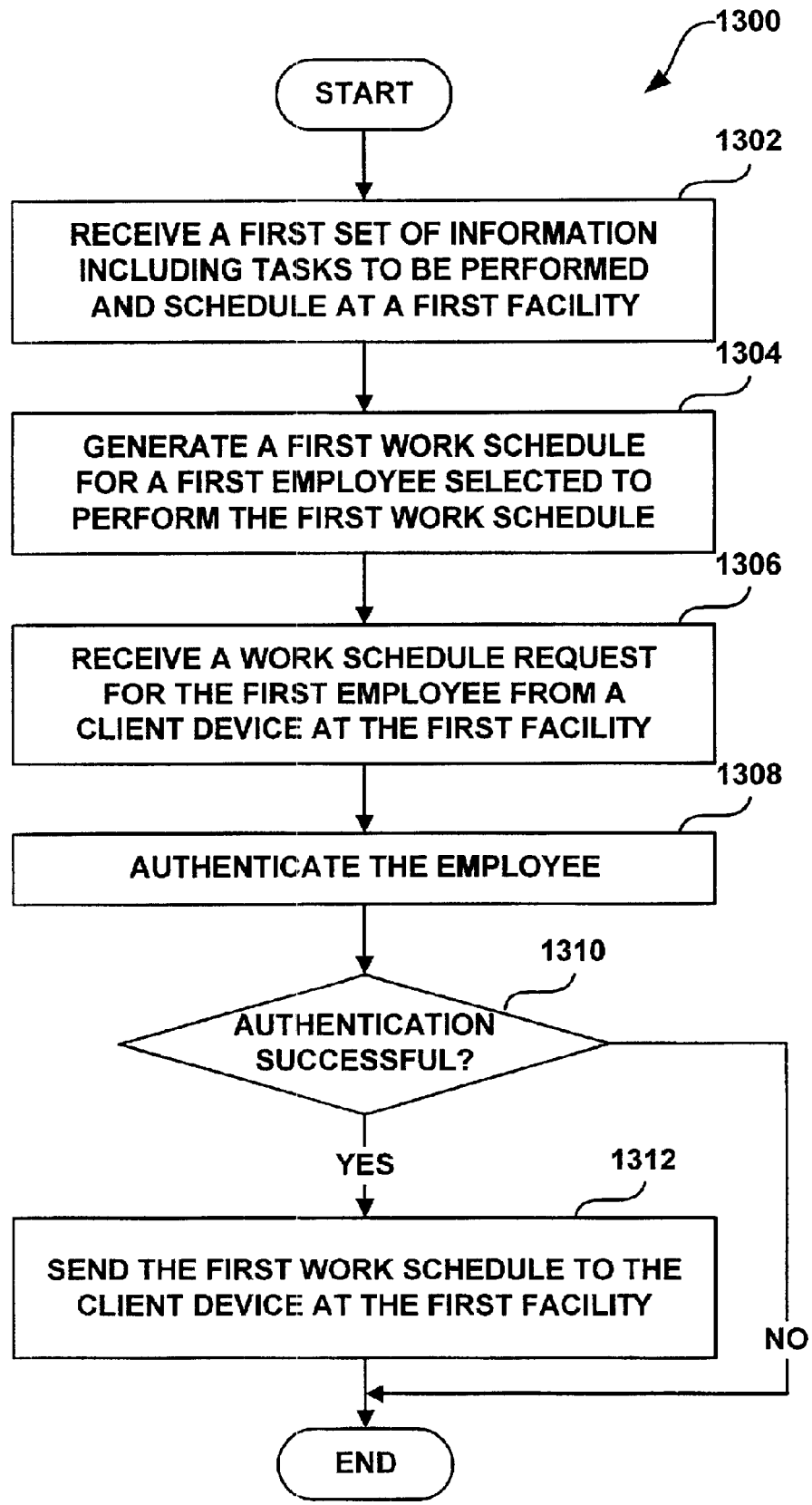

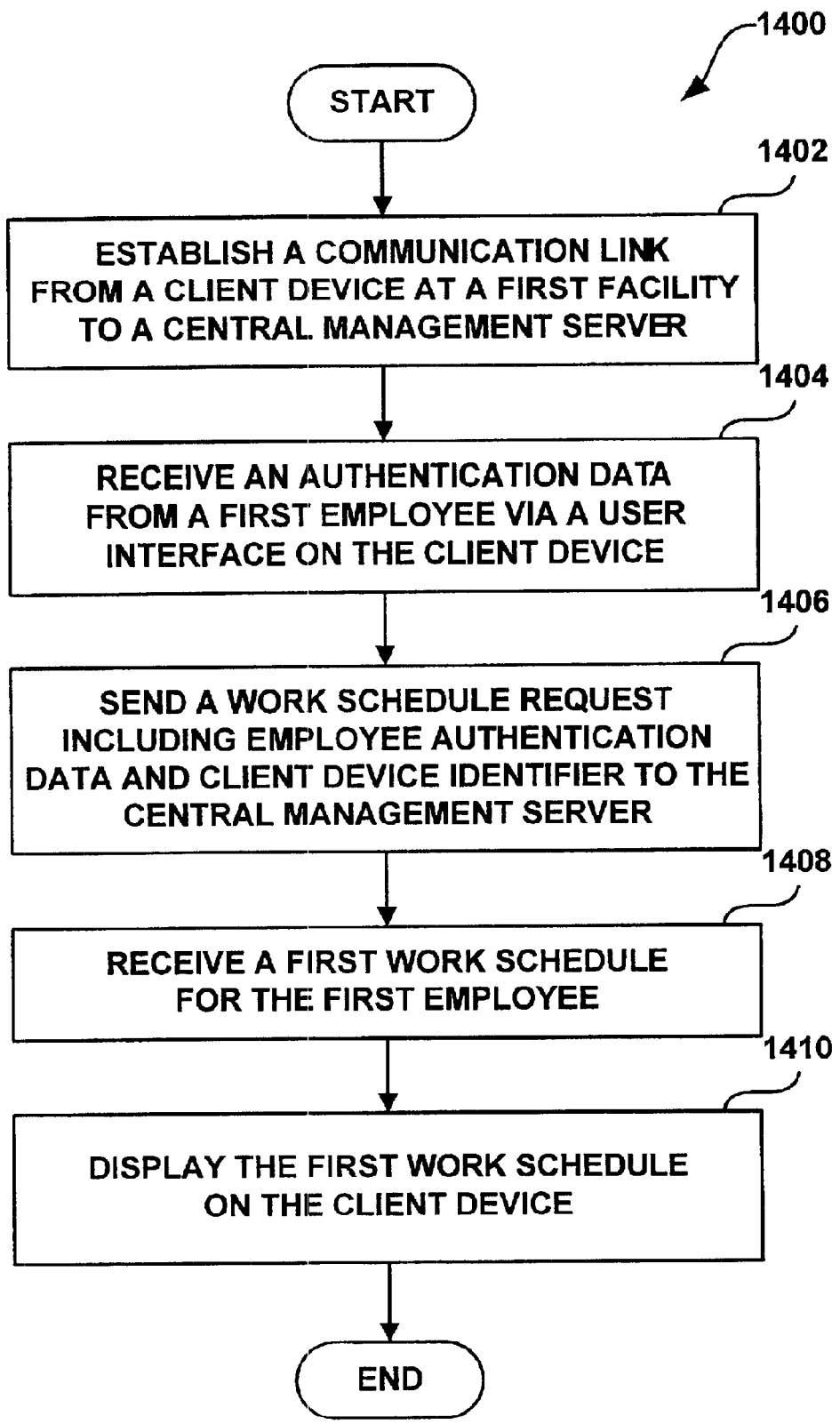

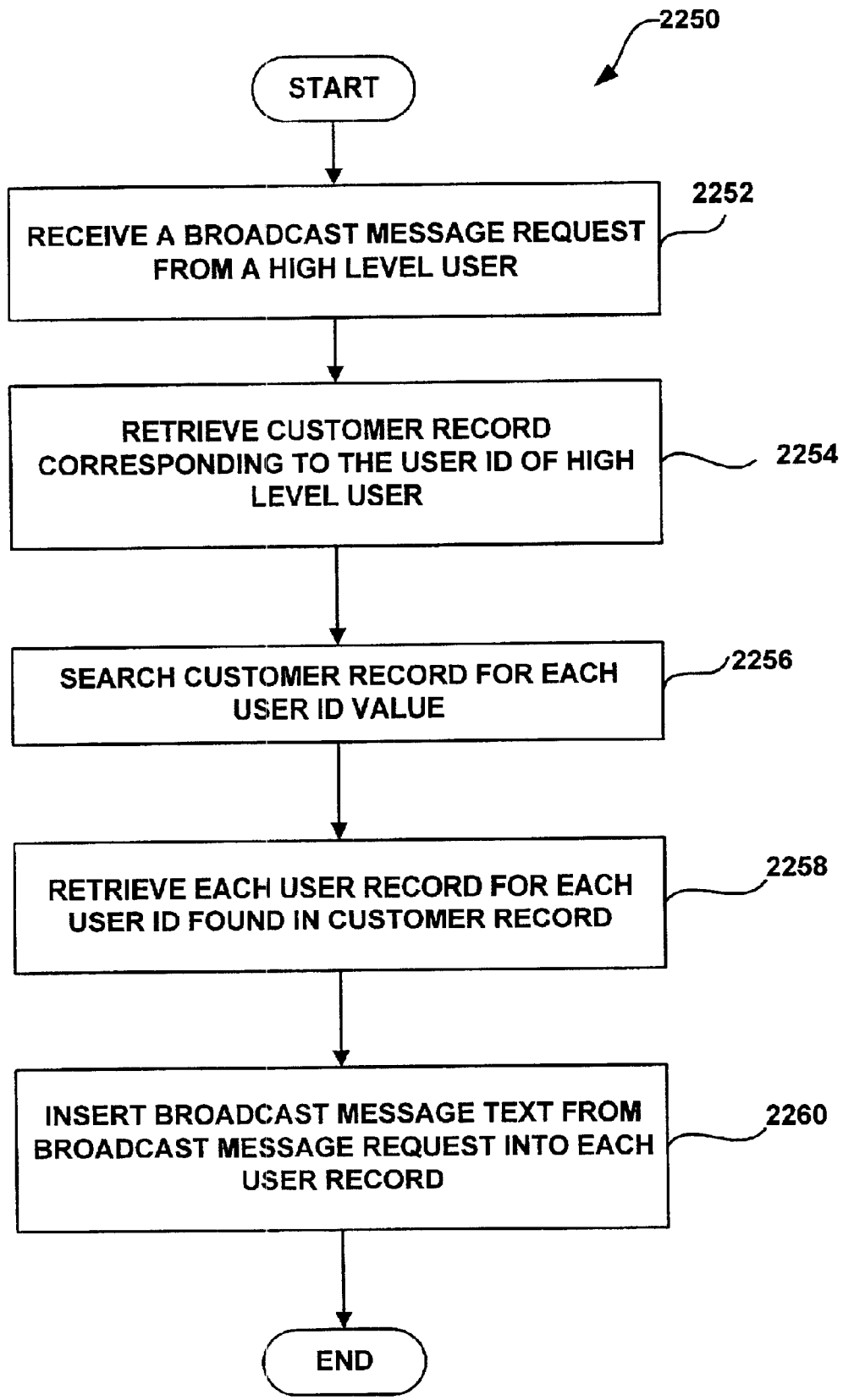

METHOD AND APPARATUS FOR WORK MANAGEMENT FOR FACILITY MAINTENANCE

FIELD OF THE INVENTION

This present invention relates to facility management. More specifically, it relates to a system and method for managing facilities using client devices at each facility that communicate with a central management server through a network.

BACKGROUND OF THE INVENTION

Facility maintenance is no longer considered just an overhead expense, and it plays an important role in a company's success. The more an enterprise can optimize and maintain its assets, the more it can compete in the areas of cost and quality.

One of the important factors in maintaining a successfully operating facility is work scheduling. Prior to the introduction of computerized work scheduling systems, scheduling of work was performed manually. The manual scheduling process involved determining what work has to be performed and the time, materials and resources, such as workers and tools required to perform it, as well as information which influenced the schedule, such as the priority associated with the work orders. The frequency with which the scheduling process had to be performed along many other factors contributed to the development of computerized scheduling systems.

One of such computerized schedule systems is described in U.S. Pat. No. 5,111,391, Fields et al. The Fields' patent relates to a system and method for the creation of staff schedules at remote locations, and takes into account location specific values and historical data, while simultaneously conforming to corporate policy regarding scheduling standards and labor regulations. Another computerized schedule system is described in U.S. Pat. No. 5,343,387, Honma et al. The Honma's patent is directed to a building management system. Specifically, the Honma's patent describes a cyclic building maintenance work schedule preparation system that is useful in preparing a schedule table of cyclic work in advance upon sending workers to periodically visit client buildings under a maintenance contract to conduct inspections at the buildings.

In addition to the work scheduling, a maintenance analysis and worker training are also important factors in maintaining a successfully operating facility. One such system is described in the U.S. Pat. No. 5,867,823, to Richardson. The Richardson's patent describes a hand-held system that provides work guidance and instruction for carrying out a given task and records maintenance duties without the need for written records and that is carried by a worker.

While the existing systems describe electronic work scheduling and providing instructions to a worker, a need still remains for a dynamic work management system enabling a user interaction with the system.

SUMMARY OF THE INVENTION

The system and method of the present invention includes a system and method for work management.

In accordance with one aspect of the present invention, a system for work management includes a central management server configured to receive a first set of information including tasks to be performed and scheduled at a first facility. When the central management server receives the first set of information, the central management server generates a first work schedule for a first user selected to perform the first work schedule at the first facility. According to an exemplary embodiment of the present invention, the central management server is further configured to receive a first task status update message corresponding to the first work schedule and, responsively, update a status of each task of the work schedule based upon task completion data received in the first task status update message. The exemplary system of the present invention further includes a first client device corresponding to the first facility. The first client device includes an electronic management interface configured to display the first work schedule to the first user at the first facility and further receive task completion data from the first user for each task in the first work schedule. The client device is further configured to incorporate the task completion data from the first user into the first task update message and send the first task update message to the central management server. The central management server according to an exemplary embodiment of the present invention further includes a database configured to store the first work schedule, and the database includes a plurality of task identifiers each of which is associated with a corresponding one of a plurality of tasks specified in the first work schedule. According to an exemplary embodiment of the present invention, the central management server is a web-based central management server, and the electronic management interface on the first client device is a web-based electronic management interface.

In accordance with a preferred embodiment, a method for managing work at a facility includes receiving on a central management server from a first facility a first message including a first set of information including tasks to be performed and scheduled at the first facility, and generating a first work schedule for a first user selected to perform the first work schedule at the first facility. The method further includes sending from the central management server to the first facility a second message including the first work schedule responsive to receiving a work schedule request from the first user. The method further includes receiving on the central management server from the first facility a third message including task status update data corresponding to the first work schedule, and updating a status of each task in the first work schedule based upon the task completion data received in the third message. The method further includes sending to the first facility a fourth message including the status of each task in the first schedule. The central management server sends the fourth message responsive to receiving a first work status request message from the first facility. The method in accordance with the present invention further includes monitoring a status of each task specified in the first work schedule using the task status update data received from the first facility, detecting that the status for a task indicates that the task is uncompleted, and rescheduling the uncompleted task responsively to detecting the uncompleted task status. The method further includes sending an alert message to a manager of the first facility associated with the uncompleted task.

In accordance with a preferred embodiment of the present invention, another method for managing work at a facility includes sending from a client device at a first facility to a central management server a first message defining a first set of information including tasks to be performed and scheduled at the first facility, receiving at the first client device a second message including a first work schedule for a first user selected to perform the first work schedule at the first facility, and displaying the first work schedule to the first user on an electronic management interface associated with the first client device. The method in accordance with the present invention further includes receiving via the electronic management interface a first user input for a task specified in the first work schedule, where the first user input includes task completion data corresponding to the first work schedule, and responsively, generating on the first client device and sending to the central management server a third message including task completion data corresponding to the first work schedule. The method in accordance with the present invention further includes receiving from the central management server a fourth message including status of each task in the first work schedule.

In accordance with another aspect of the present invention, a fixed location interface unit configured to permit information transfer between an end user and a central management server includes a first application configured to establish a communication link between the fixed location interface unit and the central management server, an electronic interface configured to display a first work schedule to a first user and receive from the first user task completion status data for each task in the first work schedule. The fixed location interface unit in accordance with the present invention further includes a second application configured to generate and send to the central management server a first task status update message upon receiving the task completion status data from the first user. In accordance with embodiments of the present invention, the electronic interface is a web-based interface, a graphical user interface, a touch screen interface, or the combination thereof. Further, in accordance with embodiments of the present invention, the first work schedule displayed to the first user is an icon-based work schedule in which each task in the work schedule is associated with a task icon. In one embodiment of the present invention, the icon-based work schedule may include a color-coded task icon for each task in the first work schedule. The fixed location interface unit, in accordance with the present invention, includes a fourth application configured to permit a supervisory user to request a first work schedule report, receive the first work schedule report from the central management server, and display the report to the supervisory user.

In accordance with another aspect of the present invention, a central management server is configured to manage work on a plurality of facilities. The central management server according to the present invention includes a database configured to store work schedules for a plurality of facilities, a plurality of facility records, a plurality of task identifiers for each task specified in the plurality of work schedules, and a plurality of instruction information records for each task. The central management server further includes a first application configured to receive from a first facility a first set of information including tasks to be performed and scheduled for the first facility. The central management further includes a second application configured to retrieve a first facility record from the database and generate a plurality of first facility work schedules for a plurality of first facility users selected to perform the tasks at the first facility. The central management server stores the work schedules in a database. The central management server further includes a third application to generate an icon-based schedule for each of the plurality of first facility work schedules. In accordance with the present invention, each task specified in the work schedules is associated with a predetermined task icon. The central management server further includes a fourth application configured to receive a first work schedule request from a first user at a first facility. In accordance with the present invention, the first user requests the first work schedule via a fixed location interface unit configured to permit information transfer between the plurality of first facility users and the central management server. The fourth application is further configured to retrieve a first work schedule for the first user and send the first work schedule to the first user. The central management server in accordance with the present invention further includes a fifth application configured to receive a first task status update message corresponding to the first work schedule and, responsively, update a status of each task of the first work schedule based upon task completion data received in the first task status update message.

The foregoing and other features and advantages of the system and method for work management will be apparent from the following more particular description of preferred embodiments of the system and method as illustrated in the accompanying drawings.

BRIEF DESCRIPTION OF THE DRAWINGS

Preferred embodiments of the present inventions are described with reference to the following drawings, wherein:

FIG. 4 is a data diagram illustrating an example of data contained in a facility record, a task record and a user record in accordance with the present invention;

FIG. 5 is a data diagram illustrating an example of a customer record populated with data for two customers in accordance with the present invention;

FIG. 11 is an exemplary language selection dialog box in accordance with a preferred embodiment of the present invention;

FIG. 19 is an exemplary web-site work calendar dialog box in accordance with a preferred embodiment of the present invention;

FIG. 20 is an exemplary dialog box illustrating a work order record in accordance with a preferred embodiment of the present invention;

FIG. 21 is an exemplary dialog box illustrating an inspection record in accordance with a preferred embodiment of the present invention;

FIG. 22 is a flow chart illustrating a method for providing a work schedule from a central management server to a client device in accordance with a preferred embodiment of the present invention;

FIG. 23 is a flow chart illustrating a method for requesting and receiving a work schedule at a client device in accordance with a preferred embodiment of the present invention;

FIG. 33 is a flow chart illustrating a method for sending a broadcast message to a set of users based upon a permitted access level of a user relative to a hierarchy of the customer data in accordance with a preferred embodiment of the present invention.

DETAILED DESCRIPTION OF PREFERRED EMBODIMENTS

The present invention is directed to a system and method for providing work management services for customer facilities.

Figure 1:
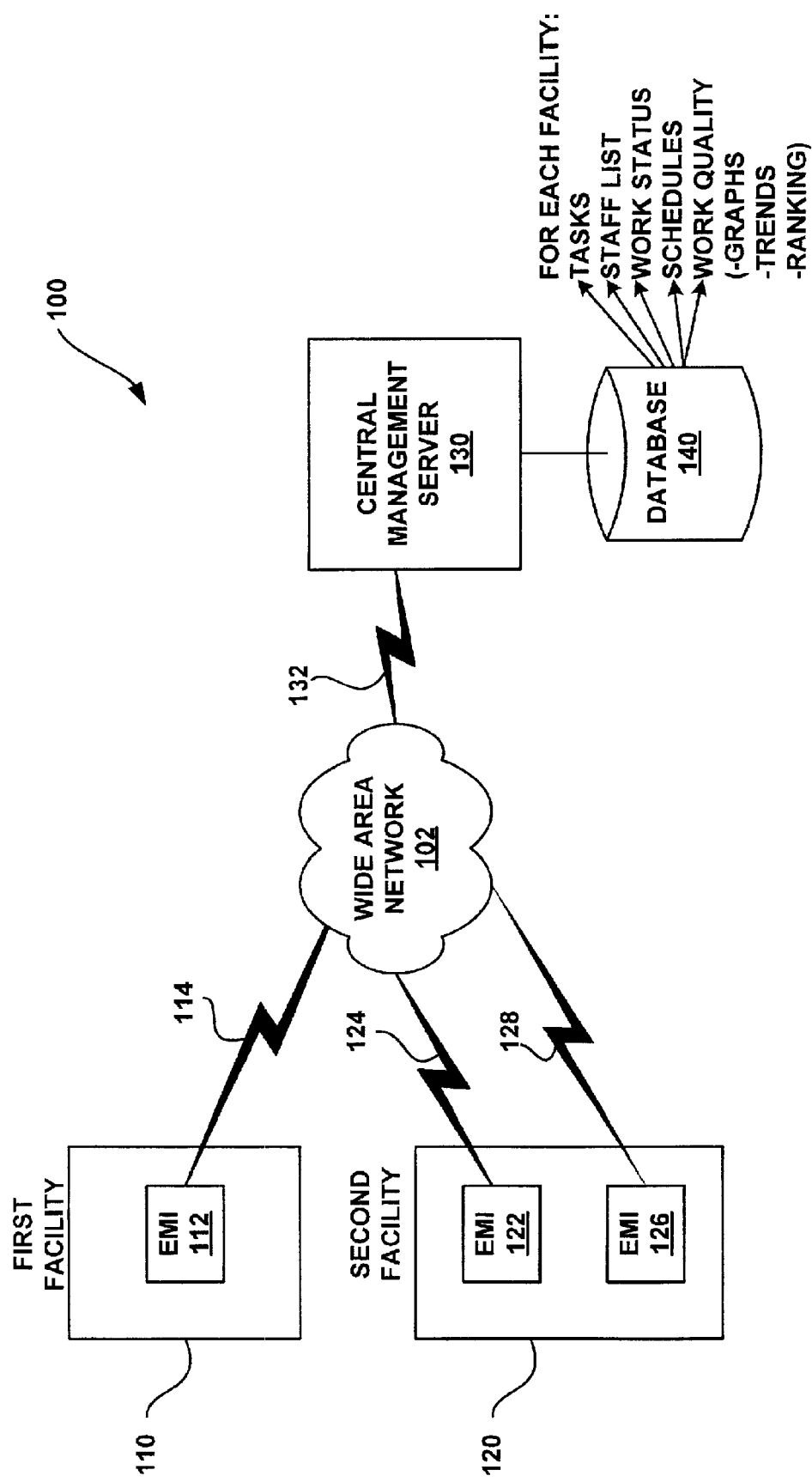
FIG. 1 is a diagram illustrating a preferred embodiment of the network architecture for providing facility work management in accordance with the present invention.

FIG. 1 is a functional block diagram illustrating an exemplary embodiment of a network architecture 100 for providing facility work management according to one embodiment of the present invention. The network architecture 100 includes a wide area network (WAN) 102, such as the world wide web or a public network, that provides a communication path between a first facility 110 and a second facility 120, on the one hand, and a central management server 130 on the other.

Facility 110 includes an electronic management interface (EMI) unit that communicates with WAN 114 via communications link 114. Likewise, facility 120 includes EMI units 122 and 126 that communicate with WAN 102 via communication links 124 and 128, respectively. EMI units are positioned at their respective facilities and provide an information interface for managing users performing maintenance functions at the facilities. One or more than one EMI may be provided for each facility depending upon the size of the facility, the number of users, or other factors based upon convenience.

In one embodiment, a facility may include one or more fixed location EMI units and a number of portable EMI units. In such an embodiment, a EMI unit, such as personal digital assistant is synced with the fixed location EMI unit, and communicates with the fixed location EMI unit operating as a master EMI unit. In such an embodiment, the fixed location EMI unit at the facility may be configured to communicate with the server 130. In another alternative embodiment, an EMI unit may include a satellite-based EMI unit configured to communicate with central management server 130 and a number of fixed location and/or portable EMI units at one or more facilities.

Central management server 130 communicates with WAN 114 via communications link 132. Server 130 is coupled to a database 140 for maintaining data regarding maintenance of the facilities, such as lists of tasks to be performed at the facilities, lists of staff, schedules for performance of the tasks, status of the tasks and work schedules, as well as quality data regarding performance of the tasks.

The EMIs represent client devices that communicate with central management server 130 through WAN 102 in, for example, a client-server relationship. Communication through WAN 102 provides access the server 130 from facilities 110 and 120 to obtain information for maintenance of the facilities and to collect completion status. The completion status and progress of maintenance can then also be monitored and modified from remote sites that access server 130 via WAN 102.

Figure 2:
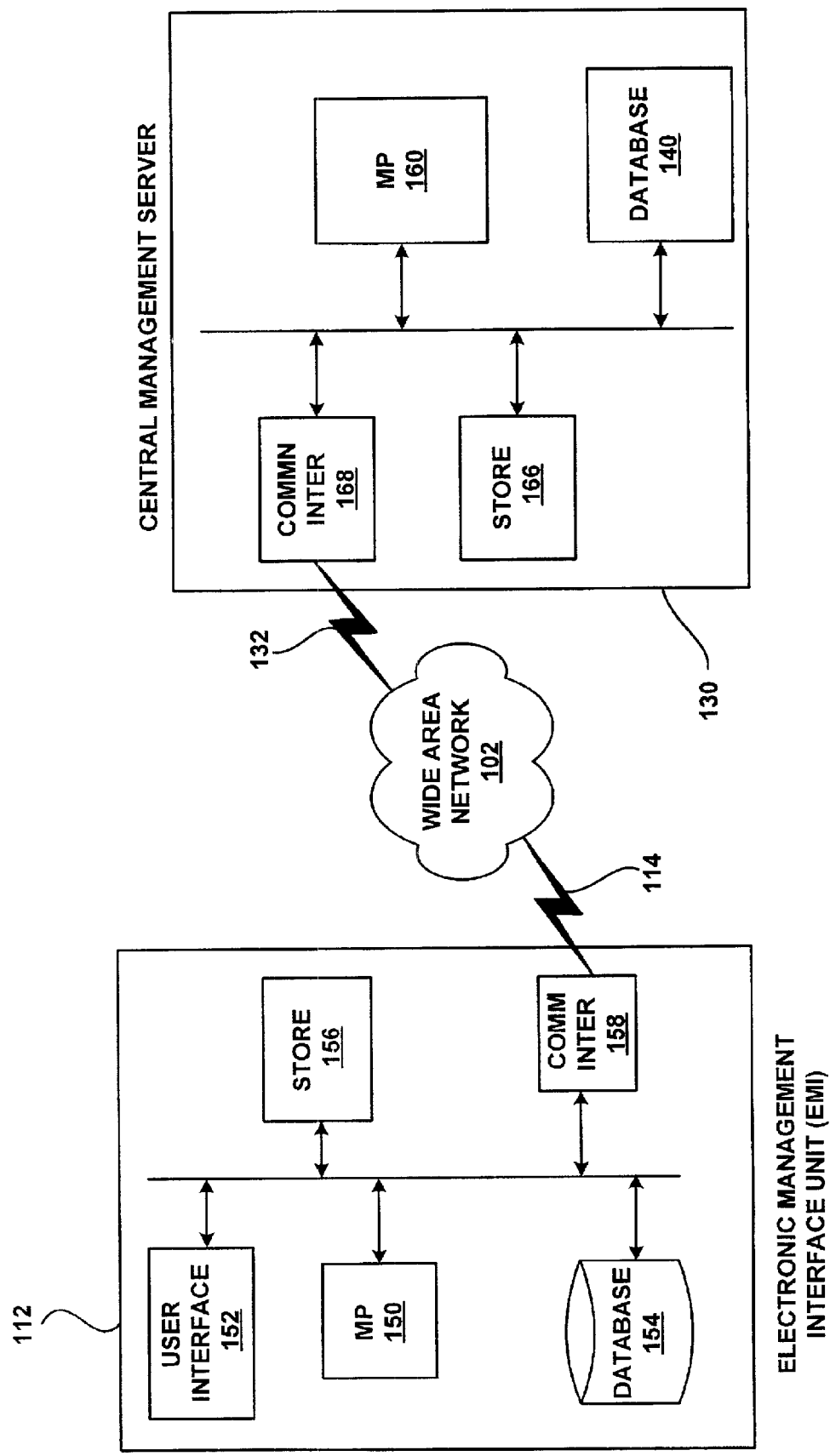
FIG. 2 is a functional block diagram illustrating one example of an embodiment of an Electronic Management Interface according to the present invention.

The EMI units provide an easy to operate interface at the facilities for users performing tasks at those facilities. In one approach, the EMI is affixed to the facility that it serves so that the EMI and the facility have a direct relationship such that the EMI may be used to identify the facility. FIG. 2 is a functional block diagram illustrating one example of an embodiment of an EMI 112 according to the present invention. EMI 112 is a specialized function computer located at facility 110. EMI 112 has a microprocessor 150 that is coupled to a user interface 152, a local database 154, a memory store 156 and a communication interface 158 through a processor bus. The microprocessor 150 may include any existing or later developed processing units such as, for example, a Celeron processing unit.

User interface 152 may take a variety of forms. For example, interface 152 may be a touch screen having a graphical user interface (GUI) that allows a user to make control and data inputs by touching the screen, which also outputs data to the user in graphical form through icons displayed on the screen. The display for the EMI may, for example, be constructed using a liquid crystal display (LCD) screen or a cathode ray tube (CRT) screen. In other embodiments, the user interface 152 may, for example, utilize a pen based input system, a keyboard input system, or a mouse pointing device. One of ordinary skill in the art will readily recognize that the design of user interface 152 may employ a wide variety of data input/output devices.

Database 154 provides local mass storage for the EMI. Database 154 may be used to store instructions relating to, for example, a browser application for communicating data to and from server 130, as well as operating system instructions and communication protocols. In addition, in one embodiment, data may be stored locally that may be accessed through the user interface when, for example, communication with server 130 via WAN 102 is unavailable. Data may also be stored for later upload to server 130 when communication is available.

Store 156 may, for example, be a persistent memory device for storing a bootstrap routine for starting the EMI as well as local memory for executing instructions and storing local variables. Either database 154 or store 156 may be used to store a device identifier (ID) for identifying the EMI device and, by extension, the facility where the EMI is located. Communication interface 158 provides one end of a communication link 114 with WAN 102. Communication link 114 may also take a wide variety of forms including a dial-up communication link, a wireless communication link, a broadband communication link, a local area network (LAN) communication link, a wide area network (WAN) communication link, or a combination thereof. The EMI 112 may establish communication sessions with the central management server 130 using, for example, any existing or later developed modems, such as 56K modems with and/or without the wireless capabilities, cable modems, digital subscriber lines (DSLs), or network communication equipment, such as a network interface card.

As noted above, EMI 112 may include a browser application. The browser may, for example, be a Java compatible web-browser such as the Microsoft Explorer 5.5, Netscape 4.5, or any other currently existing or later developed web-browsers. According to one embodiment, the EMI unit 112 has a limited web-browsing capability that only provides for accessing the central management server 130. Access to all other sites from the EMI unit 112 may be limited using, for example, a set of firewall policies or a proxy server. In one embodiment, the EMI unit 112 may be configured to employ a dynamic host configuration protocol (DHCP) process to obtain an IP address, thus, eliminating the need of hand-coding the IP address on the EMI unit 112. The EMI unit 112 may also include an authentication means such as a card reader or a voice recognition device, for instance, for receiving identifying and authentication information from the user of the EMI. Note that EMIs 122 and 126 may be similarly constructed or may take on different forms provided that they are capable of performing the same functions.

The communication between the EMI unit 112 and the central management server 130 consists of bi-directional data transmission via the communication link 114, WAN 102 and communication link 132 and provides, for example, for downloading schedules of work tasks from the central management server 130 and sending work update messages from the EMI unit 112, as will be later described in greater detail. According to an exemplary embodiment, the EMI unit 112 is configured with a location identifier that is appended to any messages being sent from the EMI unit 112 to the central management server 130 so that the central management server 130 may automatically determine the location of a user communicating with the central management server 130.

According to an exemplary embodiment, in addition to communicating with the central management server 130, a user of EMI unit 112 may establish a communication session with a call center managed by a number of system administrators that may access records stored in the database 140. For example, EMI unit 112 may have a voice input/output means such a build-in speaker enabling a user to have a conversation with a system administrator at the call center. Further, in such an embodiment, EMI unit 112 may include a user input selection, such as a button embedded in EMI unit 112, enabling a user to establish instantaneous communication session with a system administrator at the call center.

As illustrated in FIG. 2, the central management server 130 includes a microprocessor 160, a local memory store 166 and a communication interface 168 coupled together via a processor bus. In one embodiment, database 140 may be a device integrated into server 140 and coupled to the processor bus for processor 160. However, it should be understood that different embodiments are possible as well. For example, the central management server 130 may be configured to communicate with one or more external database devices via one or more communication links, such as a back-end network that links server 130 to multiple database units.

Figure 3:
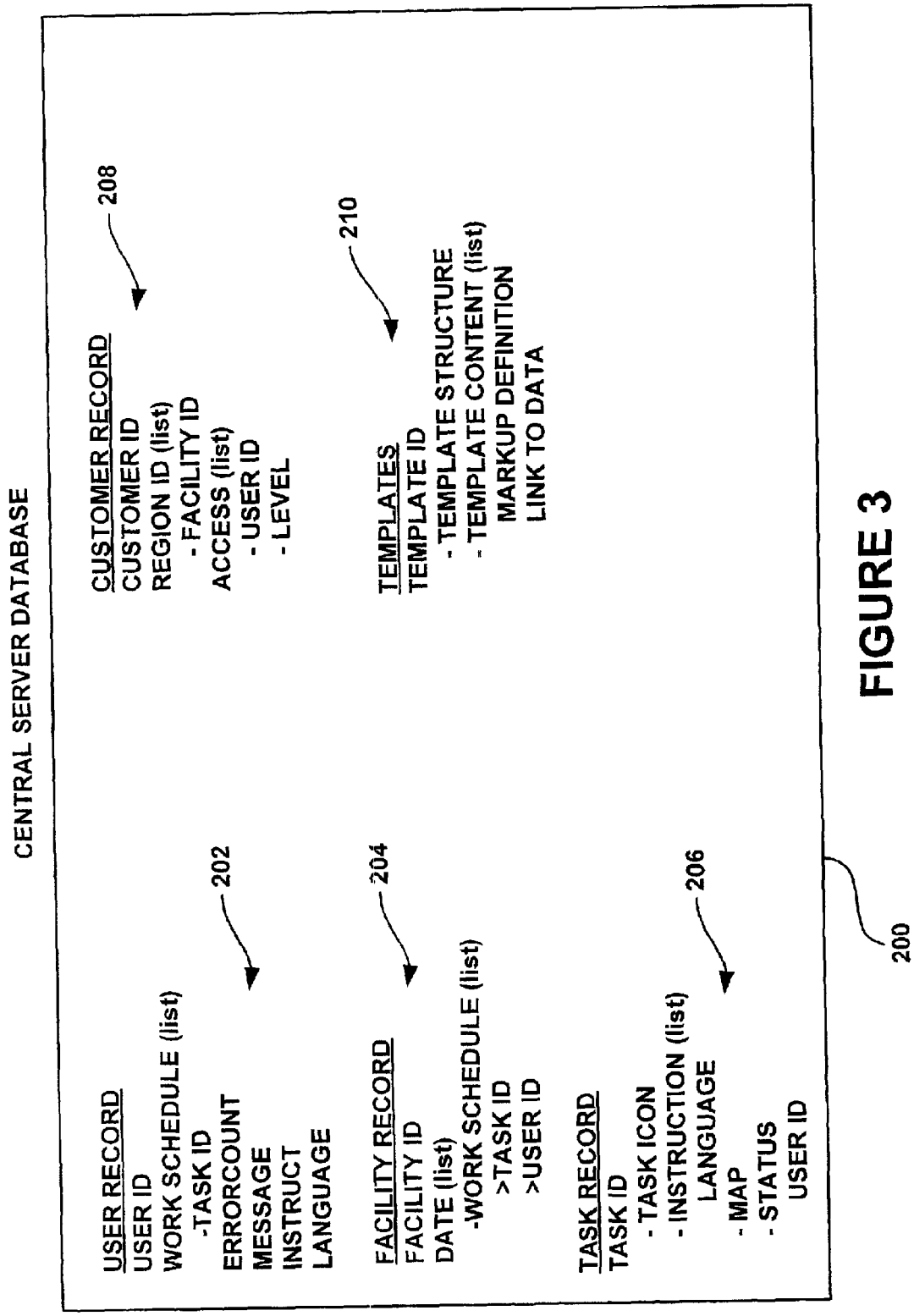
FIG. 3 is a data diagram illustrating an example of some data structures that may be present in a central server database in accordance with the present invention.

FIG. 3 is a data diagram illustrating an example of some data structures that may be present in a central server database 200, such as database 140 in FIG. 1 and FIG. 2. Database 200 may include a user record 202 that includes a USER ID for identifying a user who may have access to the server database and may have tasks assigned by the central management server. For assignment of tasks, user record 202 may include a WORK SCHEDULE list of task identifiers TASK IDs. In this embodiment, each TASK ID is a numerical value that identifies a corresponding TASK RECORD 206. However, the TASK ID may be implemented in a variety of ways, such as a pointer to a TASK RECORD 206, as one of ordinary skill will readily recognize. User record 202 may also include an ERRORCOUNT attribute that may be used to maintain a record of the number of times that the user identified by USER ID has had an assigned task rejected for poor quality, for example. As described below, the ERRORCOUNT attribute or, alternatively, the INSTRUCT attribute, may be used to trigger display of an instruction for completing the task to try to improve the quality of the user's performance. In another alternative, the number of errors by a user may be derived from the status of task records. The LANGUAGE field may be used to indicate a language for instructions to be displayed to a user.

One aspect of the present invention is that the EMI may be used for communication with users who may be dispersed at remote facilities or across several facilities. This aspect of the present invention allows a WORK SCHEDULE of tasks to be provided to a user at a remote site. However, this aspect of the present invention may also allow a text file to be stored in a MESSAGE field of user record 202 that may be displayed to the user using the EMI. MESSAGE may be defined by the central management server 130 to alert a user that, for example, a task has been rejected and needs to be repeated. MESSAGE may also be defined by another user, such as a supervisor or administrator, to send a message to the user identified by USER ID. One of ordinary skill in the art will readily appreciate that this aspect of the present invention provides a flexible communication channel between remote users and central management that may be readily adapted to a variety of uses.

In one embodiment, the database 140 is configured to store facility records, which may take the form of facility record 204. Referring back to FIG. 1, the database 140 may store facility records for the first facility 110 and the second facility 120. Facility record 204 of FIG. 3 illustrates one embodiment of a facility record according to the present invention. This embodiment of facility record 204 is keyed by a facility identifier field FACILITY ID and includes a list of tasks in a WORK SCHEDULE list that, in turn, is included in a set of lists based on DATE, where each list in DATE is composed of a list of tasks in WORK SCHEDULE. Each task in the WORK SCHEDULE list includes a TASK ID that identifies the task and a USER ID to indicate the user assigned to perform the task, where the USER ID value indexes an instance of user record 202.

Each TASK ID value in user record 202 or facility record 204 indexes an instance of task record 206. Task record 206 is keyed by TASK ID and may include a TASK ICON that is either a graphical file or a pointer to a graphical file. The TASK ICON for a task may be displayed to a user reviewing the WORK SCHEDULE list for his own instance of user record 202 or reviewing the WORK SCHEDULE for a facility record 204. The TASK ICON graphic is displayed through the user interface 152 of EMI 112 shown in FIG. 2.

Each instance of task record 206 may have a list of INSTRUCTION that includes instructions for performing the task in several languages. Each LANGUAGE field in the INSTRUCTION list of task record 206 may include a test file for the instructions in a particular language and may, for example, be ordered such that the first element of the INSTRUCTION list is a file with instructions in English, the second element is a file with instructions in Spanish, and the third element is a file with instructions in Polish. Thus, when a user makes a language selection, subsequent language displays may be made based on the user's selected language. This aspect of the invention is described in further detail below. Alternatively, the server 130 may select a language in which task record should be provided to a user based on a user identifier. In such an embodiment, a user record tagged with a USER ID may index a language in which a user wishes to communicate. Based on the language specified in the user record, the server 130 may retrieve task files in an appropriate language.

The embodiment of task record 206 in FIG. 3 also includes a MAP field that either includes or points to a graphical file that provides a map to the location where the task is to be performed. Task record 206 also includes a STATUS field that indicates the status of the task. For example, the STATUS field may indicate that the task is scheduled, due to be performed, rescheduled, cancelled, approved or rejected. Along with the STATUS field is a USER ID field that identifies the user who changed the value of the STATUS field. This aspect of the present invention will be described in further detail below.

FIG. 4 illustrates an example of data contained in facility record 204, task record 206 and user record 202. In this example, a facility with FACILITY ID=131 has a WORK SCHEDULE list constructed for Oct. 7, 2001. Each element of the WORK SCHEDULE list identifies a TASK ID for a task to be performed and a USER ID for the user that the task is assigned to. In this example, USER ID=34 has three tasks assigned to him, where the tasks are identified by TASK ID (32, 29, 12). Likewise, USER ID=28 has three tasks assigned to him, where the tasks are identified by TASK ID=(17, 97, 82).

Each TASK ID value in facility record 204 indexes a corresponding instance of task record 206. In this example, a task record 206 instance exists for each of the TASK ID values 12, 17, 29, 32, 82 and 97. Each task record 206 instance contains the TASK ICON, INSTRUCTION list, MAP and STATUS data for the task. Similarly, each USER ID value in facility record 204 indexes a corresponding instance of user record 202. The WORK SCHEDULE list for USER ID 28 shows that the user has been assigned the tasks having TASK ID values 17, 82 and 92. Likewise, the WORK SCHEDULE list for USER ID=34 shows that the user has been assigned the tasks having TASK ID values 12, 29 and 32. However, the ERROR COUNT value for USER ID=34 is 3 and the INSTRUCT field is set to Y for yes. Either of these fields may be used to trigger display of instructions from the INSTRUCTION list for the listed tasks in the language indicated by the LANGUAGE field of the user record. This allows just-in-time instructions to be provided to a user either automatically, based upon the ERRORCOUNT value, or by a supervisory user setting the INSTRUCT field to Y. The ERRORCOUNT value may be incremented each time that a task completed by the user is rejected. This aspect of the present invention will be discussed further below.

Returning to FIG. 3, a customer record 208 may also be provided that allows data to be maintained for all the facilities being managed for a particular customer or by a particular customer. Customer record 208 is keyed by a CUSTOMER ID field that identifies each customer. A REGION ID list is a list of each region for the customer. Each REGION ID list contains the FACILITY ID for each facility in the region, where the FACILITY ID in customer record 208 indexes into an instance of facility record 204. Customer record 208 may also include an ACCESS list that indicates the users that may access the customer record data and a LEVEL to which the user may access the customer record data. Each USER ID of the ACCESS list indexes into an instance of user record 202. For example, a user may be restricted to access only to his own WORK SCHEDULE as identified in his instance of user record 202. A regional supervisory user may have access to all the facility data for one REGION ID. A higher level administrator may have access to all data for the particular CUSTOMER ID value.

FIG. 5 illustrates an example of customer record 208 populated with data for two customers. One instance of customer record 208 is keyed by CUSTOMER ID =355. This customer has three regions where REGION ID=(110, 111 and 112). The region identified by REGION ID=110 has three facilities identified by FACILITY ID=(131, 133 and 134). The other regions similarly have three facilities each, but the number of facilities and the number of regions may be arbitrarily selected based upon the customer's selections. Each value for FACILITY ID indexes a corresponding instance of facility record 204.

The ACCESS list for this customer lists the users that have access to the customer's data. Each USER ID value in customer record 208 preferably references an instance of user record 202 and indicates the level of access through the value in the LEVEL field. For example, LEVEL is set to 110, corresponding to REGION ID=110 for USER ID=56, which, in one embodiment, indicates that the user is a regional manager who has access to the data from all facility records in the list corresponding to the REGION ID value, but only that REGION ID value. For USER ID=88, LEVEL is set to 355, corresponding to CUSTOMER ID= 355, which means that the user is a high level manager with access to all data for the listed CUSTOMER ID value, but only the listed CUSTOMER ID value. The LEVEL values for USER ID=34 and USER ID=28 are set to the same value as USER ID, which indicates that these users only have access to their own WORK SCHEDULE data. For USER ID=30, LEVEL is set to 131, corresponding to FACILITY ID=131, which indicates that this user is a facility manager who has access to all data for the corresponding facility. This permits a hierarchy of access to be provided to different users. Note that this particular implementation requires that the different identifying values be unique across customers, regions and facilities. A variety of other approaches may be taken to controlling access to customer data may also be taken. For example, a user's level of access may be identified by an additional field in user record 202 or by a separate record altogether.

The facility records may also include a set of policies for generating work schedules for each facility. For example, the first facility 110 may require that the floors be swept and the toilets cleaned each night, while windows may only be scheduled for cleaning once a week. It should be understood that the database 140 may store facility records for multiple facilities having different policies for generating work schedules. Alternatively, a customer associated with a predetermined set of policies may have different facility locations, and each location may have a different set of policy rules for generating work schedules.

According to an exemplary embodiment, if a customer receiving facility management services has a number of facilities throughout a country, facility records for that client are arranged in the database 140 according to a number of facility hierarchy levels. The facility hierarchy levels may include, for example, a global facility level, a country facility level, a regional facility level, a branch facility level, or a location facility level. However, the present invention is not limited to such facility levels, and different facility levels could also be used. In such an embodiment, each facility record stored in the database 140 may be associated with a predetermined access identifier limiting a user access to a predetermined set of facility records. For example, a supervisory user having a supervisory access identifier that is tagged to a predetermined facility identifier may only be given access to a predetermined set of records compiled on the central management server 130 for a number of users managed by the supervisory user at that facility. In such an embodiment, the supervisory user will not be given an access to facility records marked with higher hierarchy levels.

Facility information records stored in the database unit 140 for the first facility 110 may include, for example, facility location information records, a facility map record, a facility description record, or facility safety requirement records. Each record stored in the database unit 140 for the first facility 110 may be marked with a first facility identifier. As mentioned in the proceeding paragraph, the first facility 110 may be a part of a bigger facility structure created for a customer having facilities in different countries and different cities. In such an embodiment, the first facility 110 records may be tagged with the first facility identifier that maps to a predetermine city identifier. The predetermined city identifier may then map to a predetermined regional identifier that maps to a predetermined country identifier, thus, creating a tree-like database storage structure.

The database 140 further includes user records for each facility or a client. According to one embodiment, each user is identified using a predetermined user identifier associated with a predetermined hierarchy (access) level. A user record may include a user's skill level, user's contact information, user's supervisor information, user's work hours or a shift identifier. Further, a user record includes one or more facility identifiers. In one embodiment, a user record may include a single facility identifier indicating that the user can only perform work at a predetermined location associated with the facility identifier. Alternatively, a user record may include multiple facility identifiers for a number of facilities at which a user may be scheduled to perform different or the same tasks. Further, alternatively, a user record may include a single identifier associated with a predetermined city including a number of facilities at which the user may be scheduled to perform tasks. It should be understood that the user's records are not limited to these records or user identifiers, and, more, fewer, different or equivalent user records and/or identifiers could also be used.

According to an exemplary embodiment, the central management server 130 is configured to manage work on a plurality of facilities such as the first facility 110. First, the central management server 130 receives a work order request including a number of tasks to be performed at the first facility 110. The methods of placing a work order at the central management server 130 will be later described in greater detail. When the central management server 130 receives a work order request for the first facility 110, the central management server 130 creates a work order record linked to the first facility identifier. The work order record created in the database 140 further includes a number of task records created for each task specified in the work order request, and each task record is marked with the first facility identifier.

According to an exemplary embodiment, the central management server 130 may employ a number of global identifiers for defining different types of tasks. Further, each task record stored in the database 140 may be marked with a task status identifier, and the central management server 130 may be configured to monitor and update a status of each task stored in the database 140, the process of which will be later described in greater detail.

Task status identifiers employed on the central management server 130 to mark task records may indicate a variety of states. For example, status indicator values may include a task pending approval identifier, a new task request approved identifier, a new task request rejected identifier, a task unscheduled identifier, a task scheduled identifier, a task due identifier, a task not completed identifier, a task completed identifier, a task closed identifier, a task rescheduled identifier, a task cancelled identifier, a task approved identifier, a task rejected identifier, or a task forcefully approved identifier. In one embodiment, when the central management server 130 creates one or more task records upon receiving a work order request for the first facility 110, the central management server 130 tags each newly created task record with a task unscheduled identifier and/or a task pending approval identifier. According to an exemplary embodiment, if a task is tagged with a task pending approval identifier, a higher hierarchy user has to approve the task. The central management server 130 may be configured to determine whether a task record should be tagged with a task pending approval identifier based on facility records for which the task record is created. For example, facility records may include a number of templates defining which tasks should be automatically approved by the central management server 130. In an alternative embodiment, if a user associated with a predetermined hierarchy (access) level places a work order request, the central management server 130 may automatically tag task records generated for tasks specified in the work order request with a task approved identifier as well as a task unscheduled identifier.

Further, according to an exemplary embodiment, a user associated with a predetermined access level may view task records stored in the database 140 and modify task identifiers. In one embodiment, the user may access the database records 140 via a web page, as will be later described in greater detail. Alternatively, the database records as well as operation of the system may be monitored and updated by 24 hours-system operators at a call center. In such an embodiment, the user may simply call a system operator. For example, a user having a predetermined access level may approve tasks, thus, triggering the central management server 130 to change a task pending approval identifier to a task approved identifier in each user-approved task record. Alternatively, the user may reject a task, thus, triggering the central management server 130 to change a task pending approval identifier to a task rejected identifier in a task record. Further, alternatively, the central management server 130 may be configured to automatically approve a task if no instructions to the contrary are received in a predetermined time period from a supervisory user.

According to an exemplary embodiment, the central management server 130 is configured to monitor work orders and task records stored in the database 140. For example, if a number of task records created for the first facility 110 indicate that tasks have been approved for scheduling (task records including task approved identifiers), the central management server 130 creates a work schedule for one or more users selected to perform the approved tasks at the first facility 110.

When a task is scheduled and assigned to a predetermined user, the central management server 130 updates a task identifier in a task record. According to an exemplary embodiment, when a task is scheduled, the central management server 130 updates a task unscheduled identifier to a task scheduled identifier. Further, a timer may be set by an application running on the central management server to trigger future status checks for the task, the process of which will be described in greater detail below.

According to an exemplary embodiment, a work schedule provided to users via the EMI unit 112 at the first facility 110 is an icon-based schedule. In one embodiment, the database 140 stores a number of task icons that are linked to task identifiers in work schedules generated on the central management server 130 for the first facility 110. A task icon may include a graphical and/or textual task icon. For example, a task icon may include a graphical representation of a task along with a short written description for a task.

In one embodiment, when the central management server 130 receives a work schedule request from a user using EMI 112 at the first facility 110, the processor 160 retrieves the requested work schedule from the database 140 along with task icons for tasks scheduled for the user, thus, creating an icon-based schedule that is subsequently sent to EMI 112 at the first facility 110. In an alternative embodiment, task icons may be pre-stored in the database 154 on the EMI unit 112. In such an embodiment, when a schedule is received at the EMI unit 112, the processor 150 retrieves from the database 154 a predetermined set of task icons based on task identifiers specified in the received work schedule. The icon-based schedule is subsequently displayed to a user via the touch-screen on the EMI unit 112. Task icons may include color-coded icons that may be utilized to define a priority level or a warning regulation for each task.

Further, for example, a facility or a predetermined set of facilities may employ different task icons. In such an embodiment, facility records associated with a predetermined facility and stored in the database 140 may include facility-specific icons. In such an embodiment, when the central management server 130 generates work schedules for that facility, the central management server 130 may link scheduled tasks to the facility-specific icons stored in the database 140.

The database 140 further includes task-training records including basic instructions for performing each task. In one embodiment, when a work schedule is requested from the first facility 110, the central processing unit 160 retrieves from the database 140 and sends to the first facility 110 the requested work schedule and task-training records for each task specified in the schedule. In one embodiment, task-training records stored in the database 140 are linked to task identifiers associated with task records created on the central management server 130. For example, a task training record for an elevator cleaning may map to each work schedule including an elevator cleaning identifier. When a user at the first facility 110 requests a work schedule, the central management server 130 sends to the EMI unit 112 the requested work schedule and task training records for each task specified in the sent schedule. Alternatively, task training records may be pre-stored in the database 154 on the EMI unit 112. In such an embodiment, when a user requests task training instructions, the processing unit 110 may retrieve an appropriate training record based on a task identifier associated with a task for which the task training instructions were requested.

Further, each task record and task training record may be generated in a number of languages. As will be later described in greater detail, when a user accesses the EMI unit 112, the user may select a language in which the user wishes to receive his/her work schedule and training instructions. In such an embodiment, when the central management server 130 provides a work schedule and training instructions to a user at the first facility 110, the work schedule and training instructions are in the language selected by the user.

Further, each scheduled task record stored in the database 140 may link to a task location map including a detailed map of a facility with a marked up location at which a predetermined task should be performed. The database 140 may include task location map records that are linked to scheduled task records in work schedules generated for each user.

Figure 6:
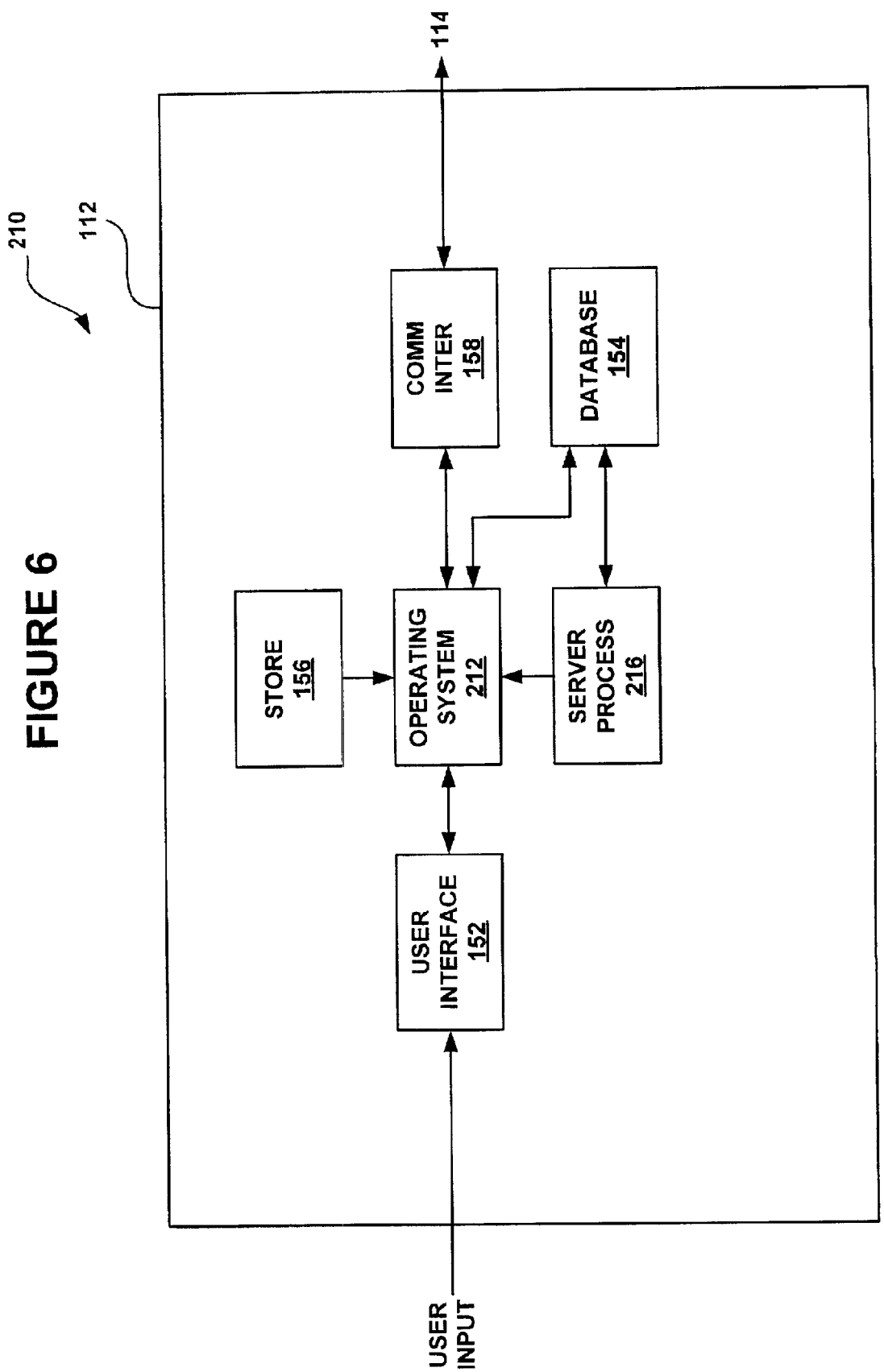
FIG. 6 is a simplified diagram illustrating an embodiment of a software architecture that may be employed on an Electronic Management Interface in accordance with the present invention.

According to one exemplary embodiment, the EMI 112 may be configured to locally access some data from the database 154 in addition to communicating with server 130 to access data stored in database 140. FIG. 6 is a simplified diagram illustrating an embodiment of a software architecture 210 that may be employed on EMI 112. The architecture 210 includes an operating system 212 that controls operation of EMI 112. A user inputs data via user interface modules 152 that receive, process and provide the user input to the operating system 212.

In one embodiment of the present invention, the operating system 212 accesses a plurality of template files, such as templates 210 illustrated in FIG. 3, in database 154 corresponding to different graphical user interface views that may be displayed by EMI 112. For example, operating system 212 may retrieve a template for a language selection screen, such as the screen shown in FIG. 11, or for a user identification number input screen, such as the screen shown in FIG. 12. The operating system 212 retrieves the appropriate template for the stage of processing, e.g. language selection or user ID input, and passes the template to server process 216 for processing. Each template file includes graphical and textual data and formatting descriptors for rendering the view. In addition, each template file includes resource file identifiers that provide a link for accessing data elsewhere in the local database 154 or from remote database 140 that is needed to populate the user view.

Server process 216 first determines whether the data needed to populate the template is stored locally from database 154. However, if the server process 216 determines that the requested data is not stored locally in the database 154, then the server process 216 may instruct the operating system 212 to retrieve data from remote database 140 through the server 130. The operating system 212 may then establish a communication session with the server 130 via the communication interface 158. Once all the data needed for the template is obtained, then the template with the retrieved data is rendered for display to the user via EMI 112.

In one embodiment, the server 130 may preload to the database 154 a number of work schedules generated for a plurality of users at the first facility 110. In such an embodiment, upon a successful authentication of a user, the operating system 212 will retrieve a work schedule for the authenticated user from the local database 154 rather than from the remote database 140.

Figure 12:
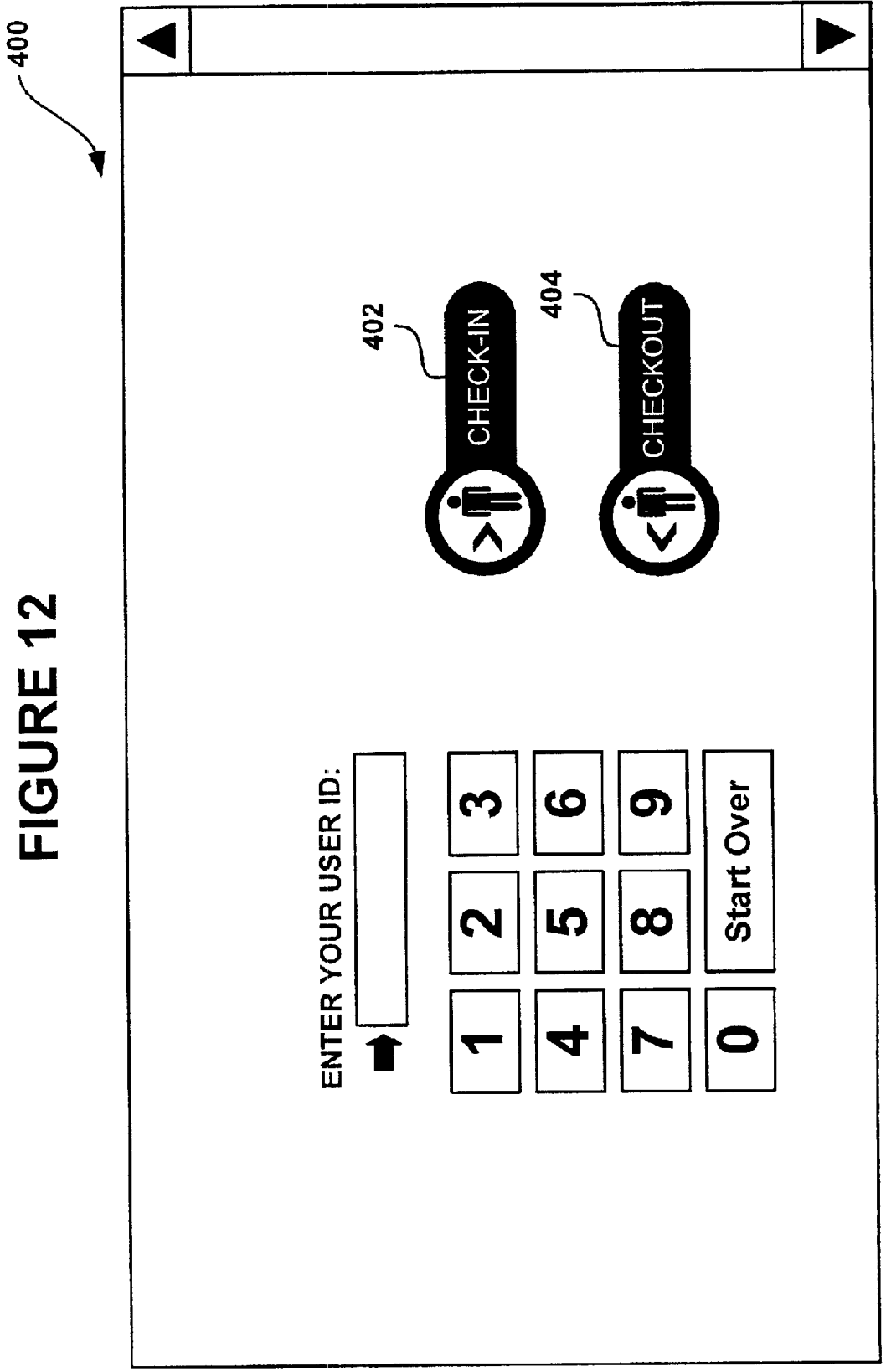
FIG. 12 is an exemplary login dialog box in accordance with a preferred embodiment of the present invention.
Figure 13:
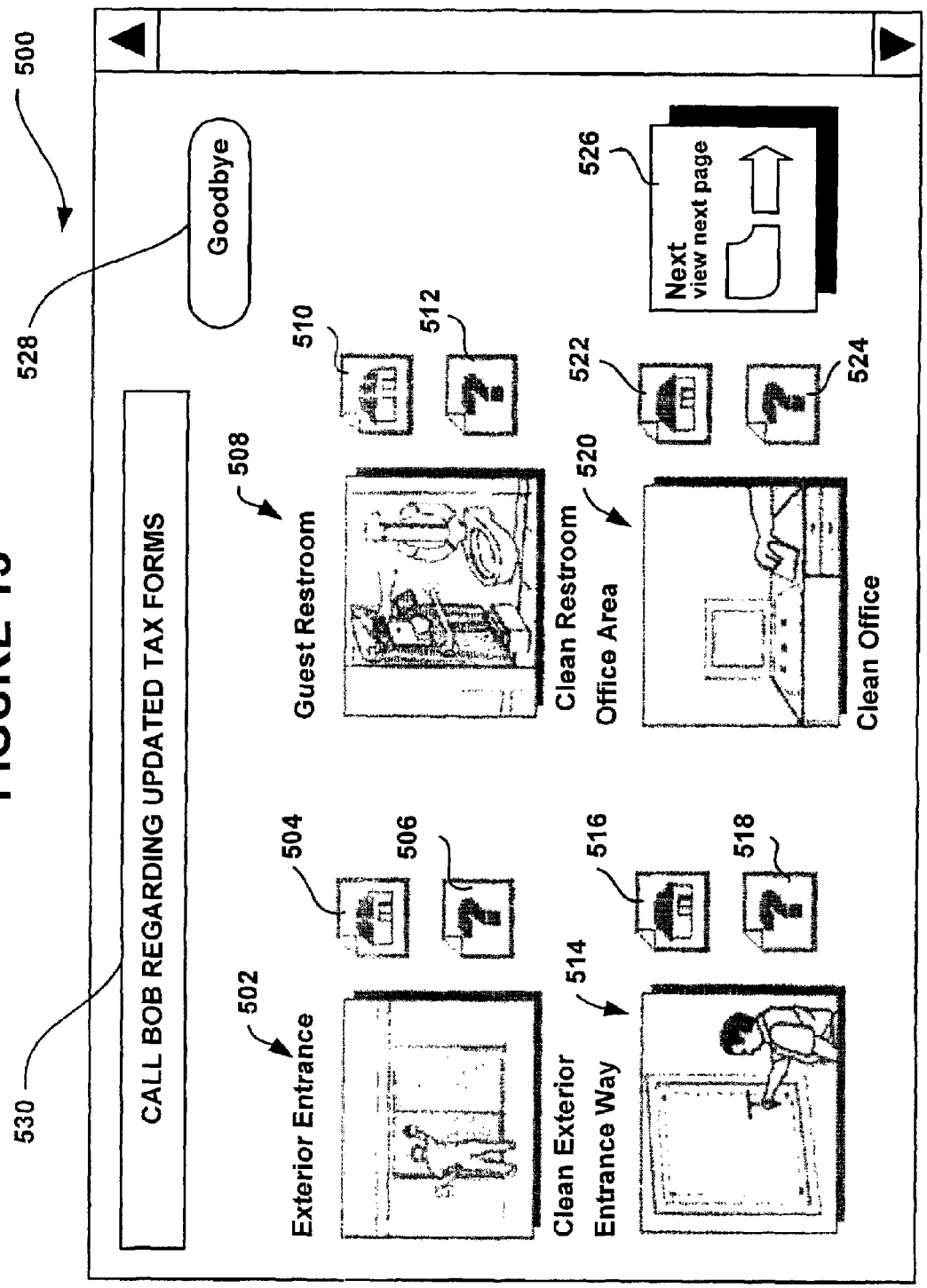
FIG. 13 is an exemplary icon-based schedule dialog box in accordance with a preferred embodiment of the present invention.

For example, in response to a user inputting USER ID=28 using the screen shown in FIG. 12, operating system 212 retrieves a template from local database 154 corresponding to a work schedule view, such as the view shown in FIG. 13, which is passed to server process 216 along with USER ID=28. The template for the work view includes a file identifier for a user record that causes server process 216 to search local database 154 for a user record instance keyed by USER ID=28. When the user record is retrieved, server process 216 scans the user record to determined the TASK ID values that are present. The server process 216 will then search local database 154 for a task record 206 for some or all of the TASK ID values from the user record instance. Once the task records are retrieved, then the view is rendered by server process 216 for output via user interface 152 resulting in the example of FIG. 13. To store the data in the local database, the operating system 212 may run the server process 216 upon receiving data from the server 130 so that the server process 216 may parse the records received from server 130 and store them in local database 154.

In yet another embodiment, for example, the database 154 may store only limited data, such as task icons keyed to TASK IDs or task instruction records also keyed to TASK IDs, and the remaining data, such as a user record for a user's work schedule, may be stored on remote database 140 accessed through server 130. In such an embodiment, server process 216 requests the user record data from the server 130, which is configured to send the user record to EMI 112.

When server process 216 receives the user record from server 130, it retrieves the task record 206 for each TASK ID value in the user record along with associated task icons. As in the example above, the template, once populated, is rendered for output to the user, such as output of the view of FIG. 13. Still another approach is for all data for each view to be retrieved from remote database 140 each time a user request is made.

In one embodiment, the system architecture 210 may be configured to employ an Extended Markup Mechanism (XML) to populate and manage data stored in the database 154. XML is a restricted form of the Standard Generalized Markup Language (SGML) defined by the International Standards Organization (ISO) standard 8879 (1986). XML 1.0 (Feb. 10, 1998) is defined by the World Wide Web Consortium (W3C). XML describes a class of data entities called XML documents and generally describes the behavior of computer programs that process these documents. XML documents are made up of storage units called entities that contain either parsed or unparsed data. Parsed data is made up of characters, some of which form character data and some of which form markup. Markup encodes a description of the document's storage layout and logical structure. XML provides a mechanism to impose constraints on the storage layout and logical structure. An XML processor is a program configured to read and interpret XML documents according to the XML standard and process them into a viewable format on behalf of an application program. Each XML document is structured according to a document type definition (DTD) that contains or points to markup declarations that describe a class of documents. Hyper-text Markup Language (HTML) is another derivative form of SGML that may also be employed in the present invention.

Also note that XML can provide an interface between the database of the present invention and an existing customer database or other commercial systems available from third party vendors. Other forms of Enterprise Application Integration (EAI) or Open Database Connectivity (ODBC) compliant approaches may also be suitable for porting data between the system of the present invention and other systems.

In an alternative embodiment, the system architecture 210 may be configured to employ Java executable instructions to populate and manage locally stored data in the database 154. Java is a programming language that was designed for use in the distributed environment of the Internet and enforces object-oriented programming model. The system architecture 210 may run a Java Database Connectivity (JDBC) application for retrieving data from the database 154. JDBC may be employed to encode access request statements in a structured query language (SQL) that are then passed to a program that manages the database 154. It should be understood that the present invention is not limited to the XML or Java operating systems, and different or equivalent systems could also be used.

Figure 7:
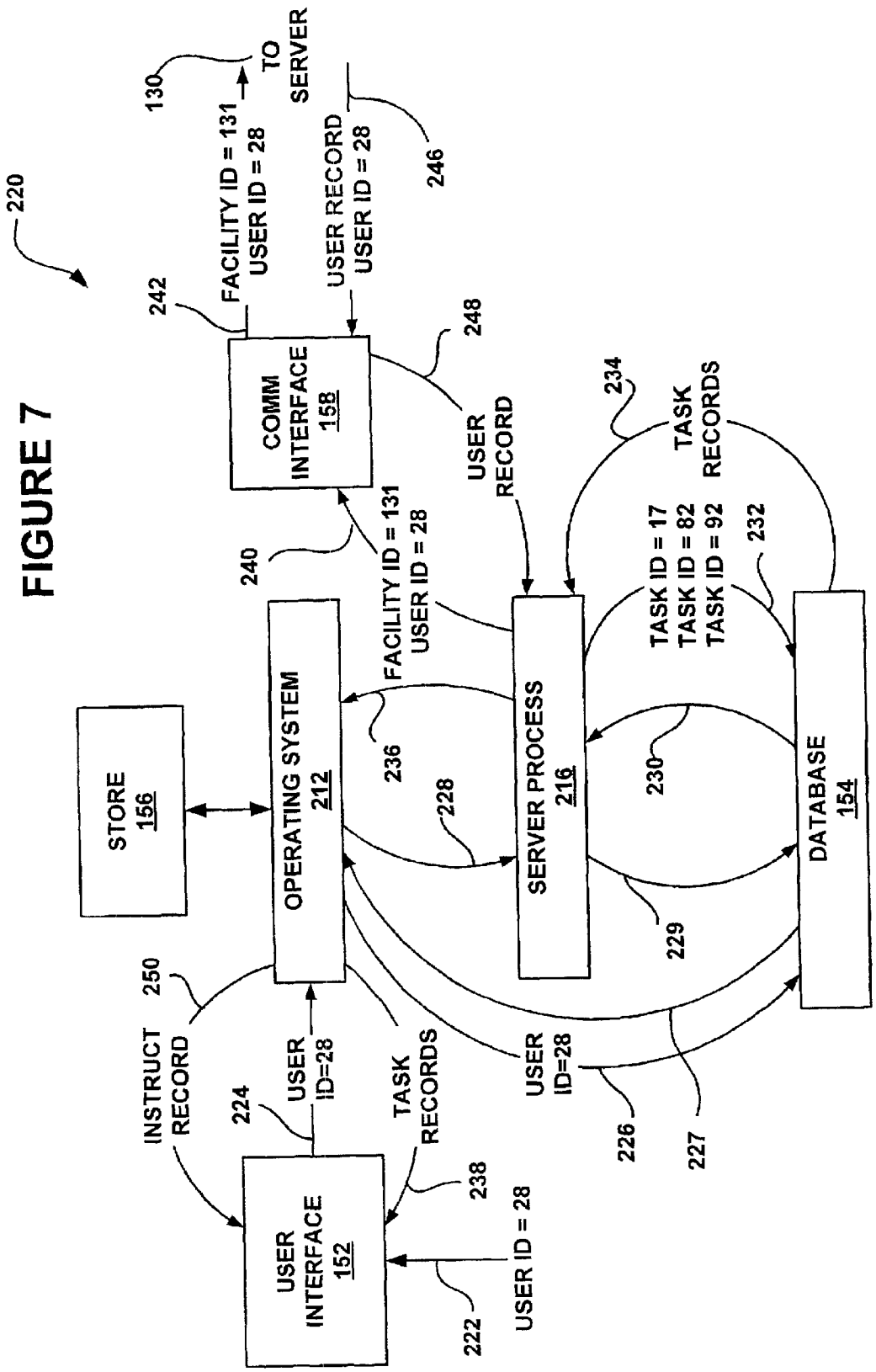
FIG. 7 is a block diagram illustrating an exchange of messages for requesting a work schedule according to one embodiment in accordance with the present invention.

As noted above, EMI 112 may store some user data locally. To demonstrate processing performed in architecture 210, an example of an exchange of messages 220 involved in requesting a work schedule by a user will be described in context of FIGS. 7 and 8. FIG. 7 illustrates one example of a message and data exchange wherein a work schedule for a user is pre-stored in the database 154. In such an embodiment, EMI 112 is configured to access the database 140 at the server 130 prior to receiving any work schedule requests from users, such as by requesting a download of all work schedules in an instance of facility record 204 corresponding to the FACILITY ID for the EMI. For example, once EMI 112 has retrieved the facility record 204 for a particular day, it may download all or some work schedules including tasks to be performed at the first facility 110 on the particular day.

The user record 202 also includes a field that may contain a message for output to the corresponding user. In one embodiment, the MESSAGE field is a text field that is either a null value or contains text of the message to output to the user. If the MESSAGE field is null, then no message is pending. Otherwise, the text in the MESSAGE field is output to the user as part of the screen view for the user. In another embodiment, the MESSAGE field is a pointer, CGI script, or other index type of field that indicates where to obtain the message for output to the user. The message may be locally stored on local database 154 or server process 216 may be configured to obtain the message from remote database 140 via server 130.

Another field within user record 202 is a LANGUAGE field that indicates the language selected by the corresponding user for instructions and other information. The LANGUAGE field may be null or select one of the available languages, which are English, Spanish and Polish in the example of FIG. 4. If the LANGUAGE field is null, then the user has not selected a language and operating system 212 is configured to retrieve a language selection template that is passed to server process 216 for rendering before output to the user interface 152. An example of the resulting view is shown in FIG. 11. Alternatively, no LANGUAGE field may be provided and the user may be presented with the language selection view of FIG. 11 at the beginning of each access session. In still another alternative, a high level user or administrative user may be permitted to define the LANGUAGE value for each user.

In FIG. 7, the user interface 152 outputs a graphical interface page, such as the page shown in FIG. 12, to a user to prompt the user for input of user identification data. In one embodiment, the user authentication data is a user identifier, such as a USER ID=28. User interface 152 receives a user input 222 that specifies USER ID=28. The user interface 152 sends USER ID=28 to the operating system 212, as illustrated in data message 224.

When operating system 212 receives USER ID 28, it will retrieve a work schedule template from database 154, as illustrated in messages 226 and 227, insert the USER ID value into the template, and pass the template to server process 216 for population of the remaining data required by the template, as illustrated in message 228. In the exemplary embodiment illustrated in FIG. 7, the file includes statements and information such as a script or commands to enable server process 216 to retrieve data from the database 154. Server process 216 uses the USER ID value to obtain a user record 202 instance keyed by USER ID=28, as indicated by messages 229 and 230. When the user record for the USER ID 28 is found, then server process 216 retrieves the task records 206 indicated in the user record, as indicated in messages 232 and 234.

In the example of FIG. 7, the task records for TASK ID=17, TASK ID=82 and TASK ID=92, which were previously downloaded for the USER ID 28, are locally available in the database 154. The server process 216 processes a template by identifying each statement or information received in the file and resolving references to other data objects or files that should be incorporated into the template. Based on the TASK IDs indicated in the user record for USER ID=28, the server process 216 retrieves task records from the database 154 using TASK IDs 17, 82 and 92, as illustrated in messages 232 and 234. At this point of the example, the data references for the work schedule template for USER ID=28 have been resolved and the template is fully populated. Server process 216 then renders the graphical directives, e.g. mark-up language, and data into a display page for output as a view, which is passed to operating system 212, as illustrated in 236. Alternatively, the server process may pass the populated template to a separate browser application for rendering.

Alternatively, the server process 216 may obtain either the user record or task records, or both, from the remote database 140 via server 130. An example of retrieving a user record from server 130 is also demonstrated in FIG. 7. Instead of sending query 229 to database 154 for the user record, or if the query of database 154 fails, then server process 216 sends a query 240 to server 130 through communication interface 158. Query 240 identifies the FACILITY ID=131 and USER ID=28. Query 240 is forwarded to server 130 as message 242. Server 130 retrieves the user record for USER ID 28 from database 140 and transmits it as message 246 back to communication interface 158. Alternatively, FACILITY ID=131 may be used to retrieve a facility record from which each user's schedule can be derived. The data returned by server 130 is provided to server process 216 as message 248.

Figure 8:
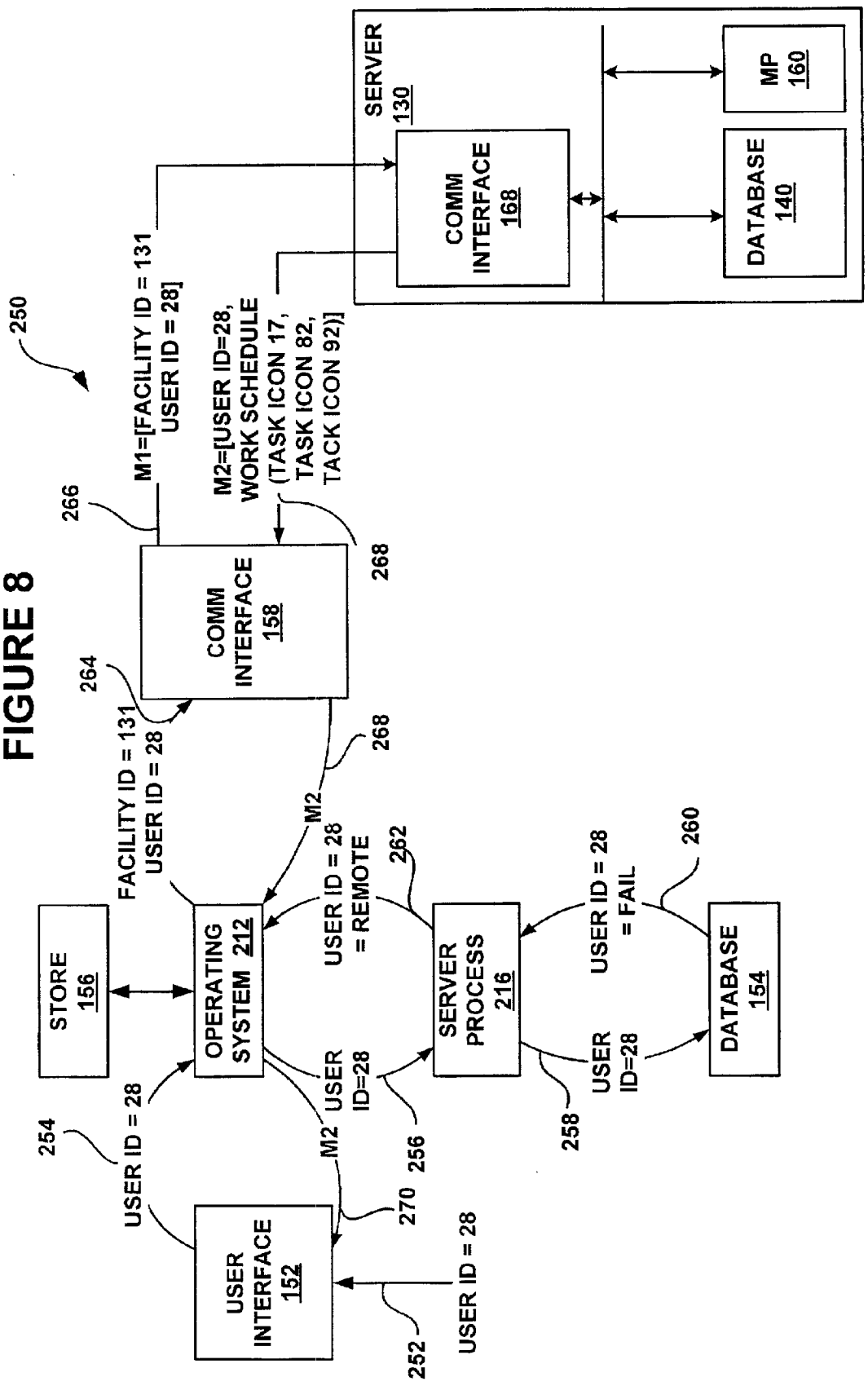
FIG. 8 is a block diagram illustrating an exchange of messages for requesting on work schedule according to a second embodiment in accordance with the present invention.

FIG. 8 is an example of an exchange of messages 250 involved in requesting a work schedule by a user, in which the work schedule is stored remotely at database 140 on the server 130. In FIG. 8, the user interface 152 receives a user input 252 including user authentication data such as USER ID=28. The user interface 152 provides USER ID=28 to the operating system 212, as illustrated in message 254. The server process 216 receives USER ID=28 via the operating system 212 along with a user work schedule template, as illustrated in message 256. Responsive thereto, server process 216 searches the local database for the user record for USER ID=28, as represented in 258. According to the example of FIG. 8, local database 154 does not include a user record associated with USER ID=28, and, thus, returns a FAIL message 260 to the server process 216. Responsive thereto, the server process 216, in this embodiment, sends the operating system a message 262 including USER ID=28 indicating that a work schedule for the user should be retrieved from the server 130. When the operating system 212 receives message 262, the operating system 212 retrieves a facility identifier (FACILITY ID=131) from the storage 156, and establishes a communication link with the server 130 via the communication interface 158. The operating system 212 sends a first message M1 264 including FACILITY ID=131 and USER ID=28 via the communication interface 158 to the server 130.

When the server 130 receives the first message 266, the server 130 retrieves from the database 140 a user record associated with USER ID=28. As discussed above with respect to FIG. 4, the user record for USER ID=28 includes a work schedule indicating that the user has been assigned the tasks having TASK ID values 17, 82, and 92. Further, the user record indicates that the user should be given instructions in English, and that the user should be provided an instruction record associated with each task. In one alternative embodiment, the server 130 constructs, for example, an HTML page that includes a task icon for each task to be performed along with textual data relating to an instruction for the task in English. The HTML page is then incorporated into a message M2 268 that is returned to the communication interface of EMI 112, which forwards message 268 to the operating system 212. Operating system 212 may pass the HTML page of the message to server process 216 for rendering or may pass the message to a browser application for rendering. The rendered page illustrating the task icons and instructions is then passed as message 270 to the user interface for output to the user. The resulting work schedule view may resemble FIG. 13.

Figure 9:
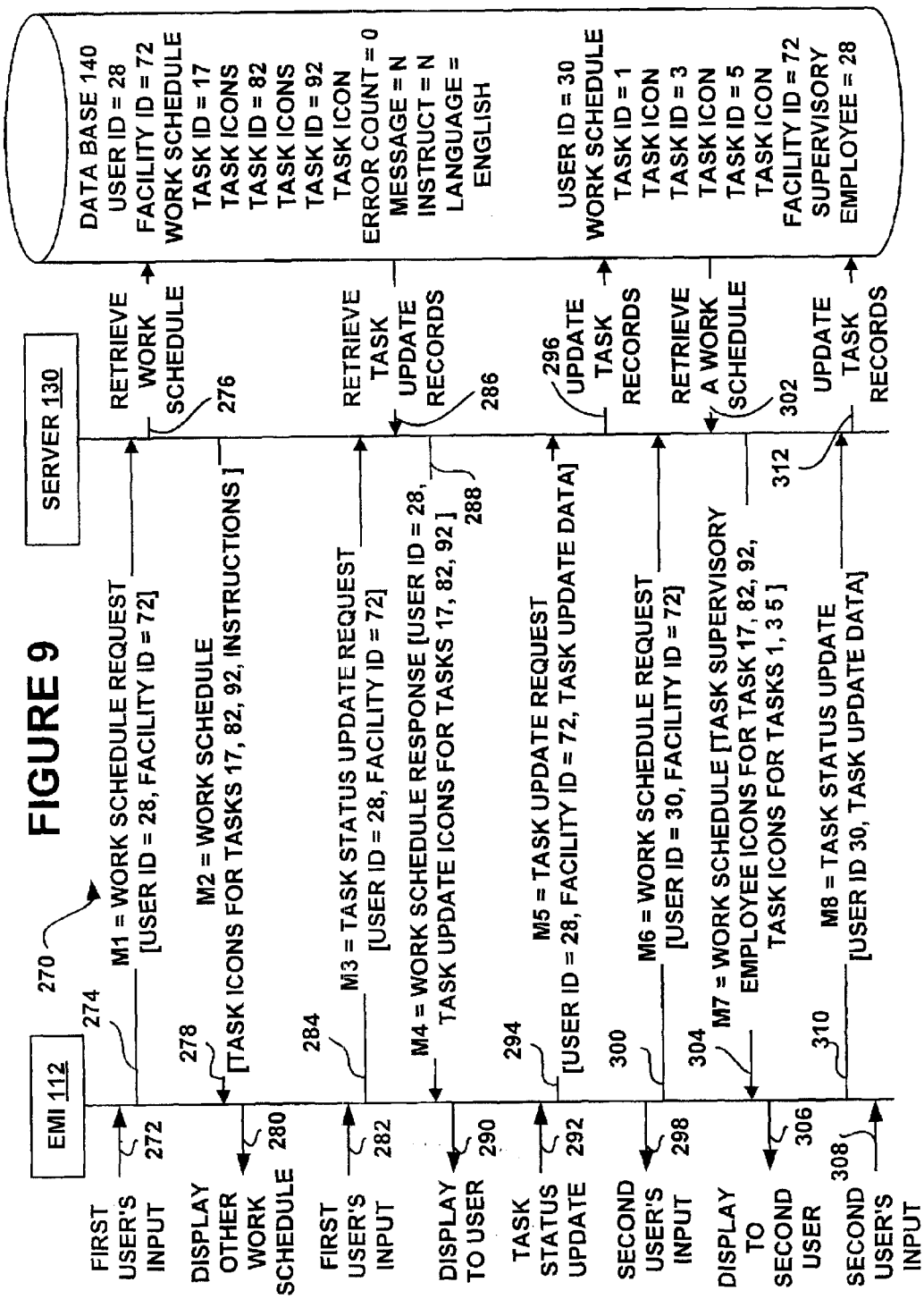
FIG. 9 is a block diagram illustrating a message flow for Electronic Management Interface central management server communication in accordance with the present invention.

With regard to FIG. 13, a user completing the tasks identified in the work schedule view or a supervisory user may update the status of the tasks. FIG. 9 is a message flow diagram illustrates an example of a message exchange 270 between EMI 112 and central management server 130 for updating a task record for a task. Initially, as described above, EMI 112 receives a user input 272 from a first user including user authentication data such as a USER ID=28. Subsequently, EMI 112 generates and sends to server 130 a first message (M1) 274 including a first work schedule request. According to an exemplary embodiment, message 274 includes a user identifier (USER ID=28) and a facility identifier (FACILITY ID=131). When server 130 receives message 274, server 130 retrieves from database 140 a work schedule for the user associated with USER ID=28, as illustrated in 276. According to an exemplary embodiment, server 130 authenticates the user before providing a work schedule to EMI 112. Alternatively, EMI 112 may be configured to authenticate the user prior to sending any messages to server 130 using authentication data stored in local database 154. According to the example illustrated in FIGS. 4 and 9, the user record 202 includes a number of task identifiers (17, 82, 92) associated with tasks to be performed by the user at the facility associated with the FACILITY ID=131. Server 130 retrieves from database 130 task records 206 including task icons and task instructions based on the task identifiers specified in the user's work schedule.

Subsequently, server 130 generates and sends to EMI 112 a second message (M2) 278 including a work schedule for the first user. The second message 276, in this embodiment, includes task icons for tasks 17, 82, and 92 as well as task instructions. When EMI 112 receives the second message 278, EMI 112 displays the work schedule to the first user, as illustrated in 280.

As mentioned in the preceding paragraphs, a user may update a status of each task in a user's work schedule. To initiate a subsequent login session by the first user, EMI 112 receives a second user input 282 from the first user. The user input includes authentication data for the first user (USER ID=28). According to this exemplary embodiment, when EMI 112 receives the second input 282 from the first user, EMI 112 generates and sends to server 130 a third message (M3) 284 including a task status update request. Third message 284 includes user authentication data (USER ID=28) and the facility identifier (FACILITY ID=131). When server 130 receives the message 284, server 130 retrieves from database 140 the task records for the user's work schedule as indicated by the user record for USER ID=28. Using the task identifiers from the user record, server 130 accesses task icons for each task as well as task update icons that will be described below in greater detail.

Figure 16:
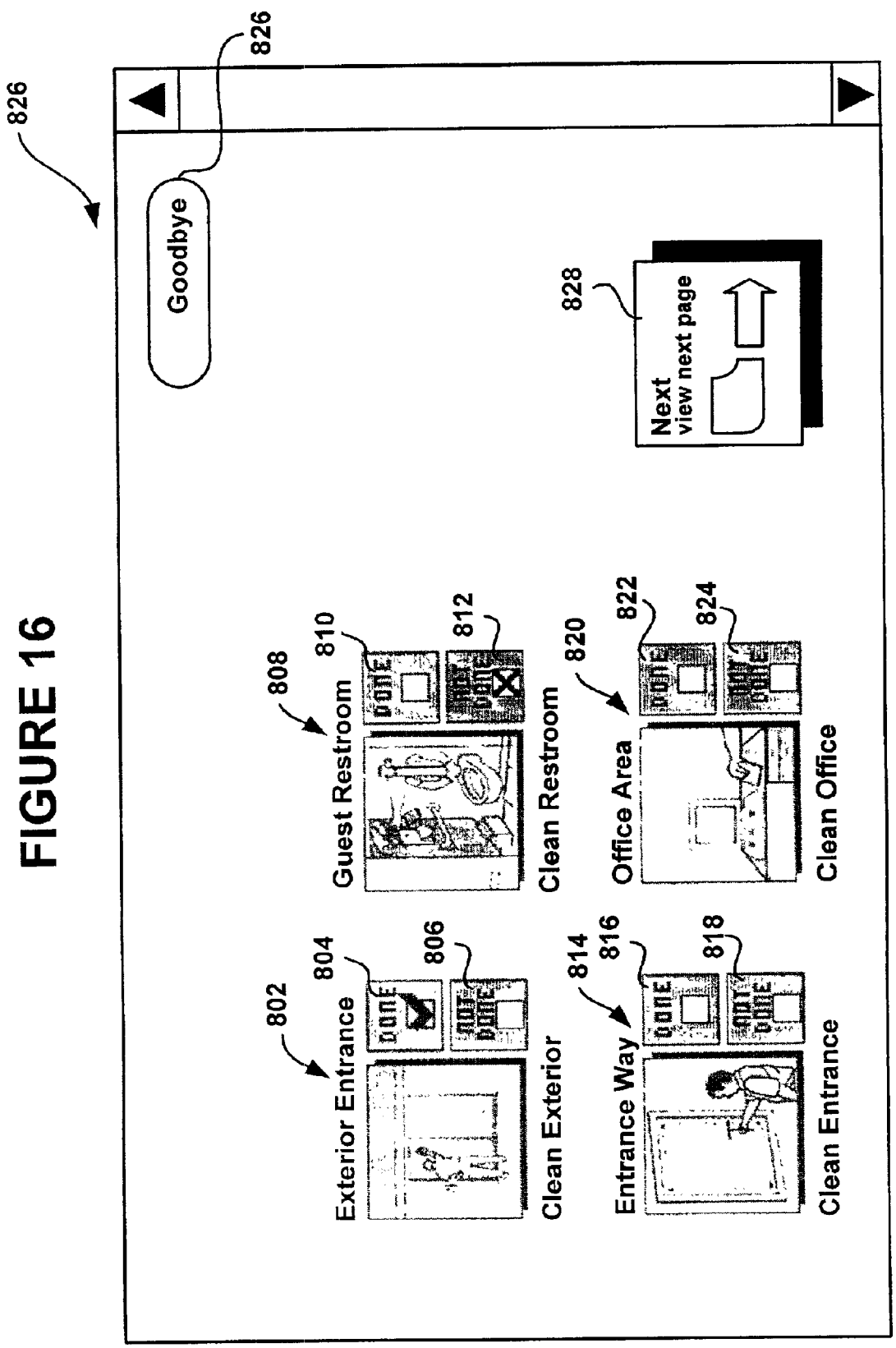
FIG. 16 is an exemplary task status update dialog box in accordance with a preferred embodiment of the present invention.

Subsequently, server 130 generates and sends a fourth message (M4) 288 including a task status update response. Fourth message 288 includes task update icons for each task specified in the user work schedule. When EMI 112 receives fourth message 288, EMI 112 displays task update icons to the user, as illustrated in 290. FIG. 16 illustrates an example of a task update view screen that may be displayed to the user along with task status update icons. The first user may update a status of each task assigned to the user based on, for example, a completion status of each task. EMI 112 receives task status update input from the user, as illustrated in 292.

When the first user completes the task status update, EMI 112 generates and sends to server 130 a fifth message (M5) 294 including a task status update request message. The fifth message 294 includes user's identification data (USER ID=28), the facility identifier (FACILITY ID=131), and task update data received via the task status update input 292. When server 130 receives the fifth message 294, server 130 updates status of each task specified in the fifth message 294, as illustrated in 296. The process of updating task records will be described in greater detail below.

In an alternative embodiment, a user may log in to server 130 of the system using a fixed position EMI 112 to obtain a work schedule, but the work schedule and instructions are downloaded to a portable device for use by the user. The portable device may take a variety of forms including Personal Information Devices, such as the Palm Pilot device offered by Palm Computing, or a portable computer. The user is able to view the downloaded task icons and instructions as needed and to update that status of the tasks. The user then synchronizes the portable device with the fixed position EMI 112, which receives the USER ID and updated status data from the portable device and then transmits the updated status data in the manner described above.

Further, as illustrated in FIG. 9, EMI 112 may receive a user input 298 from a second user. The second user may be presented with a login screen such as that shown in FIG. 17. The user input 298 may include user's identification data, such as USER ID=30. When EMI 112 receives the user's identification data, EMI 112 generates and sends to server 130 a sixth message (M6) 300 including USER ID=30 and the facility identifier, FACILITY ID=131. When server 130 receives sixth message 300, server 130 retrieves from database 140 a work schedule for the user associated with USER ID=30, as illustrated in 302.

According to an exemplary customer record illustrated in FIG. 5, the user having USER ID=30 is a supervisory user that supervises tasks for the facility corresponding to FACILITY ID=131, including those tasks performed by the first user having USER ID=28. Based on the customer record of FIG. 5, server 130 generates and sends to EMI 112 a seventh message (M7) 304 including a task status report for all tasks for FACILITY ID=131. The task status report may include tasks scheduled for completion by the second user or supervisory user, such as inspection tasks. The seventh message 304 includes task icons for tasks scheduled to be performed by users supervised by the second user. Thus, in this example, the seventh message 304 includes task icons 17, 82 and 92 associated with the user having USER ID=28. See FIGS. 19 and 20 for examples of screen views that display work schedules for the facility. In one embodiment, the seventh message 304 may also include task status icons that the supervisory user may use to change the status of each task associated with the user having USER ID=28 as well as tasks scheduled for other users and the second user. See FIG. 21 for an example of a screen view that includes icons for changing the status of tasks.

When the EMI 112 receives the seventh message 304, EMI 112 displays task icons to the supervisory user. The supervisory user may then use the task icons to change the status of each task displayed on the EMI unit 112. When EMI 112 receives user's input, as illustrated in user input 308, EMI 112 generates an eighth message (M8) 310 including task status update data received from the supervisory user. The eighth message 310 further includes FACILITY ID=131, USER ID=28.

When the server 130 receives the eighth message 310 from EMI 112, the server 130 updates the status for the tasks based on the task status update data received from EMI 112.

In one embodiment, the eighth message takes the form of a CGI script that is sent when the second user selects a status input box, such as the status input boxes shown in FIG. 21. Many of the user inputs indicated above may also be implemented as CGI scripts generated through user input to, for example, an HTML page. Alternatively, the second user's inputs may be made in batches that are sent at the direction of the second user. For instance, the second user may update the status of several tasks before selecting a send box to cause the eighth message to be sent.

Figure 10B:
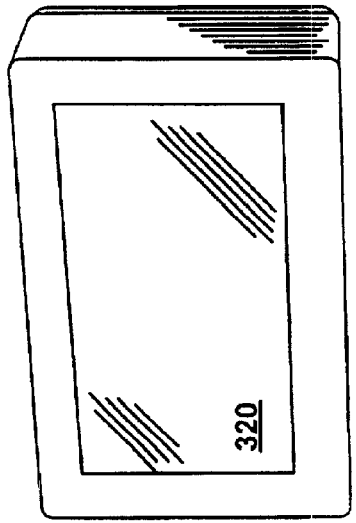
FIGS. 10A, 10B and 10C are block diagrams illustrating three exemplary embodiments of EMI units in accordance with a preferred embodiment of the present invention.
Figure 10C:
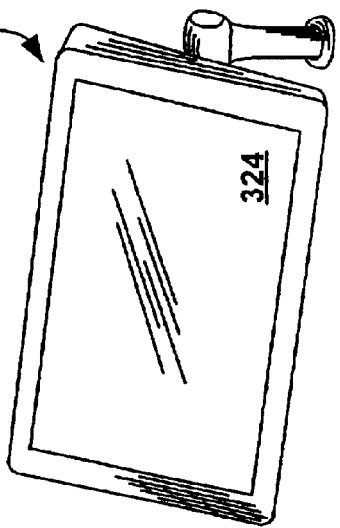
Figure 10A:
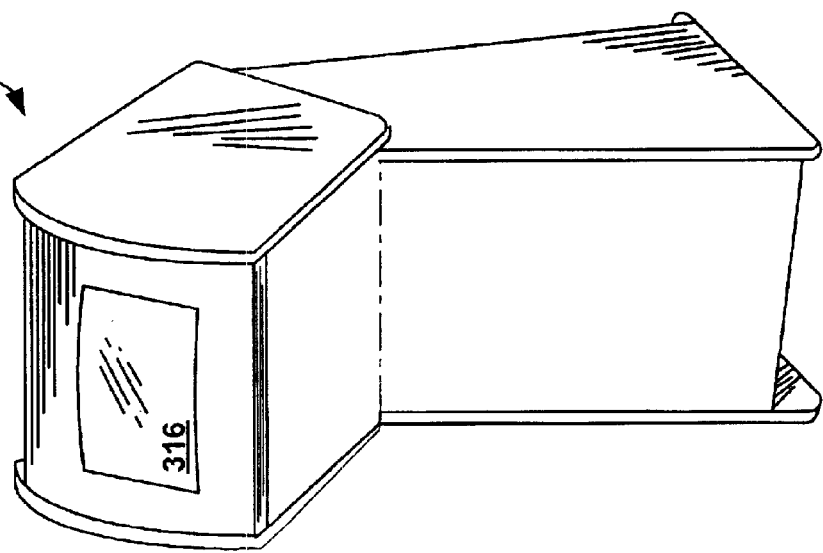

FIGS. 10A, 10B and 10C are block diagrams illustrating three exemplary embodiments for the EMI unit 112 in accordance with alternative embodiments of the present invention. The EMI units illustrated in FIGS. 6A–6C are fixed location user interface units. However, it should be understood that different configurations for EMI units are also possible. FIG. 10A illustrates an embodiment of a stand-up EMI unit 314 including a touch screen interface 316 that enables a user to request a work schedule, view task-icons scheduled for the user, or update task status, as will be described in greater detail in reference to subsequent figures. FIGS. 10B and 10C illustrate two embodiments of wall-mount EMI units 318 and 322 also including touch-screen interfaces 320 and 324, respectively. In one embodiment, the EMI units 314, 318 and 322 may include a touch, voice, movement activation mechanism, or a combination thereof. Further, the EMI units may include a panic button enabling an instant communication with a system operator at a call center. To enable the communication with a system operator, an EMI unit may include a voice/video input/output device enabling a voice/video communication between a user and a system operator.

In one embodiment, when the EMI unit 112 is activated, the EMI unit 112 establishes a communication link with the central management server 130. FIG. 11 illustrates an exemplary language selection dialog box 300 that may be displayed to a user on the touch-screen 112 upon establishing a communication link with the central management server 130. Alternatively, the dialog box 330 may be displayed to a user upon activating the EMI unit 112. In such an embodiment, a communication link between the EMI unit 112 and the central management server 130 may be established only upon detecting a selection input from a user.

The language selection dialog box 330 illustrates three language selection icons 332, 334 and 336 for a first, second and third language, respectively. It should be understood that more or fewer language selection icons could also be used, and the present invention is not limited to three language selections icons. A language selection icon may include a graphical icon such as, for example, an icon illustrating a national flag. Alternatively, a language selection icon may include a textual icon including a word, such as 'hello' in a language associated with the language selection icon.

In one embodiment of the present invention, each user is prompted to select a language to initiate a login and the selected language is then used to determine the language for subsequent displayed pages. For example, if the user selects English, then the text and icons of subsequent pages will be presented to the user in English. If the user selects another language, then the content of subsequent pages would be presented in that language. This may require that many of the messages exchanged with server 130 and searches and references to data objects in both local database 154 and remote database 140 may require the inclusion of an indication of the selected language so that icons and text corresponding to that language may be provided for incorporation into pages displayed to the user. Alternatively, the selected language may be stored as part of a user's user record, as illustrated in FIGS. 3 and 4 and discussed above, and used to determine the language used for text displayed to the user. Hereinafter, it is assumed that the user has selected an English language icon.

In this embodiment, once a user selects one of the language selection icons, a login page is displayed on the touch screen 112 of the EMI unit 112. FIG. 12 illustrates an exemplary login dialog box 400 that may be displayed to a user at the EMI unit 112. The dialog box 400 illustrates ten selection icons depicting a numerical keypad including numbers 0–9 and a "Start Over" selection icon. The dialog box also includes a "Check-In" selection icon 402 and a "Check-Out" selection icon 404. According to one embodiment, once a user enters a user identification number via the keypad displayed to the user on the touch screen 112, the user may select the "Check-In" selection icon 402 to view a user schedule. The selection of the "Check-In" selection icon 402 initiates the process of authenticating the user by the central management server 130, sending an icon-based schedule to EMI unit 112, and displaying the icon-based schedule to the user, as described in greater detail above.

Further, according to an exemplary embodiment, a user may select the "Check-Out" selection icon 404 to update a status of each task in a user's schedule, as will be described in reference to subsequent figures. Alternatively, the dialog box 400 may include a single "Check-In/Check-Out" selection icon. In such an embodiment, the central management server 130 may make a determination of whether a work schedule or a task update page should be provided to a user at the EMI unit 112 based upon a stored state for the user. For example, when the user first logs in on a given date, he is presented with the work schedule page. For subsequent login sessions on the given date, the user is presented with a task update page. Other embodiments are possible as well without departing form the spirit of the invention. The dialog box 400 illustrated in FIG. 12 further includes a "Go Back" selection icon enabling a user to return to the language selection icon dialog box 330.

When a user enters a user identification code and selects the "Check-In" icon 402 via the touch screen 112, the user is authenticated. In one embodiment, the EMI unit 112 sends the user identification code to the central management server 130, and the central management server 130 may be configured to authenticate the user. In addition to the user identification number, the EMI unit 112 may send a value that identifies the location of the EMI (e.g. FACILITY ID=131) to convey the user's location to the central management server 130. In such an embodiment, the central management server 130 may determine whether the user should be given access to the first facility 110, for example. For example, server 130 may check a facility record 204 shown in FIGS. 3 and 4 to determine if the WORK SCHEDULE for the present date and facility includes a task assigned to the USER ID for the user attempting to login from the EMI at the facility. The customer record 208 may also be accessed to determine whether a user is permitted access to work schedule information for a given FACILITY ID value. In this embodiment, the FACILITY ID value for each facility is unique and is stored internal to the EMI. The EMI provides the FACILITY ID data for all messages to central management server 130 so that a user cannot override the FACILITY ID value in order to gain unauthorized access to the work schedule information. In other embodiments, the user may be able to provide the FACILITY ID value so that a user with a more nomadic work assignment may check for scheduled tasks at other facilities.

If the user is not authorized to access the first facility 110, or the user should be at some other facility, the central management server 130 may send an information message to the EMI unit 112, and the message may be displayed to the user. For example, the message may instruct the user to re-enter a user's identification number. Alternatively, if the central management server 130 determines that a user is scheduled to perform tasks at a different location, an information message sent from the central management server 130 may include instructions for a user to move to a different location or a different facility. In addition, a determination by server 130 that a faulty login has occurred may cause a message to be generated and sent to another user, such as by inserting text into a MESSAGE field of the user record for the other user. This other user may be a supervisory user or an administrative user so that they can be alerted to the need for corrective action, such as reassigning tasks to other users, contacting the user causing the faulty login, or contacting security to determine who has caused the failed login.

If the central management server 130 successfully authenticates the user, the central management server 130 retrieves a user record 202 having a work schedule from the database 140. The central management server 130 may use either USER ID or USER ID along with FACILITY ID to retrieve a work schedule for the user. The central management server 130 subsequently sends the schedule to the EMI unit 112, and the schedule is displayed to the user via the touch screen 112.

FIG. 13 is an exemplary display page and dialog box 500 illustrating an exemplary icon-based schedule that may be displayed on the touch screen 112 to a successfully authenticated user. The display page 500 includes four task icons 502, 508, 514 and 520. However, it should be understood that a user schedule may include more or fewer tasks scheduled to be performed by a user at any given day. If the number of tasks scheduled for the user exceeds a number of tasks that can be displayed on the touch screen 112, the user may select a "View Next Page" icon 526 to view a next page of the scheduled task icons. The variety of alternative approaches may be taken for the display page, including the use of a scroll bar for use in navigating and viewing a page displaying task icons. As illustrated in FIG. 13, each task icon may include a graphical representation of a task, a short written description of the task, or both. For example, the task icon 502 defines a task location (an exterior entrance), and a task description (clean exterior). Further, the task icon 502 includes a graphical representation of the task.

In addition to the description and graphical representation for each task, two additional icons, a task location icon and a help icon, are associated with each displayed task icon. In the embodiment illustrated in FIG. 13, for example, icons 504, 510, 516 and 522 illustrate task location icons, and icons 506, 512, 518 and 524 illustrate help icons. It should be understood that the illustrated icons are only exemplary, and the present invention is not limited to these icons. Different or equivalent icons could also be used.

A task location icon, if selected by a user, invokes from the central management server 130 a location record that is displayed to a user via the touch screen 112. In an alternative embodiment, when the central management server 130 sends a work schedule to the EMI unit 112, the central management server 130 sends help and location records for each task specified in the schedule. In such an embodiment, the help and location records may also be stored in the database 154 on the EMI unit 112 either temporarily or long-term. In addition to task icons illustrated in FIG. 13, if the EMI unit 112 includes a built-in or a standby printer, the dialog box 500 may include a "Print" icon enabling a user to print the user's work schedule or any other screen snap shot displayed on the touch screen of the EMI unit 112.

Figure 14:
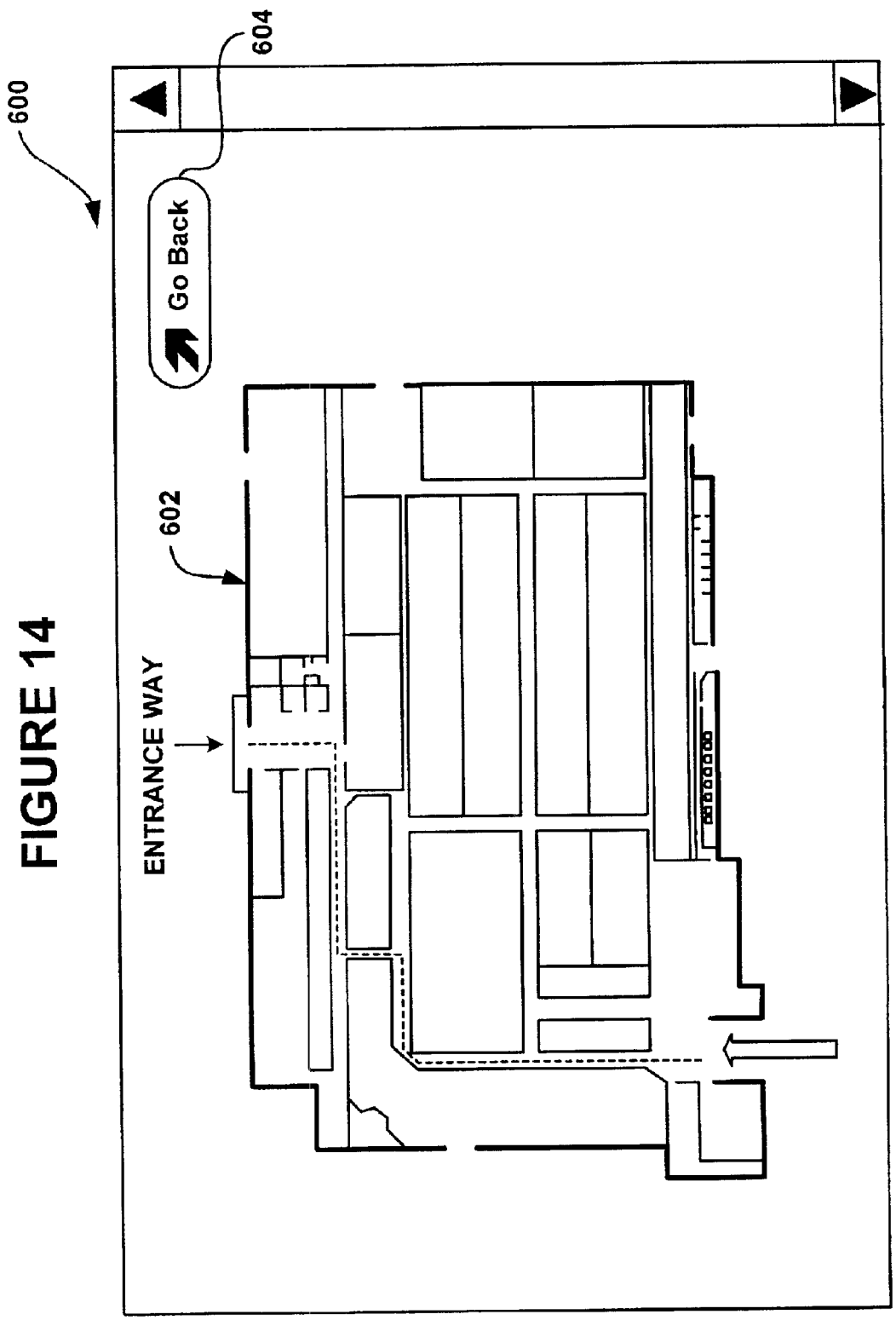
FIG. 14 is an exemplary task location dialog box in accordance with a preferred embodiment of the present invention.

FIG. 14 is an exemplary dialog box 600 illustrating an exemplary location map 602. Referring back to FIG. 13, the exemplary dialog box 600 may be displayed on the touch screen 112 upon selecting by a user a task location icon 516. The user may return to the dialog box 500 by selecting a "Go Back" icon 604. Selecting the task location icon 516 causes the task record corresponding to the task to be accessed either in local database 154 or at remote database 140. Task record 206, illustrated in FIGS. 3 and 4, includes a MAP field that either contains map or directional information for the location where the task is to be performed or contains a reference to a file, such as a graphical file, that contains the map or directional information. The map or directional information is retrieved and then rendered for display to the user, as illustrated in FIG. 14.

Figure 15:
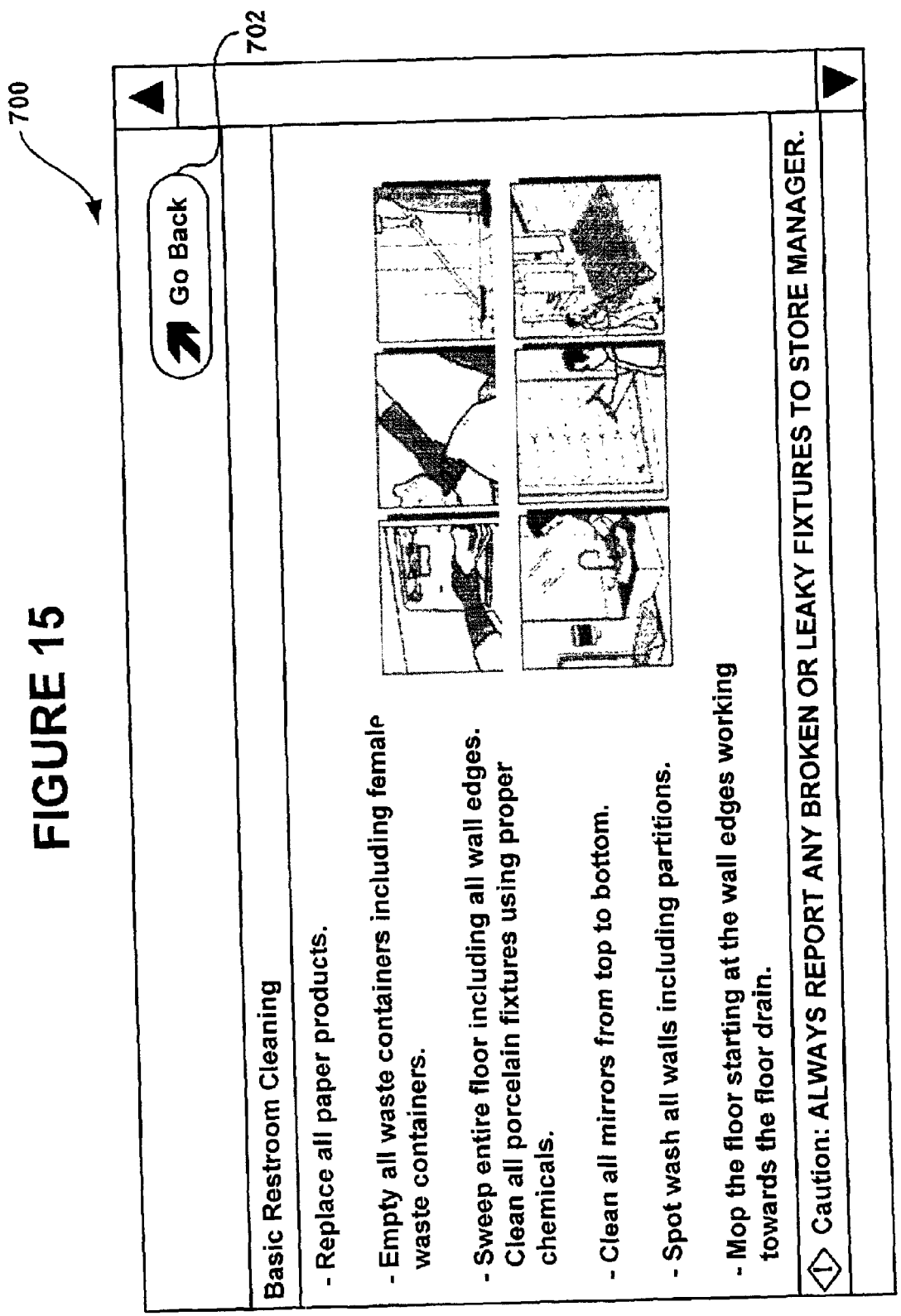
FIG. 15 is an exemplary task instructions dialog box in accordance with a preferred embodiment of the present invention.

Referring back to FIG. 13, when a user selects a "Help" icon, a task instruction record is displayed on the touch screen interface 112. FIG. 15 is an example of a display page 700 illustrating an exemplary task instruction record. An instruction record may include a number of image icons depicting task instructions as well as written instructions. Similarly to the proceeding figures, the dialog box 700 includes a "Go Back" icon 702 that may be selected by the user to return to the dialog box 500. Selecting the task help icon 512, for example, causes the task record corresponding to the clean restroom task to be accessed either in local database 154 or at remote database 140. Task record 206, illustrated in FIGS. 3 and 4, includes an INSTRUCTION structure that either contains instructional information for the task to be performed or contains a reference to a file, such as a graphical file, that contains the instructional information. The language earlier selected by the user will determine the language in which the instructions will be output. Thus, the INSTRUCTION structure of task record 206 is shown as having three subattributes ENGLISH, SPANISH and POLISH that contain or index instructional data in the corresponding language that relates to the task. The instructional information in the selected language is retrieved and then rendered for display to the user, as illustrated in FIG. 15.

Referring back to FIG. 13, after a user views his/her work schedule, the user may select a "Goodbye" icon 528 that automatically logs out the user from the system.

According to an exemplary embodiment, a user updates a status of each task in a user's schedule via the EMI unit 112. To do that, a user may first access the EMI unit 112 as described in reference to FIGS. 11 and 12. Referring back to FIG. 12, to update a task status, the user may select the "Check-Out" icon 404 that may trigger a display of a task status page with dialog boxes on the EMI unit 112. FIG. 16 illustrates an exemplary task status update status page 800. The task status update page 800 illustrates dialog boxes that may be displayed to the user associated with the work schedule illustrated in FIG. 13. In addition to the task icons from FIG. 13, the dialog box 800 includes two status icons for each task. The two status icons for each task include a "Done" status icon, such as icons 804, 810, 816 and 822, and a "Not Done" status icon, such as icons 806, 812, 818 and 824. It should be understood that the present invention is not limited to using two status icons, and more, fewer, different or equivalent status icons could also be used. Also, the status icons may reflect the current status of each task and allow the user to change the status by selecting a status icon corresponding to a different status for each task, such as selecting "Done" icon 804 for task icon 802.

Further, as illustrated in FIG. 16, the dialog box includes a "View Next Page" icon 828 that allows a user to view a next page of task icons. In one embodiment, the user may update the status of several tasks via the touch screen on the EMI unit 112 by selecting one of the task icons displayed to the user. Subsequently, when the user logs out of the system by selecting a "Goodbye" icon 826, an update message including task update information for the updated tasks is sent to server 130, which responds by updating the task status for each updated task in database 140. According to an another embodiment, when the user updates the status for each task, the EMI unit 112 generates a task update message, such as a CGI script, including task completion data for each task updated by the user. Then, the EMI unit 112 sends the task update message to the central management server 130, and the central management server 130 updates a status of each task in the user's work schedule in remote database 140 based on the task completion data received in the task update message, as will be later described in greater detail.

Further, according to an exemplary embodiment, the system 100 allows a supervisory user to request a work status report from the central management server 130. In one embodiment, the supervisory user may login via the EMI unit 112 as described in reference to FIGS. 11 and 12. Once the central management server 130 authenticates the user as a supervisory user, the central management server 130 sends a work schedule generated for the supervisory user as well as work schedules for the crew users managed by the supervisory user. The supervisory user may view the work schedules on the EMI unit 112.

In addition to viewing his own work schedule, a supervisory user may request from the central management server 130 a work status report for the users working under the supervisory user. The supervisory user may request a work status report via the EMI unit 112. In one embodiment, the supervisory user may be presented with input page 900 in FIG. 17 to input his/her identification number. The login information is received by EMI 112 and sent to server 130. A supervisory or administrative display and dialog page 1000, shown in FIG. 18, may then be presented to the supervisory user at EMI 112. Display page 1000 includes dialog boxes 1012, 1014, 1016, 1018, 1004, 1006, 1008 and 1010 that permit the supervisory user to obtain a variety of information and perform a variety of functions. For example, the supervisory user may use dialog box 1012 to obtain a work schedule for the facility. This request is received by the central management server 130, which responds by sending a work status report to the EMI unit 112. The EMI unit 112 responsively displays the received work status report to the supervisory user. In one embodiment, the supervisory user view the work status report via a display page similar or identical to the page illustrated in FIG. 19.

As noted above, according to one exemplary embodiment of the present invention, the supervisory user may change a status for each task in the status report. For example, the supervisory user may change a status for each task from "Done" to "Not Done," which may constitute a disapproval or rejection of the task approval, and vice versa. Responsive to detecting the change in the task status, the EMI unit 112 is configured to incorporate the changed status for the selected tasks into a task update message that is sent to the central management server 130. When the central management server 130 receives the task update message from the EMI unit 112, the central management server 130 updates the status for each task in the database 140 based on the changed status data received from the EMI unit 112.

According to one embodiment that will be described in greater detail below, the central management server 130 tracks and updates task completion at the first facility 110 using the work schedule data generated for the first facility 110 and task update messages received from the EMI unit 112. For example, if a user completes a task and updates a task's status to "Done" and, further, if a user's supervisor does not change a task status to "Not Done," the central management server 130 may be configured to update a STATUS field, shown in FIGS. 3 and 4, in a task record 206 stored in the database 140 to a task completed state. Alternatively, the central management server 130 may update a task status indicator to a "task not completed" state that may subsequently trigger the central management server 130 to reschedule or close the task. A USER ID field may be associated with the STATUS field of the task record 206, as shown in FIGS. 3 and 4, that is set to the USER ID value of the user who updates the task status or that identifies the system processing of server 130 as having updated the STATUS field. This is reflected in the example data of FIG. 20.

As touched upon above, in one embodiment of the present invention, a supervisory user, such as a facility manager or store manager, may access the EMI unit 112 to view the work schedule and progress at the first facility 110. For example, the facility manager may be given access to the entire daily task list for the first facility 110 including a status for each task scheduled for the first facility 110. Further, the facility manager may view "check-in" and "check-out" times for each user, thus, enabling the facility manager to determine daily attendance. Further, according to an exemplary embodiment, the facility manager may also change a status for each task, thus, triggering the EMI unit 112 to generate and send a status update message to the central management server 130.

Figure 17:
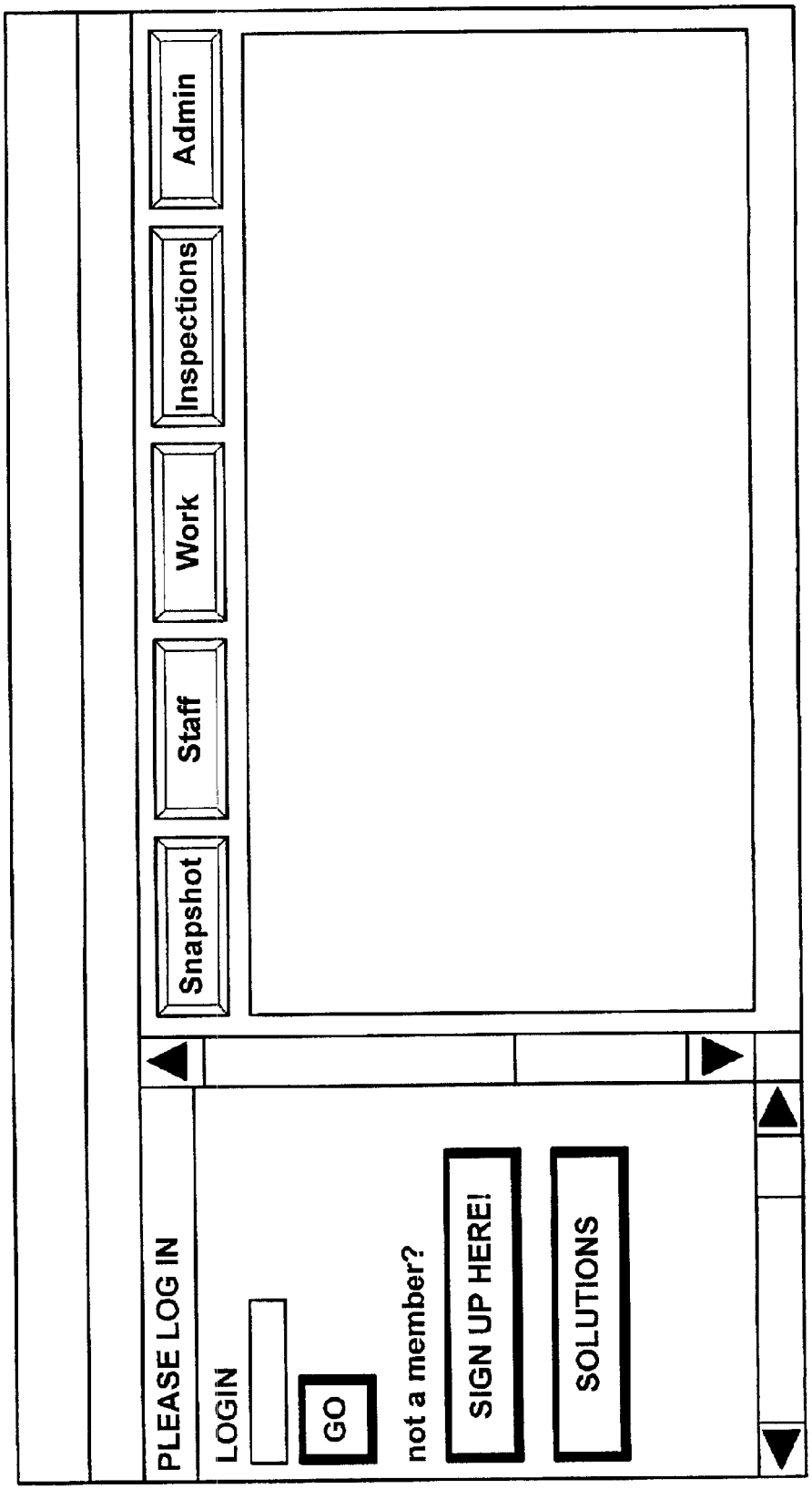
FIG. 17 is an exemplary web site dialog box for a web site user in accordance with a preferred embodiment of the present invention.

Further, according to an exemplary embodiment, the central manager server 130 provides additional features that may be accessible to users using an access device such as a personal computer or a mobile device such as a personal digital assistant or a mobile telephone having web-browsing capabilities. According to an exemplary embodiment, a user may access the central manager server 130 and view a web page to view work schedules and observe the current work status. A supervisory user may also be enabled to place a work order, or view site performance statistics or staff data. FIG. 17 provides an example of a display page illustrating an exemplary login display page 900 that may be used for web access. Using the dialog boxes of display page 900, an existing user may access site records using the user's identification number.

As noted above, in one embodiment of the present invention, when a user logs in using his/her identification number, the central management server 130 determines the user's level of access to a hierarchy of data associated with customer record 208 shown in FIGS. 3 and 5. Based on a user's hierarchy level, the user is given an access to a predetermined set of facility records. For example, display access box 1002 reflects a hierarchy of facilities for a customer based on the customer record data of FIG. 5. The ACCESS data structure of the customer record indicates the USER ID values for user's who have access to data for the customer. A LEVEL field indicates the level of access that the corresponding user is permitted.

In the example of FIG. 5, USER ID=30 is associated with LEVEL=131. Therefore, server 130 permits the user with USER ID=30 to have access to the data for the facility having FACILITY ID=131, which includes the work schedules indicated in the facility record 204 for the facility. However, the user with USER ID=30 is restricted from accessing the data for other entities at the same level of the data hierarchy, e.g. any other facility, or data for entities higher up in the hierarchy, e.g. a region or the customer as a whole. To continue the example, USER ID=56 is associated with LEVEL=110, which corresponds to REGION ID=110. Server 130 therefore permits the user with USER ID=56 to have access to the data for the region corresponding to REGION ID=110, which includes the facilities having FACILITY ID values 131, 133 and 134, but not to the data for other regions, such as REGION ID=111 or 112, or for the customer as a whole. Similarly, USER ID=88 is associated with LEVEL=355, which corresponds to CUSTOMER ID=355 and permits the user to have access to all data for the customer, but not to the data for other customers. The hierarchy of data is illustrated in display box 1002 of FIG. 18, where users having varying levels of access may be permitted to see the entire hierarchy or may be restricted to only seeing the portion of the hierarchy to which they have access.

One aspect of this feature of the present permits multiple customers to be supported by server 130 while maintaining the security of each customer's data.

Figure 18:
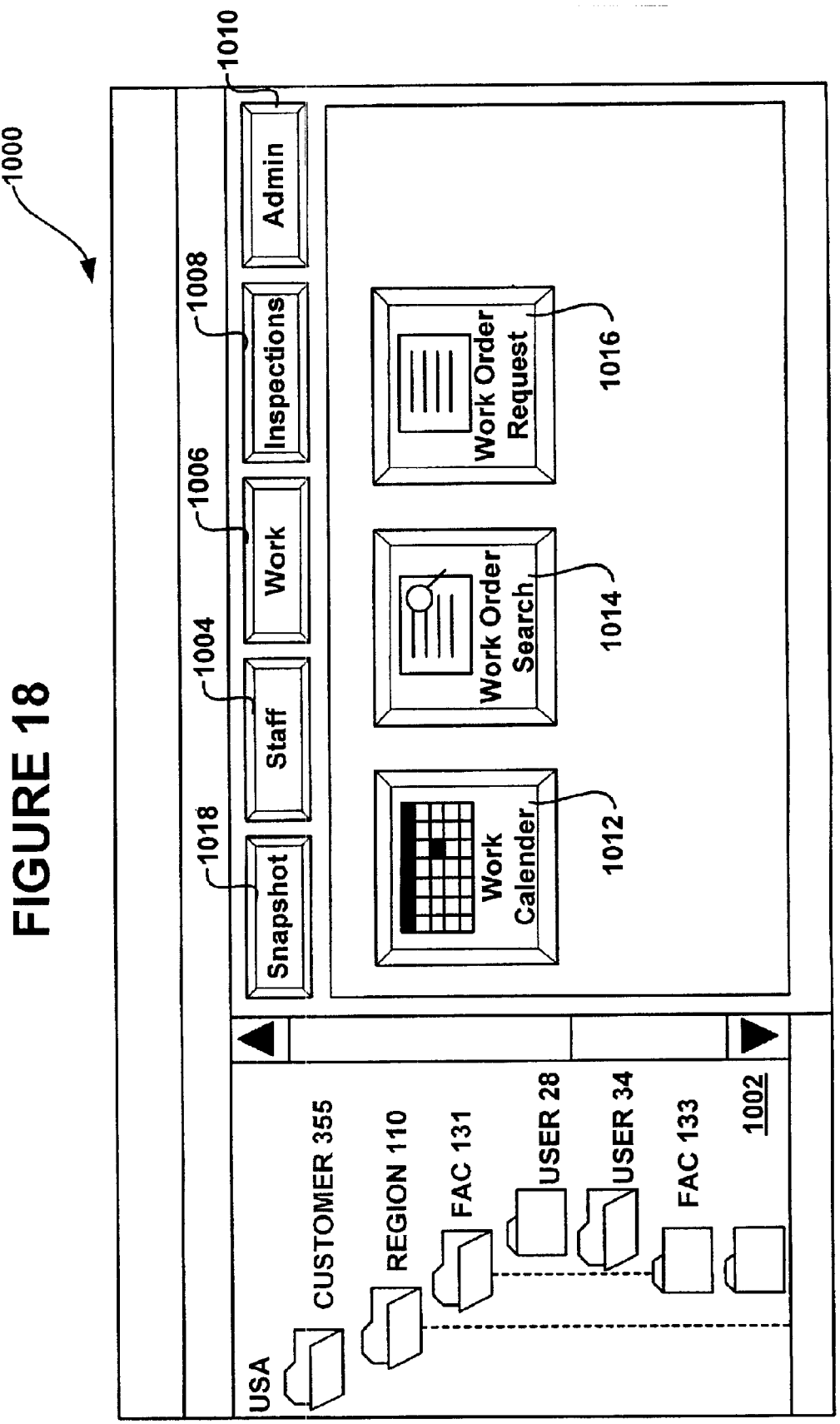
FIG. 18 is an exemplary web site dialog box that may be displayed to a user upon authenticating the user accordance with a preferred embodiment of the present invention.

The display page 1000 further includes a number of exemplary selection icons such as a staff icon 1004, a work icon 1006, an inspection icon 1008 and an administration icon 1010. FIG. 18 illustrates an embodiment in which the user has selected the work icon 1006 and, thus, the dialog box 1000 includes a number of work sub-icons such as a work calendar icon 1012, a work order search icon 1014 and a work order request icon 1016. If a user selects the work calendar icon 1012, the central management server 130 retrieves from the database 140 a calendar, which allows the user to view all work orders and task records that are scheduled for a specific facility. In the embodiment illustrated in FIG. 18, a user with access to a particular facility may view a work calendar for the facility by selecting the work calendar icon 1012.

FIG. 19 illustrates an exemplary work calendar 1100 for a user with facility level access. As illustrated in FIG. 19, a user may select a month and a year to view a work calendar for each day in the selected month. Further, the user may select an icon associated with any task in the work calendar to view a detailed history record for the task. According to an exemplary embodiment, the user may access the daily work schedule for the facility. Alternatively, a user may be permitted to view his current work schedules spanning for several days via the EMI unit 112 displaying the work calendar 1100 of FIG. 19.

Referring back to FIG. 18, the work order search icon 1014 allows a user to access a search engine configured to search work orders using, for example, a work order date. FIG. 20 is a display page 1200 illustrating an example of a detailed work order record for an escalator cleaning task at a facility known as "Store 1*b*" constructed, according to one embodiment of the present invention. The work order record enables a user to view the progress of a task. As illustrated in FIG. 20, an escalator-cleaning task was scheduled by the central management system server 130 on August 21, and the task was tagged as "Due" on September 10. The task record further indicates that the task record was opened on an EMI unit at the "Store 1*b*" location on September 10 and then successfully completed and approved. The task was then approved and closed by the central management system 130.

Referring back to FIG. 18, the work order request icon 1016 enables a user to enter new work orders including tasks to be performed at a predetermined facility. For example, a supervisory user may add a task to a facility record and to a user record in order to schedule the task for completion by the user corresponding to the user record. Other embodiments may permit the supervisory user to identify the task as a one time only task or a recurring task that is regularly scheduled by processes in server 130.

A user may also access staff records by selecting the staff icon 1004 illustrated in FIG. 18. Similarly to the embodiment described in reference to the work icon 1006, when a user selects the staff icon 1004, the user may be given an access to a number of staff sub-icons such as a staff performance icon, a staff list icon, a staff compliance icon, a staff work status icon, a staff work status trend icon, a staff work status ranking icon, or a staff shift assignment icon. Based on an icon selection, a user may be given access to a predetermined set of records. For example, if a user selects a staff performance icon, the user is given an access to staff performance records.

According to an exemplary embodiment, the central management server 130 generates staff performance records based on details about the percent of work orders cancelled, rescheduled, or completed. The staff performance records may then be compiled for each facility level. For example, a staff performance record may be compiled for a predetermined facility location or a predetermined region including multiple facilities, and a user with a predetermined access level may, for example, request an overall staff performance record for a predetermined facility location, region or country. Alternatively, the user may request a performance record for a predetermined user. In one embodiment, a performance record may be provided to a user as a bar graph or a line chart illustrating an overall performance for a facility or a staff member.

Additionally, by selecting the staff icon 1004, the user may view work status trends and work status ranking records for all staff members at a predetermined facility level or, alternatively, for individual staff members. A work status trend record may include a graphical representation of the work status trends, and may take a form of a line chart graph or a bar graph. For example, a work status trend graph may illustrate a percentage of tasks that have been cancelled, rescheduled, or completed by a predetermined staff member or a crew at a predetermined facility or at a group of facilities. Similarly, a work status ranking record may also include a graphical representation record. For example, a work status ranking graph may illustrate a rank of a predetermined facility compared to other facilities in terms of a specific task condition such as a number of task cancelled or rescheduled at a predetermined facility compared to other facilities, for example. Referring back to FIG. 18, the central management server 106 may generate a work status ranking graph for all stores in a region, for example, and a user may request a work status ranking graph illustrating an overall completion or cancellation of scheduled tasks at a predetermined facility compared to other facilities. According to an exemplary embodiment, the central management server 130 may dynamically generate work status ranking and trend records based on a user's selection of a facility level.

The inspections icon 1008, when selected, invokes inspections records such as inspections data entry records. FIG. 21 is an exemplary dialog box 1250 illustrating an inspection record. The inspection record indicates task/work order inspection information for each task scheduled for the facility. As illustrated in FIG. 21, the dialog box includes information whether an inspection has been performed for a predetermined task or a group of task as well as an inspection status such as passed or failed, and comments. The comments may be accessed by selecting a "comments" icon illustrated in FIG. 21.

Referring back to FIG. 18, the snapshot icon 1018, when selected, may invoke a work schedule to be performed by a user.

Further, according to an exemplary embodiment, the central management server 130 may be configured to optimize the operation of a facility. The central management server 130 may provide preventive maintenance services to customers having one or more facilities managed by the central management server 130. In one embodiment, the preventive maintenance may include scheduling regular inspections for a facility to pinpoint problems before they occur. For example, the management server 130 may schedule making repairs on a planned basis to avoid unexpected breakdowns.

In one embodiment, the central management server 130 may be configured to schedule a preventive maintenance task to be performed at facility 110, for example. In one embodiment, the server 130 may send an alert message to a user for which the task has been scheduled to alert the user that a new preventive maintenance task was scheduled. When the user accesses EMI 112, the user will be alerted to the added task and may view the scheduled preventive maintenance task. Alternatively, a supervisory user may be alerted to the added task and the supervisory user may then assign the task to one or more other users. Alternatively, the user may place a new work order for the preventive maintenance task, and the server 130 may schedule one or more users to perform the preventive maintenance task at the first facility 110. A preventive task's status may be updated and provided to a user via EMI 112. Similarly to other tasks, the server 130 may keep track of a preventive maintenance task's status and alert supervisory user if a task status is late.

With regard to alerts, in one embodiment of the present invention, alerts may be escalated for a variety of reasons. For example, if a task has been scheduled for completion by a first user and the task has not been completed by a first deadline, e.g. a given time or date, then the status of the task may be updated to overdue by the system, e.g. server 130, and the first user may be alerted to remind him that the task has not yet been completed. The alert may appear as a text message inserted into the MESSAGE field of the user record 202 for the first user. Alternatively, a supervisory user may be alerted when the task is updated to overdue or the supervisory user may be alerted after the task has not been completed by a second deadline, where the supervisory user is alerted by inserting a text message into the user record 202 for the supervisory user.

EMI unit—Central Management Server Communications

FIG. 22 is a flow chart illustrating an exemplary method 1300, according to one embodiment of the present invention, for providing a work schedule from a central management server to a client device located at a first facility. The exemplary method 1300 will be described in reference to the system architecture 100 illustrated in FIG. 1. However, it should be understood that the exemplary method 1300 is not limited to the devices shown in FIG. 1 and could be implemented using more, fewer, different or equivalent devices.

Referring to FIG. 22, at step 1302, the central management server 130 receives a first set of information defining tasks to be performed and scheduled at the first facility 110.

In one embodiment, a user, such as a supervisory user, may place a work order including the first set of information by accessing a web page associated with the central management server 130. In an alternative embodiment, the user may place the work order at a call center. A call center staff member may then access the central management server 130 to place a work order request using the web-based interface such as illustrated in reference to FIG. 18.

In yet another embodiment, the present invention may be linked to an external application system that generates electronic work tickets for a facility, which are input to server 130 for assignment and distribution according to method 1300. Examples of external applications systems that may be suitable for use with the present invention include Enterprise Asset Management (EAM) systems, Computer Maintenance Management Systems (CMMS), or Computer Aided Facility Management (CAFM) systems. The present invention then distributes the work orders to users for completion. The completion data collected by the present invention may then be sent back to the work order ticket system to provide tracking of completion for the external system.

In still another alternative embodiment, server 130 includes processes for generating the tasks according to a predetermined schedule or according to a set of work rules relating to a customer or region corresponding to the facility. The work rules used to generate the work schedules may be customized to each customer, to a region or to a facility. In this way, work rules, such as those provided by an expert system, may be used to provide effective work schedule profiles for customer facilities. In one embodiment, server 130, at step 1302, determines the tasks to be performed for each facility for a given date and updates the facility record 204, illustrated in FIGS. 3, and 4, for each facility to include the TASK ID for each of the tasks to be performed at the facility. Server 130 may also generate a task record 206 for each task to be performed.

At step 1304, the central management server 130 generates a first work schedule for a first user selected to perform the first work schedule at the first facility 110. In one embodiment, server 130 selects a set of tasks for the first user. The server then updates the user record 202 for the first user to include the TASK ID for each one of the set of tasks. The server also updates the facility record 204 for the facility to associate the USER ID of the user selected to complete a task with the TASK ID in the facility record.

In one embodiment, prior to generating the first work schedule for the first user, the central management server 130 may generate a list of tasks to be performed at the first facility for an approval by a facility user associated with a predetermined hierarchy level. In one embodiment, a facility manager may be given an access to approve or reject tasks provisioned for scheduling for the first facility 110. The facility user may approve tasks to be performed at the first facility 110 by accessing a predetermined web page on the central management server 130. For example, the central management server 130 may be configured to display a list of tasks to be approved by the facility user upon authentication of that user. When the facility user approves some or all tasks to be performed at the first facility 110, then the central management server 130 generates the first schedule for the first user. In this way, a high level user may control and distribute the work schedules for facilities and the users performing tasks at those facilities.

At step 1306, the central management server 130 receives a work schedule request for the first user from a client device at the first facility 110. According to an exemplary embodiment, the client device is the EMI unit 112. Further, the work schedule request includes user identification data such as a user identifier, and an EMI identifier, e.g. FACILITY ID, as discussed above. In one embodiment, the work schedule assigned in the user's user record is sent to the client device for display to the user. Alternatively, the work schedule generated at step 1304 may be triggered by a user login. In this approach, the tasks assigned to a facility in a facility record are assigned when users login. In this way, higher priority tasks may be assigned to users as they log in to the system to ensure that the higher level tasks are scheduled for completion before lower priority tasks. For example, tasks may appear in the facility record 204 in order of priority and assigned in order as users login during step 1306.

At step 1308, the central management server 130 authenticates the first user. In one embodiment, in addition to determining whether a user is authorized to request a work schedule, the central management server 130 may determine whether the user should be given an access to a facility location from which the user has requested the work schedule. The central management server 130 may determine the current location of the user using the EMI identifier that was sent along with the work schedule request. Further, the central management server 130 may determine whether the user should be given an access to the facility location using user records stored in the database 140 as well as a work schedule record generated for the first user. In an alternative embodiment, the mechanism of determining the current location of a user may be beneficial in an embodiment in which the user is scheduled to perform in one day a number of tasks at different facility locations. In such an embodiment, when the user accesses the central management system 104 from a predetermined location, the central management system 104 retrieves from the database 140 a partial work schedule for the user including tasks to be performed by the user at the user's current location.

At step 1310, the central management server 130 determines whether the first user has been successfully authenticated. If the user's authentication is successful, at step 1312, the central management server 130 sends the first work schedule to the client device (EMI unit 112) at the first facility 110. As described in reference to step 1308, if the first user is scheduled to perform tasks at different facilities, the first work schedule sent to the first facility may be a partial work schedule including task scheduled to be performed by the first user at the first facility 110. Referring back to step 1310, if the first user fails the authentication, the method 1300 terminates.

At any one of steps 1304, 1308 or 1312, server 130 may also include checking the user record 202 for the user to determine whether a MESSAGE text field is populated with a message for output to the user. Likewise, either of these steps may include determining whether the user should receive instructions related to completion of the assigned tasks. For example, the INSTRUCT field of the user record may be set to yes by a supervisory user, which will cause the instructions for each task to be generated for the user at the EMI 112. Alternatively, the ERRORCOUNT field may be checked and, if the value of ERRORCOUNT is greater than a predetermined threshold, then the instructions will be output to the user. The MESSAGE or instruction data may then be sent to the client device at the first facility along with the work schedule.

FIG. 23 is a flow chart illustrating a method 1400 for requesting and receiving work schedules at a client device. At step 1402, a client device, such as the EMI unit 112, establishes a communication link with a central management server, such as the server 130. At step 1404, the EMI unit 112 receives the authentication data, such as a USER ID number from a user. In one embodiment, illustrated in reference to FIG. 12, the user may enter the identification number via a touch-screen interface on the EMI unit 112. Alternatively, the EMI unit 112 may include a card reader, a voice recognition device, a keypad, pen-based input device or other means for receiving authentication data from a user.

At step 1406, the client device sends a work schedule request to the central management server. In one embodiment illustrated in FIG. 1, the EMI unit 112 sends the request to the central management server 130, and the work request includes the user's authentication data (USER ID) appended to the EMI identifier (FACILITY ID). At step 1408, the EMI unit 112 receives a first work schedule from the central management server 130. According to an exemplary embodiment, the work schedule includes an icon-based graphical user interface depicting at least one task of a work schedule to be performed by the first user at the first facility 110. At step 1410, the EMI unit 112 displays the icons for the work schedule to the first user, and the method 1400 terminates.

Figure 24:
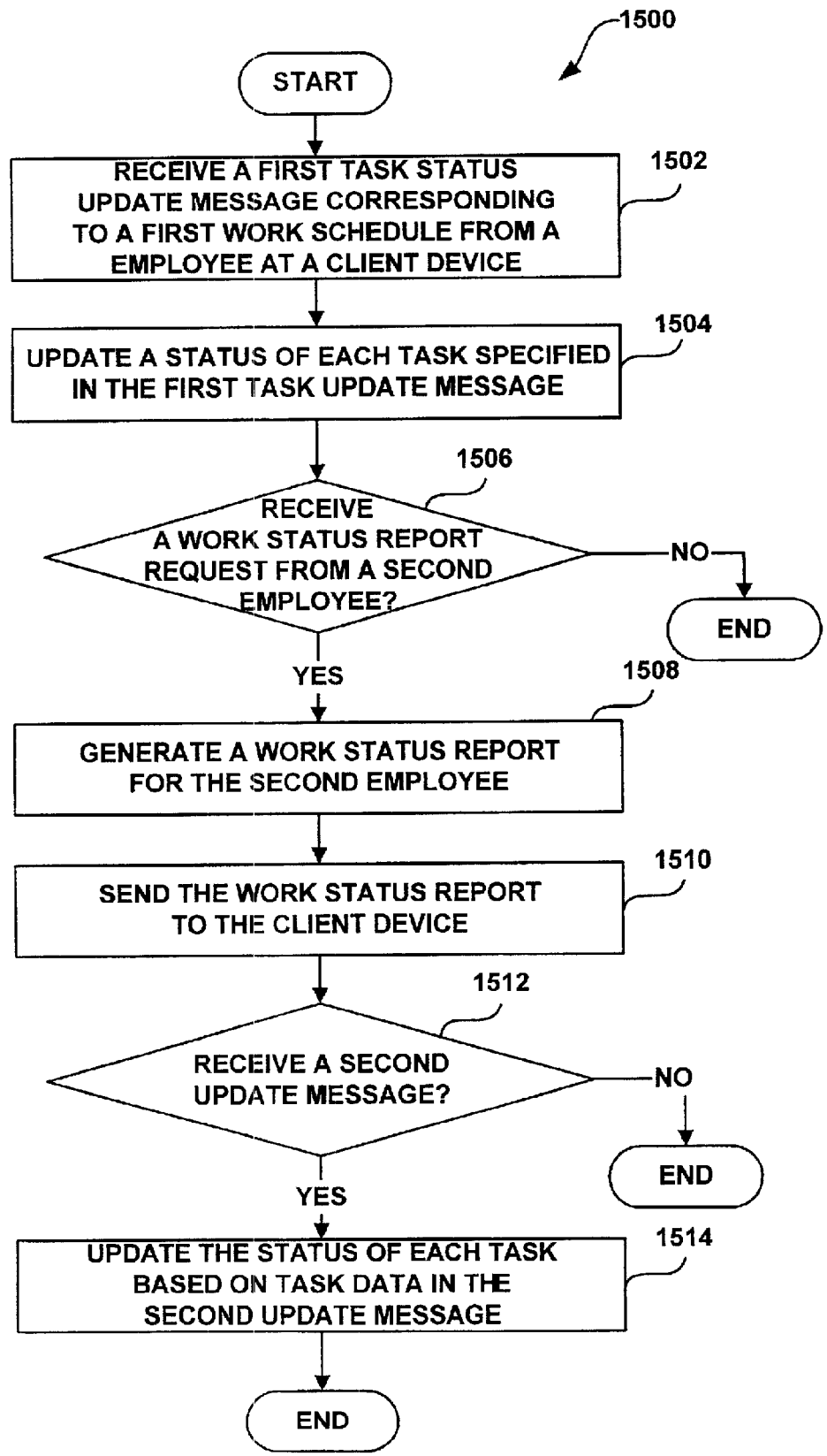
FIG. 24 is a flow chart illustrating a method for managing task status records on a central management server to a client device in accordance with a preferred embodiment of the present invention.

FIG. 24 is a flow chart illustrating a method 1500 for managing task status records on a central management server, such as the central management server 130. At step 1502, the central management server 130 receives from a client device, such as the EMI unit 112, a first task status update message corresponding to a first work schedule associated with a first user. Similarly to the method discussed in reference to FIG. 23, the first user may access the EMI unit 112 by inputting his/her identification data. Subsequently, upon a successful authentication, the EMI unit 112 may display to the first user an icon-based representation of tasks scheduled for the first user along with a number of task status icons for each task, such as a "Done" or "Not Done" icons, for example. The first user may then update a status of each task displayed on the EMI unit 112 via the touch screen 112 or other data input devices. When the user updates the status of all or some tasks, then the EMI unit 112 sends the task status update message to the central management server 130.

At step 1504, the central management server 130 updates the status of each task specified in the first task status update message received from the EMI unit 112. According to an exemplary embodiment, the central management server 130 may retrieve from the database 140 a task record 206 for each task specified in the first update message. Further, if the first user has completed a task, the central management server 130 modifies a STATUS field in the task record from a scheduled to a completed identifier. Similarly, if the first user has not completed a task, the central management server 130 modifies the STATUS field in the task record to a task uncompleted identifier. The server 130 may also be configured to identify the USER ID of the user who updates the STATUS field.

At step 1506, the central management server 130 determines whether a request is received from a second user via the EMI unit 112 for a work status update report. According to an exemplary embodiment, a user having a predetermined hierarchy (access) level, such as a supervisory user, may request a work status report including task status data for each user being managed by the supervisory user.

Upon a successful authentication of the second user, at step 1508, the central management server 130 generates a work status report for the second user based on a hierarchy level associated with the second user. For example, if the second user, according to the user records stored in the database 140, manages other users, then the work status report generated on the central management server 130 includes task status data associated with the work schedules for the four other users and the supervisory user.

At step 1510, the central management server 130 sends the work status report to the EMI unit 112. According to an exemplary embodiment, when the EMI unit 112 receives the work status report, the EMI unit 112 displays the report on the touch screen 112, and the second user may change a status of each task in the work status report. Similarly to the work schedules, the work status report may also be displayed on the EMI unit 112 in the icon-based format including icons describing specific tasks as well as task status icons such as a "Task Approved" icon or a "Task Rejected" icon, for example. See FIG. 21 for an example of a view screen 1250 for updating status for tasks.

At step 1512, the central management server 130 determines whether a second update message including task update data has been received from the second user. In one embodiment, the EMI unit 112 is configured to incorporate the updated status for each task updated by the second user into a second update message and, further, responsively send the message to the central management server 130.

When the central management server 130 receives the second update message from the EMI unit 112, at step 1514, the central management server 130 updates the status for each task specified in the second update message. In one embodiment, the central management server 130 may update a task completed identifier to a task rejected identifier, or a task completed identifier to a task approved identifier in a task record. Subsequently, the method 1500 terminates.

Note that the server 130 may also be configured to store the USER ID of the supervisory user who updates the STATUS field. The server 130 may be further configured to maintain a history for a task by linking a data structure that indicates each STATUS change, the USER ID for the user, and the date and time for the status change. FIG. 20 indicates an example of the resulting update history for a task.

Figure 25:
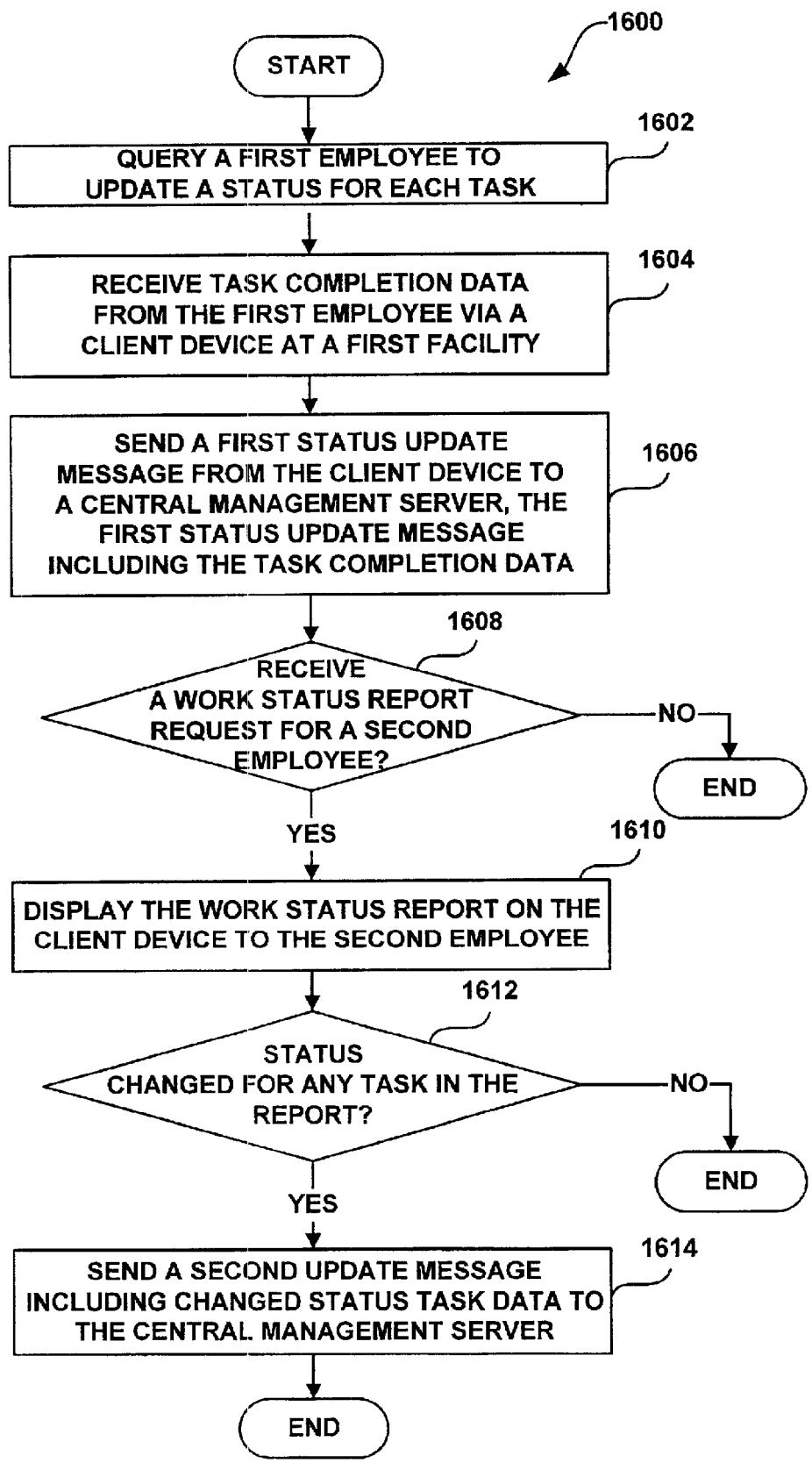
FIG. 25 is a flow chart illustrating a method for receiving task status data at a client device in accordance with a preferred embodiment of the present invention.

FIG. 25 is a flow chart illustrating a method for receiving task status data on a client device such as the EMI unit 112. At step 1602, the EMI unit 1602 queries a first user to update status of each task in the user's schedule. According to an exemplary embodiment, the first user may access the EMI unit 112 at the end or during a user's shift by inputting his/her identification data. Subsequently, upon a successful authentication of the first user, the EMI unit 112 may display to the first user an icon-based representation of tasks scheduled for the first user along with a number of task status icons for each task, such as "Done" or "Not Done" icons, for example. See the view screen of FIG. 16 for an example of an icon based screen page for a user to update the status of the tasks in the user's work schedule.

At step 1604, the EMI unit 112 receives task completion data from the first user. The first user may update a status of each task displayed on the EMI unit 112 via the touch screen 112. When the user updates the status of all or some tasks, at step 1606, the EMI unit 112 sends a first status update message to the central management server 130. According to an exemplary embodiment, the first status update message includes the task completion data received from the first user.

At step 1606, the EMI unit 112 sends a first status update message to server 130, which uses the task completion data from the update message to update the corresponding task record in remote database 140.

In one embodiment, a second user, such as a supervisory user, may send a request for a work status report involving the first user's tasks in order to perform an inspection stage. The second user may have a predetermined hierarchy level (such as a supervisory access level) that allows the second user to receive the work status report. According to an exemplary embodiment, the second user may request the work status report via the EMI unit 112. In such an embodiment, the second user may login to the system using a user's identification number and selecting the "Check-Out" selection icon 404. At step 1608, server 130 receives the request for a work status report. In such an embodiment, when the central management server 130 successfully authenticates the second user as a supervisory user at the first facility 110, the central management server 130 retrieves work status records based on the hierarchy level of the second user. For example, if the second user supervises three users, the central management server 130 retrieves the status for tasks associated with the three users as well as the supervisory user, and compiles the retrieved records into a work status report that is sent to the EMI unit 112.

Referring back to FIG. 25, if the EMI unit 112 receives a work status report from the central management server 130 at step 1608 and returns a work status report, then, at step 1610, the EMI unit 112 displays the work status report to the second user on the touch screen 112, and the second user may change a status of each task in the work status report. Similarly to the work schedules, the work status report may have an icon-based format including icons describing specific tasks as well as task status icons such as a "Done" icon, a "Not Done" icon, for example.

At step 1612, the EMI unit 112 determines whether the second user has changed status for any task specified in the task status report. According to an exemplary embodiment, the changing of status for a task may include approving or rejecting tasks that have been performed by a lower hierarchy user or updating a task status to "Done" or "Not Done." If no input has been received from the second user, the method 1600 terminates. However, if the EMI unit 112 detects a status change for any task, at step 1618, the EMI unit 112 sends a second update message to the central management server 130. The second update message includes the changed status for the updated tasks, and the method 1600 terminates.

Note that if a second user, e.g. a supervisory user, updates a task record STATUS field from, from a completed state to a not-completed or rejected state, then server 130 may be configured to increment the ERROR COUNT field of the user record 202 for the first user. Also, the second user may access the user record for the first user and set the INSTRUCT field so that instructions for task completion are automatically displayed to the first user for subsequent work schedule accesses using EMI 112. This approach provides either automatic just-in-time training to the user tasked with completion of a task.

According to an exemplary embodiment, the central management server 130 is configured to monitor and update the status of each task scheduled for one or more users at the first facility 110. The central management server 130 may include an integrated clock to trigger status checks for each scheduled task. The central management server 130 may further change the status automatically for each task. For example, tasks that are performed each night may be automatically updated to complete by the system. On the other hand, tasks that are performed less frequently may be automatically rescheduled by server 130 for completion on another day.

Figure 26:
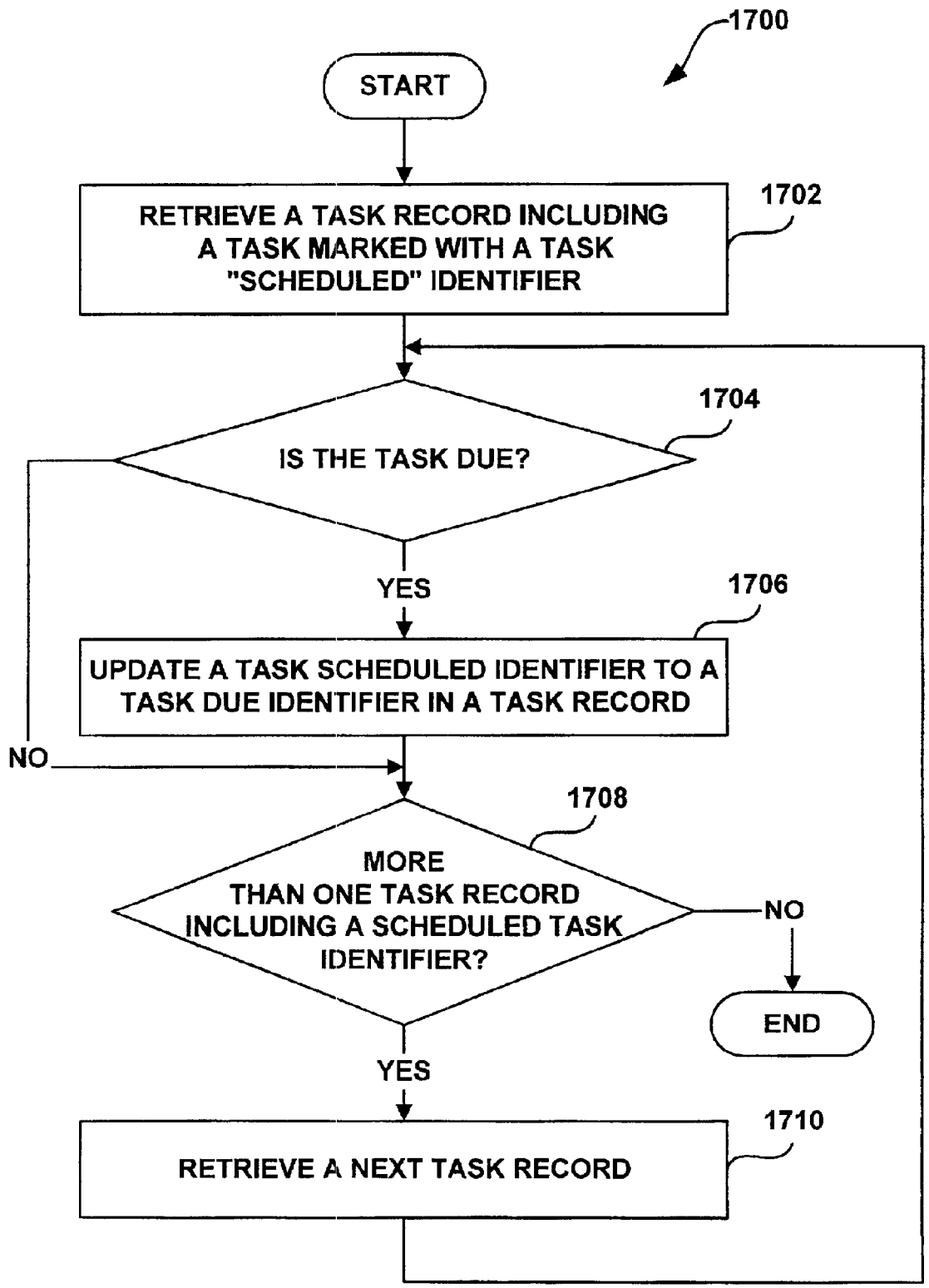
FIG. 26 is a flow chart illustrating a method for updating a task status from "scheduled" to "due" at a central management server in accordance with a preferred embodiment of the present invention.

FIG. 26 is a flow chart illustrating a method for updating a status of a task from "Scheduled" to "Due" on the central management server 130. In one embodiment, tasks that are "Scheduled" are not displayed to the users to whom the tasks are assigned. The tasks are not output to the user for completion until the status of the task is "Due". At step 1702, the central management server 130 retrieves from the database 140 a first task record associated with a "Task Scheduled" identifier.

At step 1704, the central management server 130 determines whether the task in the retrieved task record should be updated with a "Due" identifier. In one embodiment, the central management server 130 may make that determination by applying a number of task due conditions to the retrieved task record. First, the central management server 130 may determine whether the task's date and time in the retrieved task record is earlier and further whether the task's date and time are not the same as the current date and time. If the first two conditions are satisfied, the central management server 130 may determine whether the difference between a task's scheduled start time and the current system's time is smaller than a predetermined task due time constant provisioned on the central management server 130. If the central management server 130 determines that the due date status conditions are satisfied, at step 1706, the central management server 130 updates a status in the retrieved task record from the "Scheduled" to "Due" identifier.

At step 1708, the central management server 106 determines whether the database 140 includes more than one task record including task scheduled status identifiers. If so, the method proceeds to step 1710, where the central management server 130 retrieves the next record, and the method continues at step 1704. The central management server 130 may be configured to periodically carry out the method 1700. For example, the central management server 130 may be configured to schedule a system daemon every 45 minutes to perform the method 1700. Further, the central management server 130 may apply the method 1700 to task records not including task scheduled status identifiers, but having a task start date and time set to an earlier date and time than the current date and time.

A variety of approaches may be employed in configuring method 1700 in a system according to the present invention. In one embodiment, the system may be configured to run method 1700 to check all task records in the database. In another embodiment, the system may be configured to anticipate the tasks that may be updated in a given time period, e.g. all scheduled tasks, and task records corresponding to those tasks may be stored on a stack for processing using method 1700. In still another alternative embodiment, task records scheduled for completion on a given date or during a given time period may be linked to a list for upcoming events that is checked by the system at intervals or in response to a task update message from a user.

Also note that the system of the present invention may be used to manage facilities all over the world and across different time zones. Therefore, times for completion and time-stamping in the system of the present invention are preferably expressed in Greenwich Mean Time (GMT) format. A time offset reference value relating the time zone offset from GMT for each facility may, for example, be included in each facility record to allow tasks for a facility to be converted to a local time for display.

Figure 27:
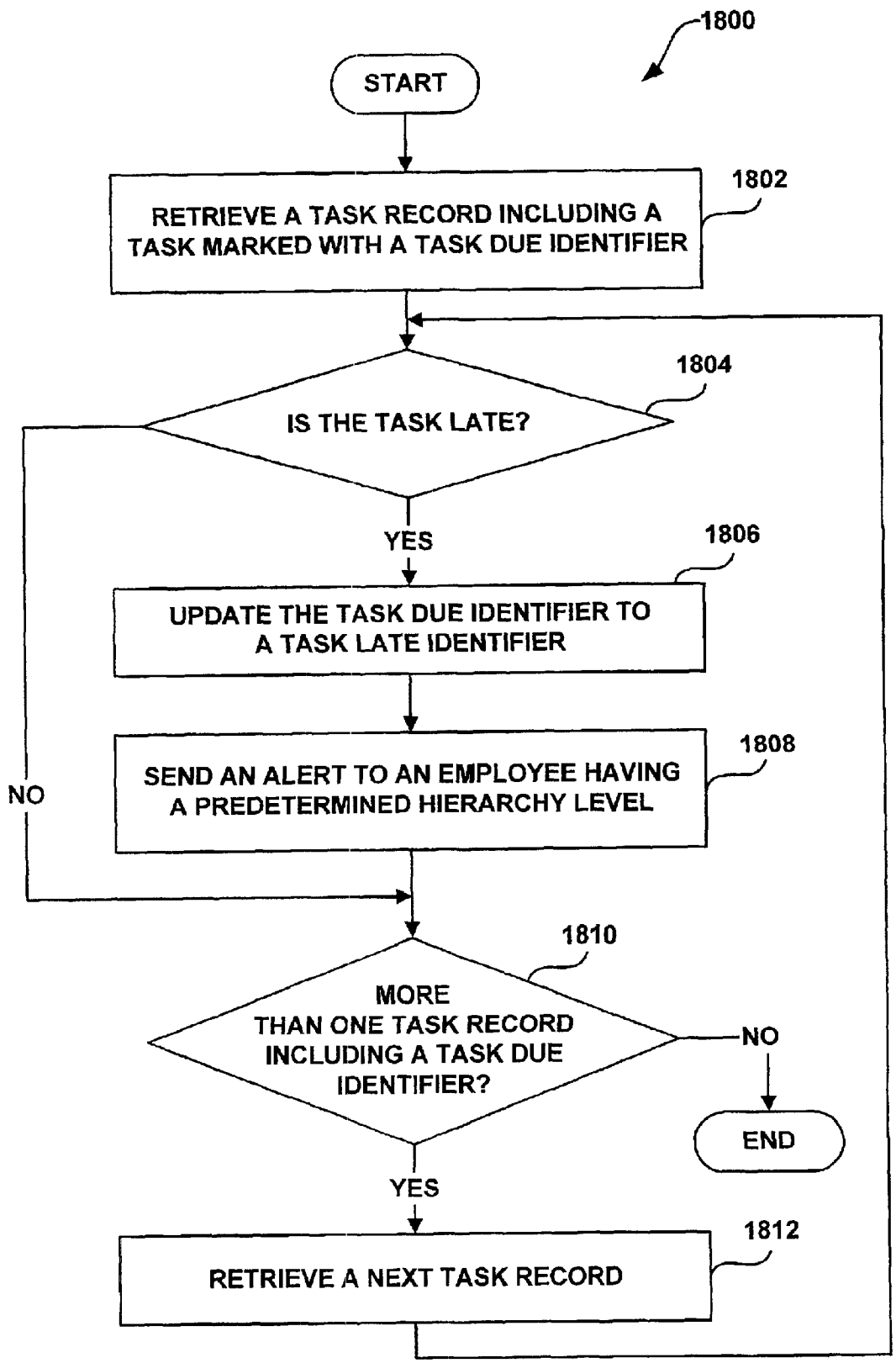
FIG. 27 is a flow chart illustrating a method for updating a task status from "due" to "late" at a central management server in accordance with a preferred embodiment of the present invention.

The central management server 130 is further configured to update a task "Due" identifier to a task "Late" identifier. FIG. 27 is a flow chart illustrating an exemplary method 1800 for updating a status of a task from due to late.

At step 1802, the central management server 130 retrieves from the database 140 a first task records including a task marked with a task "Due" identifier. At step 1804, the central management server 130 determines whether a first retrieved task record should be updated with a task "Late" identifier. According to an exemplary embodiment, the central management server 130 may make that determination by applying a number of task late conditions to task record data. First, the central management server 130 may determine whether the task's date and time in the first task record are earlier and not equal to the current date and time. If the first two conditions are satisfied, the central management server 130 may determine whether the difference between a task's scheduled start time and the current system's time is greater than a task late time constant provisioned on the central management server 130. If the central management server 130 determines that the late status conditions are satisfied, at step 1806, the central management server 130 updates a status in the retrieved task record from the task "Due" identifier to a task "Late" identifier.

Additionally, the central management server 130 may be configured to send an alert message upon determining that a task is late. In such an embodiment, at step 1808, the central management server 130 sends an alert message to a predetermined user, such as a supervisory user at the facility at which the task should be performed. For example, the central management server 130 may first determine a user for whom the task was scheduled. Then, using the user's records and the facility records, the central management server 130 may determine a supervisory user to whom alert messages should be sent for that task. For example, the alert message may include pager messages, cell phone messages or e-mail messages depending on a hierarchy level of the supervisory user and urgency level of the alert. The alert may also be placed in the MESSAGE field of the user record 202 for the supervisory user. Note that the present invention may be configured to generate an alert message based upon a variety of predetermined state changes and not just a transition to a late state.

Alternatively, the alert message may be sent to a predetermined set of users. The set of users may, for example, be determined by an additional data structure that identifies the set of users or through extension of the task record for a task or the user record for a user assigned to the task to identify the set of users to receive the alert message. Similarly, a hierarchy of users for purposes of escalating the alert message at intervals may also be derived from the hierarchy of users defined in the customer record, through additional data structures, or through extension of existing data structures.

At step 1810, the central management server 130 determines whether the database 140 includes more than one task record including tasks marked with task "Due" identifiers. If so, at step 1812, the central management server 130 retrieves a next task record from the database unit 124, and the method 1800 continues at step 1804. The method continues until the central management server 130 evaluates all task records including task "Due" identifiers.

According to the exemplary methods 1500 and 1600 described in reference to FIGS. 24 and 25, a user associated with a predetermined hierarchy level may approve or reject tasks performed by other users, thus, triggering a task status change process on the central management server 130. Further, the central management server 130 may be configured to close approved tasks.

Figure 28:
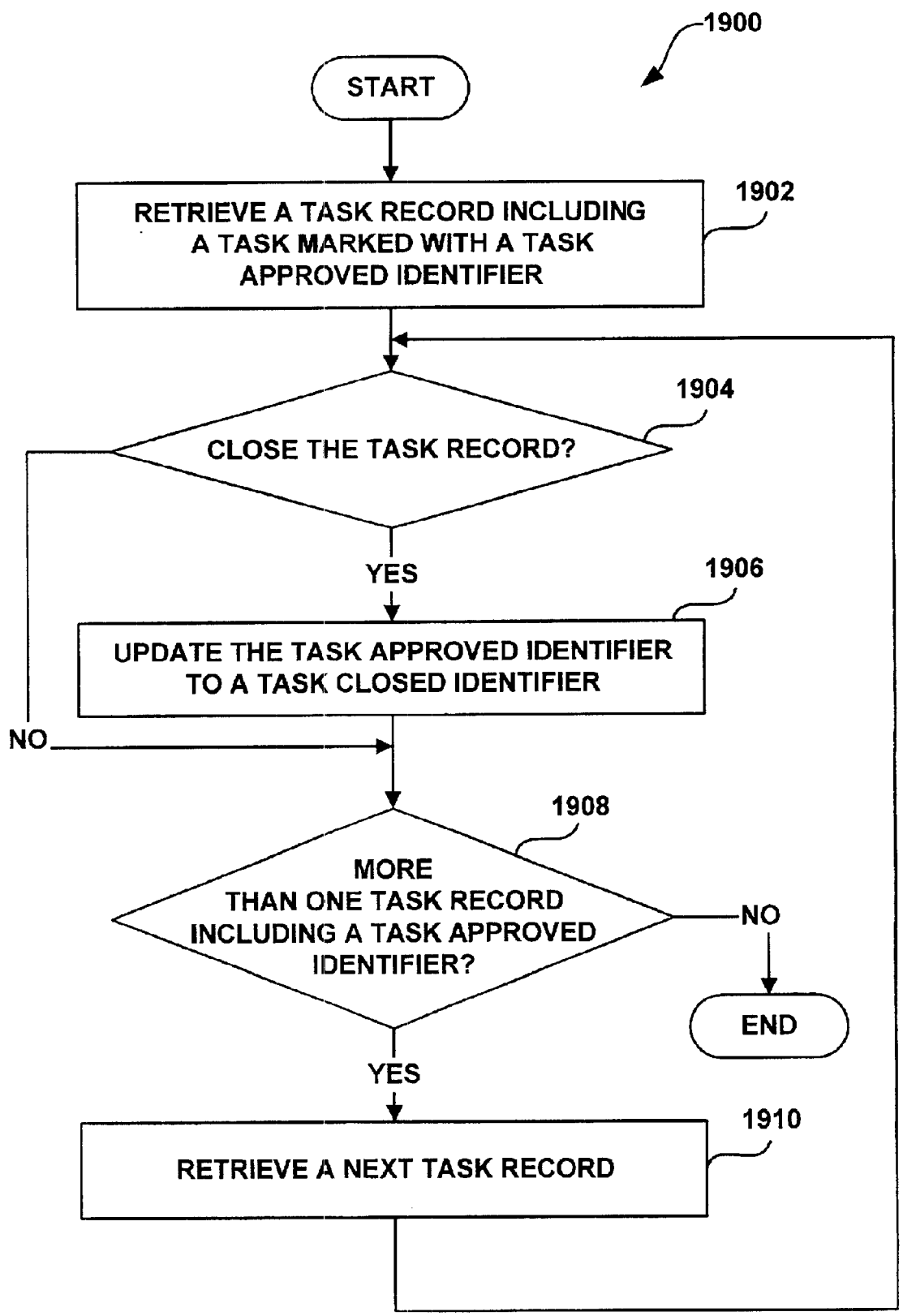
FIG. 28 is a flow chart illustrating a method for updating a task status from "approved" to "closed" at a central management server in accordance with a preferred embodiment of the present invention.

FIG. 28 is a flow chart illustrating a method 1900 for updating a task "Approved" identifier to a task "Closed" identifier. At step 1902, the central management server 130 retrieves from the database 140 a first task record including a task marked with a task "Approved" identifier. At step 1904, the central management server 130 determines whether the first retrieved task record associated with the task "Approved" identifier should be closed. According to an exemplary embodiment, the central management server 130 may make that determination by applying a task closed condition to task data stored in the first task record. According to an exemplary embodiment, the central management server 130 determines whether the task record should be closed by comparing the current system time with a task completion time set in the task record. If the current system time is greater than a task completion time specified in the first task record, at step 1906, the central management server 130 updates the task "Approved" identifier in the first task record to a task "Closed" identifier.

At step 1908, the central management server 130 determines whether the database 140 includes more than one task record including task "Approved" identifiers. If so, at step 1910, the central management server 130 retrieves a next task record including a task approved identifier, and the method 1900 continues at step 1904. Otherwise, the method 1900 terminates.

Figure 29:
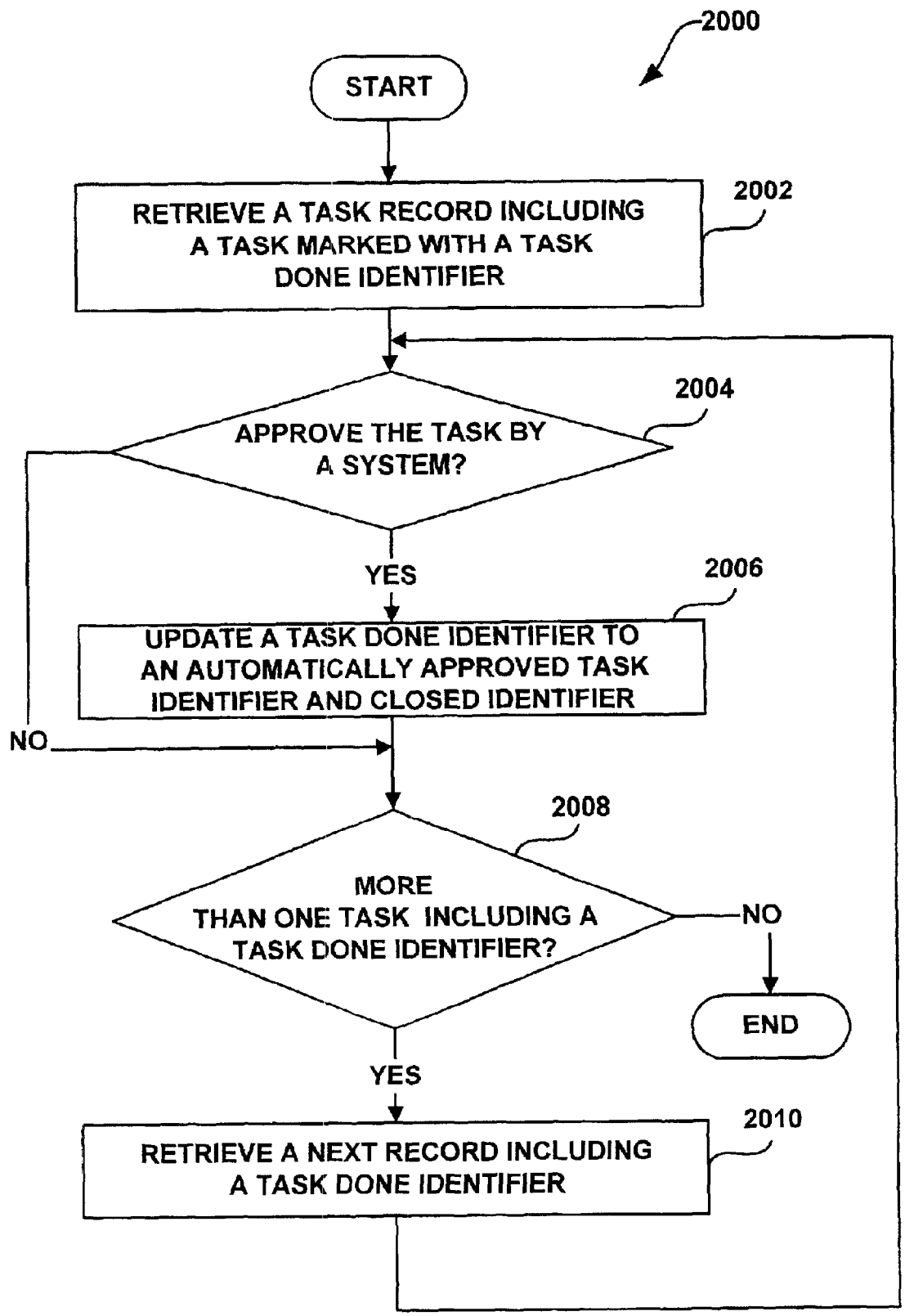
FIG. 29 is a flow chart illustrating a method for forcefully approving a task status by a central management server in accordance with a preferred embodiment of the present invention.

According to an exemplary embodiment, if the central management server 130 does not receive task approval or rejection data from a supervisory user, the central management server 130 may be configured to system-approve and close such tasks. FIG. 29 is a flow chart illustrating a method 2000 for automatically approving a task by the server. At step 2002, the central management server 130 retrieves from the database 140 a first task record including a task marked with a task "Done" identifier. At step 2004, the central management server 130 determines whether the task should be approved by the system. According to an exemplary embodiment, the central management server 130 may compute a difference between the task completion time and the current time. Further, the central management server 130 may compare the calculated time difference with a predetermined closing time period provisioned in the database 140 for automatically approving tasks by the central management server 130.

If the calculated time period is greater than or equal to the predetermined time period, at step 2006, the central management server 130 updates a task done identifier to a task "Automatically Approved" identifier. The central management server 130 may be further configured to update a task record including a task "Automatically Approved" identifier with a task "Closed" identifier.

At step 2008, the central management server 130 determines whether the database 140 includes any other task records including task "Done" identifiers. If so, the central management server 130 retrieves a next record, and the method 2000 continues at step 2004. If no additional task records are found in the database 140, the method 2000 terminates.

As noted briefly above, the present invention may be interfaced with external systems that may, for example, generate work order ticket records that are sent to the system according to the present invention for assignment, distribution, and display to users. When users update task status or the system automatically updates status or reschedules a task, it may be advantageous in some embodiments to configure the system according to the present invention to provide the updated status to the external system. Thus, the present invention may be employed to track and collect status data from distributed users and facilities and provide the status data as feedback to an external system. For example, in one embodiment of the present invention, the system may be configured to send a message containing updated status to an external system responsive to completion or approval of a task, e.g. at steps 1906 or 2006 above.

Figure 30:
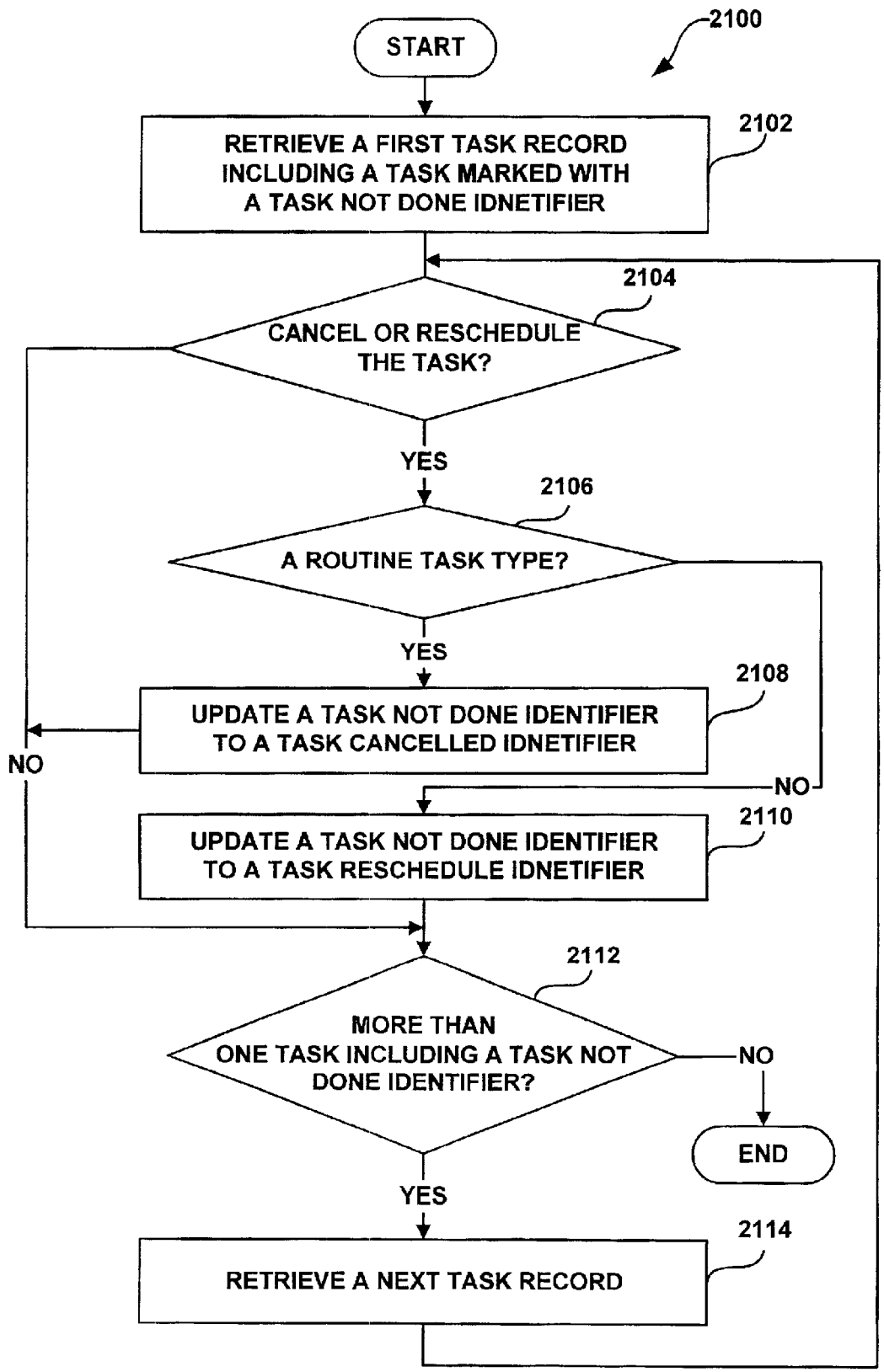
FIG. 30 is a flow chart illustrating a method for canceling and closing uncompleted tasks at a central management server in accordance with a preferred embodiment of the present invention.

Further, according to an exemplary embodiment, the central management server 130 is configured to reschedule or close uncompleted tasks. An uncompleted task may be identified in a task record with a task "Not Done" identifier. FIG. 30 is a flow chart illustrating a method 2100 for updating task records associated with uncompleted tasks. The uncompleted tasks may include tasks associated with task "Cancelled" identifiers, "Open" identifiers, or "Not Done" identifiers.

At step 2102, the central management server 130 retrieves a first task record including an "Uncompleted" task identifier, for example. At step 2104, the central management server 130 applies a number of rules to determine whether the task qualifies for rescheduling or cancellation. According to an exemplary embodiment, one rescheduling rule may include instructions for the central management server 130 to determine whether the difference between the current time and task completion time specified in the record is greater than zero and less than or equal to a work completed lead time value provisioned in the database 140. Another rule may include instructions for the central management server 130 to determine whether the difference between the current time and the task completion time is less than zero and further whether the current time is less than a task start time. According to an exemplary embodiment, if either rule is satisfied, the method 2100 proceeds to step 2106.

At step 2106, the central management server 130 determines whether the task is a routine task. According to an exemplary embodiment, the task record may include an identifier classifying a task as a routine task. If the central management server 130 determines that the task is a routine task, at step 2108, the central management server 130 updates the task identifier to a task "Canceled" identifier and subsequently to a task "Closed" identifier. Referring back to step 2106, if the task is not a routine task, at step 2110, the central management server 130 updates the task identifier to a task "Reschedule" identifier. According to an exemplary embodiment, the central management server 130 may be configured to subsequently reschedule the task.

At step 2112, the central management server 130 determines whether the database 140 includes more than one task record with uncompleted task identifiers. If so, at step 2114, the central management server 130 retrieves a next task record, and the method 2100 continues at step 2104. If the database 140 does not include any more records, the method 2100 terminates. Similarly to the proceeding methods, the central management server 130 may be configured to periodically execute the method 2100.

Figure 31:
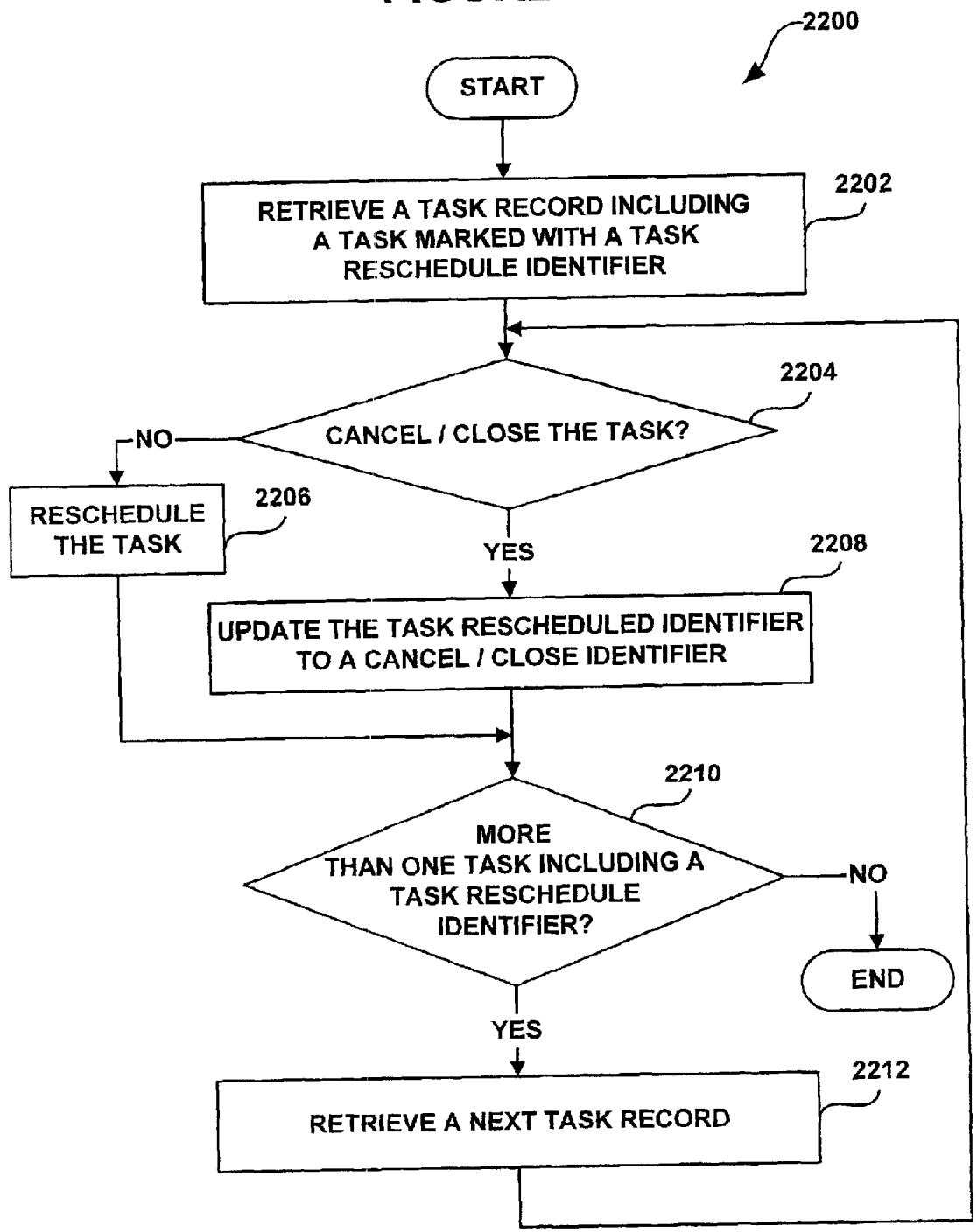
FIG. 31 is a flow chart illustrating a method for updating a task records associated with a task "reschedule" identifier at a central management server in accordance with a preferred embodiment of the present invention.

FIG. 31 is a flow chart illustrating a method 2200 for updating task records associated with task "Reschedule" identifiers.

At step 2002, the central management server 130 retrieves from the database 140 a first task record including a task marked with a task "Reschedule" identifier. At step 2004, the central management server 130 determines whether the first task record should be closed. According to an exemplary embodiment, the central management server 130 makes that determination by applying task closed conditions to task data stored in the first task record. According to an exemplary embodiment, the central management server 130 determines whether the task should be canceled and subsequently closed by determining whether the next occurrence of the same task at a predetermined facility for which the task was scheduled has a task date and time greater than the current task date and further whether the next occurrence status is not scheduled, due or in process. If the conditions are satisfied, at step 2208, the central management server 130 updates the task "Reschedule" identifier to a task "Cancel" and subsequently to a task "Closed" identifier. Otherwise, at step 2206, the central management server 130 reschedules the task by adding the task to the work schedule in the facility record for the facility and the user record for a user corresponding to another day.

At step 2210, the central management server 130 determines whether the database 140 includes more than one task record with task "Reschedule" identifiers. If so, at step 2212, the central management server 130 retrieves the next task records, and the method 2200 continues at step 2204. Otherwise, the method 2200 terminates.

Figure 32:
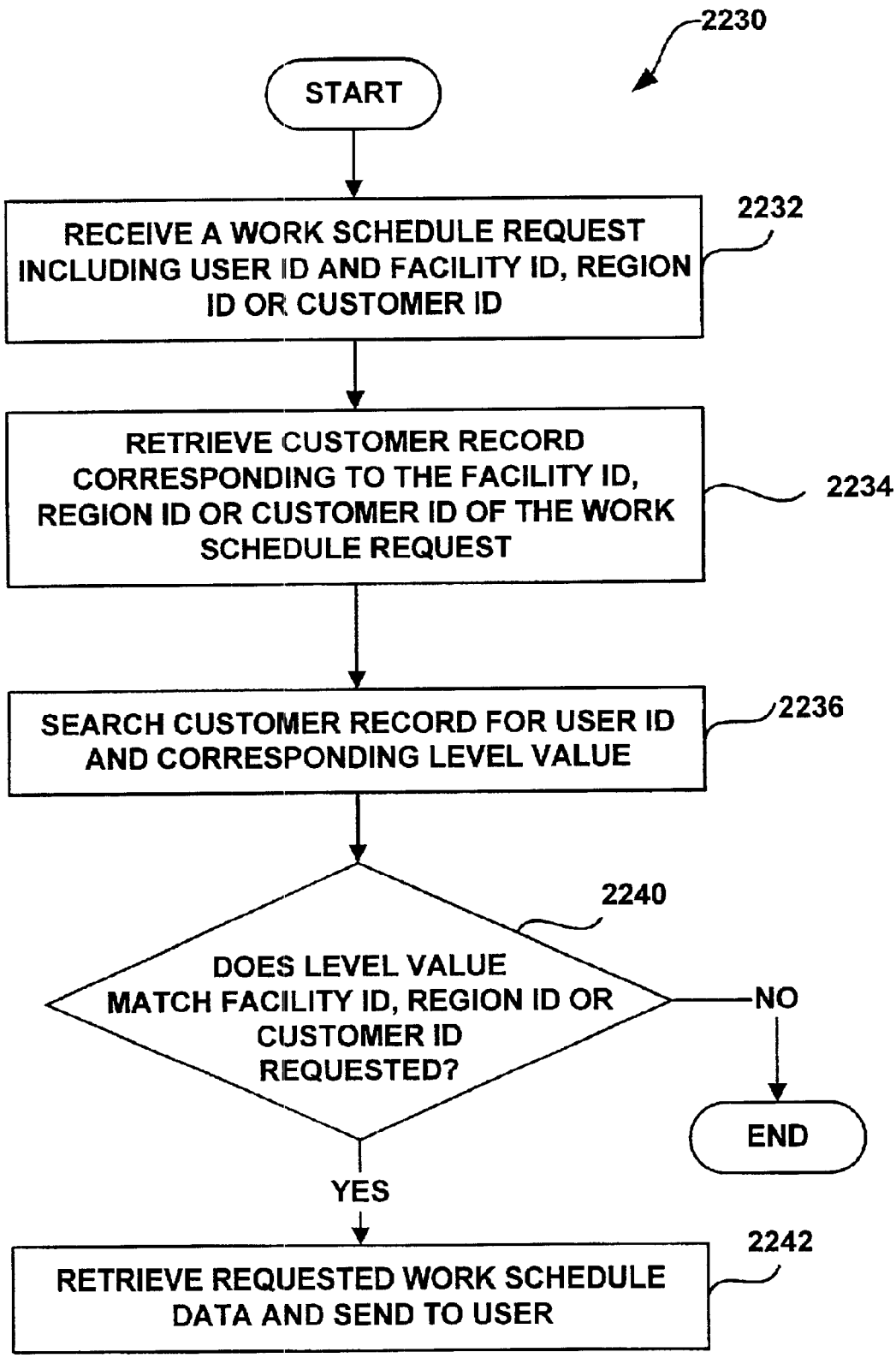
FIG. 32 is a flow chart illustrating a method for controlling access to customer data based upon a permitted access level of a user relative to a hierarchy of the customer data in accordance with a preferred embodiment of the present invention.

As noted above, one aspect of the present invention pertains to controlling the access level of a user within a hierarchy of work schedule and status data. FIG. 32 is a control flow diagram illustrating one embodiment of a process 2230, according to the present invention, for controlling access of a user submitting a work request. Process 2230 is entered when a work schedule request is received at step 2232 by server 130. Alternatively, the request may relate to a status report. The work schedule request includes the USER ID for the user making the request along with either a FACILITY ID, REGION ID or a CUSTOMER ID depending upon the level of user and the level of access requested.

At step 2234, server 130 retrieves the customer record 208 corresponding to the FACILITY ID, REGION ID or a CUSTOMER ID in the request received at step 2232. Server 130 will search the ACCESS structure of each customer record 208 looking for a match on one of the USER ID, FACILITY ID, REGION ID or a CUSTOMER ID, or a combination of these values.

As discussed above, an end user is restricted to access to his own work schedule data. In the example data of FIG. 5, the users with USER ID=34 and USER ID=28 have their corresponding ACCESS fields in the customer record for CUSTOMER ID=355 set to their own USER ID values. Thus, at step 2234, server 130 will discover the customer record for CUSTOMER ID=355 during its search and, at step 2240, server 130 will limit the access of the users with USER ID=34 and USER ID=28 to their own work schedules, which may be obtained from either the facility record for the facility requested or the user record for each user, along with a check of the FACILITY ID sent along with the work schedule request to ensure that the users are logging in from the correct facility.

However, if a higher level user, such as the users with USER ID values 30, 56 and 88, login, they are entitled to higher levels of access, as indicated in the ACCESS fields of the customer record 208 for CUSTOMER ID=355. A search of customer records at step 2234 will result in the customer record for CUSTOMER ID=355 being discovered and retrieved. The LEVEL value in the customer record for USER ID=30 is 131, which corresponds to FACILITY ID=131. Thus, at step 2240, the user with USER ID=30 will be permitted to access the work schedule and status data for that facility, which may be obtained from the facility record for FACILITY ID=131. The LEVEL value in the customer record for USER ID=30 is 131, which corresponds to FACILITY ID=131. Thus, at step 2240, the user with USER ID=30 will be permitted to access the work schedule and status data for that facility, which may be obtained from the facility record for FACILITY ID=131. Along the same lines, the LEVEL value in the customer record for USER ID=56 is 110, which corresponds to REGION ID=110, which the customer record indicates includes FACILITY ID values 131, 133 and 134. Thus, at step 2240, the user with USER ID=56 will be permitted to access the work schedule and status data for those facilities, which may be obtained from the facility records for FACILITY ID=131, 133 and 134. To continue the example, the LEVEL value in the customer record for USER ID=88 is 355, which corresponds to CUSTOMER ID=355. Thus, at step 2240, the user with USER ID=88 will be permitted to access the work schedule and status data for all the facilities under all the regions indicated in the customer record.

Note also that the hierarchy of data available to a user may be provided to that user graphically. For instance, a login by the user with USER ID=88 may result in server 130 providing a display such as that shown in dialog box 1002 of FIG. 18, wherein the user is able to see folder icons representing the customer level, region level and facility level. By contrast, a login by the user with USER ID=56, corresponding to REGION ID=110, would result in the display of the folder for REGION ID=110 and FACILITY ID=131, 133 and 134 in dialog box 1002. Still further, a login by the user with USER ID=30, corresponding to FACILITY ID=131, would result in the display of a folder just for FACILITY ID=131. The work status data or display of data structure is sent to the user at step 2242. Note that the example data folders and structure shown in dialog box 1002 are based upon the example data shown in FIG. 5.

Note that restricting access to data in accordance with this aspect of the present invention allows server 130 to service multiple customers, such as CUSTOMER ID=355 and 441, while maintaining the work schedule and status information for each customer in confidence. Also, by permitting a high level of access to a high level user using web access, the high level user is able to monitor and communicate with other users throughout the hierarchy. For example, a user with access at the customer level may broadcast a message to all users performing work for that customer by inserting a text message into the MESSAGE field of the user record of each user listed in the customer record for the customer. FIG. 33 illustrates one embodiment of a process 2250 for broadcasting a message according to this aspect of the present invention. At step 2252, server 130 receives a request for a broadcast message from a high level user. At step 2254, server 130 uses either the USER ID of the requesting user or the USER ID in combination with an identifier, such as CUSTOMER ID, REGION ID, or FACILITY ID, that indicates the breadth of the facilities to which the broadcast message must be sent, e.g. all users associated with CUSTOMER ID, all users associated with REGION ID, or all user associated with FACILITY ID. Using these values, the corresponding customer record may be obtained in order to validate user access to the requested facilities. If the user has valid access, then, at step 2256, server 130 collects all the USER ID values in the customer record that correspond to the requested breadth of broadcast and, at step 2258, the corresponding user records are retrieved. Then, at step 2260, the broadcast message text can then be inserted into the MESSAGE field of each user record. During subsequent login sessions, each user will receive a display of the content of the MESSAGE field, such as in the display field 530 shown in FIG. 13, for example, and the message is broadcast to the desired users.

Further, by collecting work status information in accordance with one aspect of the present invention, feedback may be provided from the activities of a large number of employees to a high level supervisory user. Also, large amounts of data may be conveniently and efficiently compiled for further processing and analysis. Likewise, the collected data may also be useful in benchmarking and for return on investment analysis.

The work status information collected from various facilities using the present invention may also be used to compare performance data from different facilities or regions. Access to the performance data may be restricted based on the user level and data hierarchy as described elsewhere in this specification. Comparison of performance data allows contractors and suppliers for different facilities to be evaluated against one another. Also, different regions and facilities may be evaluated against one another.

The present invention as described above may also be adapted to track time and attendance data for users. Server 130 may be adapted to store the time when a user logs in or logs out from the system. This data may be used to maintain employee attendance records and also to measure time for hourly paid employees.

Also note that the present invention may be adapted to perform automatic inventory management. By collecting work completed status and applying models regarding the consumption of supplies for completion of work, the present invention may be employed to automatically reorder supplies needed to complete the tasks. For example, if a model indicates that a given predetermined number of floor waxings for a facility having a given number of square feet in area may be performed with a given amount of supplies, then server 130 may be configured to automatically generate a work order or a purchase order when the predetermined number of waxings has been reached or is about to be reached.

Note that the work schedules discussed above may be more generally regarded as tasks. For example, the tasks may correspond to specific work jobs that must be performed or may more generally apply to inspection tasks, equipment checks, or reminder tasks. For example, a task may be defined that corresponds to a delivery of product or supplies that may be assigned to a user in order to warn the user and allow him to plan for handling the delivery.

Similarly, the present invention is not limited to users who perform work at a particular facility. The teachings above may be adapted to identify a user based upon a role or function performed by that user. For example, rather than using a FACILITY ID, the user may be provided with a ROLE ID that corresponds to a facility record or to another specialized data structure that identifies the tasks assigned to the user. For example, a user may be an electrician who is tasked with replacing light bulbs at several facilities, not just one. Server 130 may be configured such that this user's ROLE ID permits the user to obtain a work schedule for all of his work tasks across facilities for a given day from any EMI device at any of the facilities that he services. Alternatively, the user may be restricted to seeing just those tasks that correspond to the FACILITY ID from which the user logs in, but an alert message may be provided to remind the user to check for other tasks at other facilities. Overall view of a work schedule may be restricted to a different device that sends the ROLE ID value in a login message to server 130.

Along similar lines, server 130 may be adapted to automatically generate tasks for specialized user by applying, for example, a maintenance or wear model to particular equipment. For example, a use model may indicate that standard lubrication should be performed on an air-conditioning compressor that has been in use for 1000 hours. Server 130 may keep track of when each compressor when into service and its number of hours in use and, when the limit under the model has been reached, automatically generate a lubrication task for an air-conditioning maintenance user.

In still another alternative embodiment of the present invention, both the task records and the user records may include a ROLE attribute. In this embodiment, tasks may be assigned a ROLE attribute value based upon the skills or expertise required to perform the task. Likewise, users may be assigned a ROLE attribute value based upon the skills or expertise possessed by the user. In assigning tasks to users, the present invention may be configured to assign tasks to users based upon skills by matching the ROLE attribute value of each task to the ROLE attribute value of an assigned user. For example, a task that requires an electrician to complete may have a ROLE value of "Electrician". Similarly, a user who is a certified electrician will have a ROLE value of "Electrician". When assigning the task to a user, the system will search the user records for a user record with the ROLE attribute set to "Electrician" before assigning the task to that user. This functionality may, for example, be integrated into step 1304 of FIG. 22 discussed above. This aspect of the present invention allows the system to automatically match the available skills of the users with the skills required to complete a given task. This aspect of the present invention also allows users to be assigned based upon their skill sets in order to make efficient use of skilled employees.

Building on one aspect of the present invention discussed above, alert messages themselves may be treated as tasks. An alert message would be structured as a task assigned to a user. The user would receive the alert message from server 130 just like any other task when the user logs in. The user's acknowledgement of the alert message would be an update of the status for the task in remote database 140. Failure to acknowledge the alert message could cause server 130 to flag the failure to complete the task and automatically alert another user in the supervisory/administrative hierarchy. Alternatively, an alert message task may be completed simply by virtue of its delivery to the user. Also note that the message may take other forms than text, such as graphical or audio files.

Another aspect of the present invention that was touched on briefly above is that the present invention permits tasks to be generated for all members of a specific level of the data hierarchy described above. For example, each user who is a facility manager for a particular customer may have the same profile of tasks to be performed or may start with the same profile and then have it customized for the specific needs of the particular facility. This allows a common profile of tasks to be applied to a number of entities, e.g. facilities, at the same hierarchical level or to determine a common profile of tasks for a branch of the data hierarchy, e.g. a region. Also, the present invention allows common instructions for tasks to be created in order to try to achieve a common standard of work performance across entities. By allowing a common profile to be applied across multiple entities also allows a high level user to quickly and easily modify the profile applies to the multiple entities. Thus, improvements in practices may be quickly propagated throughout a customer's or region's facilities.

It should be understood that the programs, processes, methods and systems described herein are not related or limited to any particular type of computer or network system (hardware or software), unless indicated otherwise. Various types of general purpose or specialized computer systems may be used with or perform operations in accordance with the teachings described herein.

In view of the wide variety of embodiments to which the principles of the present invention can be applied, it should be understood that the illustrated embodiments are exemplary only, and should not be taken as limiting the scope of the present invention. For example, the data structures described herein may be altered to store data in different formats and in different manners from those discussed above without departing from the teachings of the present invention. Also, the present invention may be employed using various types of client and server devices capable of communicating and transferring data via wide area networks. Further, the steps of the flow diagrams may be taken in sequences other than those described, and more or fewer elements may be used in the block diagrams. While various elements of the preferred embodiments have been described as being implemented in software, in other embodiments in hardware or firmware implementations may alternatively be used, and vice-versa.

It will be apparent to those of ordinary skill in the art that methods involved in the system and method for managing work may be embodied in a computer program product that includes a computer usable medium. For example, such a computer usable medium can include a readable memory device, such as, a hard drive device, a CD-ROM, a DVD-ROM, or a computer diskette, having computer readable program code segments stored thereon. The computer readable medium can also include a communications or transmission medium, such as, a bus or a communications link, either optical, wired, or wireless having program code segments carried thereon as digital or analog data signals.

The claims should not be read as limited to the described order or elements unless stated to that effect. Therefore, all embodiments that come within the scope and spirit of the following claims and equivalents thereto are claimed as the invention.

What is claimed is:

1. A web-based work management system, the system comprising:

a central management server configured to communicate through a wide area network, the central management server being configured to maintain a set of tasks to be scheduled and performed at a first facility, where each task has associated therewith a graphical icon representing the task, the central management server being further configured to allocate a first subset of tasks to a first user for performance of the tasks, and where the central management server is further configured to receive a first request message corresponding to the first user and, responsive thereto, transmit a first work schedule message that includes the icons corresponding to the first subset of tasks; and a first client device corresponding to the first facility, the first client device being configured to communicate with the central management server through the wide area network, where the first client device includes a user interface for receiving user input and displaying user data, where the first client device is configured to receive a login request from the first user and, responsive thereto, transmit the first request message corresponding to the first user, and where the first client device is further configured to receive the first work schedule message and, responsive thereto, display the icons received in the first work schedule message.

2. The web-based work management system of claim 1, where:

each graphical icon representing a task includes a status dialog box that may be selected to update a status of the task;

the first client device is further configured to display the status dialog box with each of the icons received in the first work schedule message, and where the first client device is configured to detect selection of the status dialog box with respect to a selected one of the icons received in the first work schedule message and, responsive thereto, send a task update message that identifies the task corresponding to the selected one of the icons associated with the selected status dialog box and the status of the task; and the central management server is further configured to receive the task update message and, responsive thereto, update a task record corresponding to the task identified in the task update message with the status of the task identified provided in the task update message.

3. The work management system of claim 2, where the central management server is further configured to receive a status request from a supervisory user for the status of the first subset of tasks, verify that the supervisory user is permitted access to the status of the first subset of tasks, and return a status reply message to the supervisory user.

4. The work management system of claim 3, where the central management server is further configured to receive a status update request from the supervisory user that requests a change of the status of at least one of the first subset of tasks and, responsive thereto, update the task record corresponding to the at least one of the first subset of tasks.

5. The work management system of claim 4, where the central management server is further configured to detect whether the change of the status of the at least one of the first subset of tasks is a rejection of a completed task and, responsive thereto, create an alert message for output to the first user.

6. The work management system of claim 5, where the central management server is further configured to include the alert message for output to the first user into a subsequent request message from the first user.

7. The work management system of claim 2, where the central management server is further configured to detect an uncompleted task in the first subset of tasks and, responsive thereto, reschedule the uncompleted task.

8. The work management system of claim 1, where:

each graphical icon representing a task includes an instruction dialog box that may be selected to request an instruction corresponding to the task;

the first client device is further configured to display the instruction dialog box with each of the icons received in the first work schedule message, and where the first client device is configured to detect selection of the instruction dialog box with respect to a selected one of the icons received in the first work schedule message and, responsive thereto, send an instruction request message to the central management server that identifies the task corresponding to the selected one of the icons associated with the selected instruction dialog box, and where the first client device is further configured to receive an instruction file from the central management server and display the instruction file to the first user; and the central management server is further configured to receive the instruction request message and, responsive thereto, obtain the instruction file corresponding to the task identified in the instruction request message and transmit the instruction file to the first client device.

9. The work management system of claim 1, where:

each graphical icon representing a task includes an instruction dialog box that may be selected to request an instruction corresponding to the task;

the first client device is further configured to display the instruction dialog box with each of the icons received in the first work schedule message, and where the first client device is configured to detect selection of the instruction dialog box with respect to a selected one of the icons received in the first work schedule message and, responsive thereto, send an instruction request message to the central management server that identifies the task corresponding to the selected one of the icons associated with the selected instruction dialog box, and where the first client device is further configured to receive an instruction file from the central management server and display the instruction file to the first user; and the central management server is further configured to receive the instruction request message and, responsive thereto, obtain the instruction file corresponding to the task identified in the instruction request message and corresponding to a preselected language associated with the first user, and transmit the instruction file to the first client device.

10. The work management system of claim 1, where:

each graphical icon representing a task includes a map dialog box that may be selected to request a map corresponding to the task;

the first client device is further configured to display the map dialog box with each of the icons received in the first work schedule message, and where the first client device is configured to detect selection of the map dialog box with respect to a selected one of the icons received in the first work schedule message and, responsive thereto, send a map request message to the central management server that identifies the task corresponding to the selected one of the icons associated with the selected map dialog box, and where the first client device is further configured to receive a map file from the central management server and display the map file to the first user; and the central management server is further configured to receive the map request message and, responsive thereto, obtain the map file corresponding to the task identified in the map request message and transmit the map file to the first client device.

11. The work management system of claim 1, where:

the central management server is further configured to receive a message file for delivery to the first user and to transmit the message file to the first client device; and the first client device is further configured to receive the message file and, responsive to a login request by the first user, display the message file.

12. The work management system of claim 11, where the central management server is further configured to permit a supervisory user to generate the message file for delivery to the first user.

13. The work management system of claim 1, where:

the central management server is further configured to allocate a second subset of tasks to a second user for performance of the tasks, and where the central management server is further configured to receive a second request message corresponding to the second user and, responsive thereto, transmit a second work schedule message that includes the icons corresponding to the second subset of tasks; and the first client device is further configured to receive a login request from the second user and, responsive thereto, transmit the second request message corresponding to the second user, and where the first client device is further configured to receive the second work schedule message and, responsive thereto, display the icons received in the second work schedule message.

14. The work management system of claim 13, where the central management server is further configured to restrict the first user from accessing the second subset of tasks and to restrict the second user from accessing the first subset of tasks.

15. The work management system of claim 1, where the central management server is further configured to generate the set of tasks in accordance with a first set of policies corresponding to a first customer associated with the first facility.

16. The work management system of claim 15, where the central management server is further configured to generate another set of tasks in accordance with a second set of policies corresponding to a second customer.

17. The work management system of claim 1, wherein the first client device includes a browser application for displaying data from messages from the central management server and the central management server is further configured to provide messages to the first client device that are compatible with the browser application.

18. The work management system of claim 1, where the first client device includes one of a touch screen interface device, a pen-based input device, a keypad input device, and a card-swipe device.

19. A method for managing work at a facility, the method comprising:

receiving a first message on a central management server, the first message including a first set of information including tasks to be scheduled and performed at a first facility;

generating a first work schedule for a first user selected to perform the first work schedule at the first facility;

sending a second message from the central management server to the first facility, the second message including the first work schedule;

receiving a third message on the central management server from the first facility, the third message including task status update data corresponding to the first work schedule;

updating a status of each task in the first work schedule based upon the task completion data received in the third message; and sending a fourth message from the central management server to the first facility, the fourth message including the status of each task in the first schedule.

20. The method of claim 19, further comprising the steps of:

receiving a first work status request message from the first facility on the central management server;

compiling the status for the first work schedule into a first work status report; and sending the first work status report to the first facility.

21. The method of claim 20, further comprising the steps of:
receiving a second task update message including a changed status for a selected task of the first work schedule shown in the first status report;
updating the status for the selected task based on the changed status received in the second task update message.

22. The method of claim 21, where the step of receiving a first message on a central management server further comprises receiving a first on a central management server from an external application, where the first message includes a first set of information generated by the external application, the first set of information including tasks to be scheduled and performed at a first facility.

23. The method of claim 22, the method including the step of sending the changed status for the selected task to the external application.

24. The method of claim 20, further comprising the steps of:
monitoring a status of each task specified in the first work schedule using the task status update data received from the first facility;
detecting that the status for a task indicates that the task is uncompleted; and
rescheduling the uncompleted task responsively to detecting the uncompleted task status.

25. The method of claim 24, further comprising the step of sending an alert message from the central management server to a manager of the first facility associated with the uncompleted task.

26. The method of claim 20, further comprising the step of generating performance statistics for the first facility using data from the first work schedule and task update messages from the first facility.

27. The method of claim 20, further comprising the steps of:
generating a second work schedule for a second facility managed on the central management server; and
storing the second work schedule and status for each task specified in the second work schedule in the database on the central management server.

28. The method of claim 27, generating the first and second work schedules in accordance with a first set of policies corresponding to a first customer associated with the first and second facilities.

29. The method of claim 28, further comprising the step of generating a third work schedule for a third facility associated with a second customer, wherein the third work schedule is generated based on a second set of policies corresponding to the second customer.

30. A method for managing work at a facility, the method comprising:
sending a first message from a first client device to a central management server, the first message defining a first set of information including tasks to be performed and scheduled at the first facility;
receiving a second message from the central management server on the first client device, the second message including a first work schedule for a first user selected to perform the first work schedule at the first facility;
displaying the first work schedule to the first user on an electronic management interface associated with the first client device;
receiving a first user input for a task specified in the first work schedule via the electronic management interface, the user input indicating a task completion;
generating a third message on the first client device, the third message including task completion data corresponding to the first work schedule;
sending the third message from the first client device to the central management server; and
receiving a fourth message from the central management server on the first client device, the fourth message including status of each task in the first work schedule.

31. The method of claim 30, further comprising the steps of: receiving a request for a first work status report from a supervisory user via the electronic management interface;
sending a first work status request from the first client device to the central management server responsive to receiving the request from the supervisory user;
receiving a first work status report from the central management site on the first client device; and
displaying the first work status report to the supervisory user via the electronic management interface.

32. The method of claim 31, further comprising the steps of:
changing a status of a selected task of the first work schedule shown in the first work status report by the supervisory user via the electronic management interface; and
sending a second task update message including the changed status for the selected task from the first client device to the central management server.

33. A fixed location interface unit configured to permit information transfer between an end user and a central management server, the interface unit comprising:
means for establishing a communication link between the fixed location interface unit and the central management server upon activating the fixed location interface unit;
an electronic interface configured to display a first work schedule to a first user and being further configured to receive from the first user task completion status data for each task in the first work schedule; and
a second application configured to generate a first task status update message upon receiving the task completion status data from the first user, the second application being further configured to send the first task status update message to the central management server.

34. The fixed location interface unit of claim 33, wherein the electronic interface includes a browser interface.

35. The fixed location interface unit of claim 34, wherein the electronic interface includes a graphical user interface.

36. The fixed location interface unit of claim 33, wherein the electronic interface includes one of a touch screen interface, a pen-based input device, a keypad input device, and a card-swipe device.

37. The fixed location interface unit of claim 33, further including a third application configured to authenticate the first user before displaying the first work schedule on the electronic interface.

38. The fixed location interface unit of claim 37, wherein the third application comprises a voice recognition application or a card reader application configured to authenticate the first user.

39. The fixed location interface unit of claim 33, wherein the first work schedule displayed to the first user on the electronic interface includes an icon-based work schedule in which each task in the work schedule is represented by a task icon.

40. The fixed location interface unit of claim 39, wherein the icon-based work schedule comprises a color-coded task icon for each task in the first work schedule, the color-coded task icon utilized to define a priority level for each task, a warning regulation for each task or a location of work to be performed for each task at a first facility having the fixed location interface unit.

41. The fixed location interface unit of claim 33, further comprising a fourth application configured to permit a supervisory user to request a first work status report using the fixed location interface unit.

42. The fixed location interface unit of claim 41, wherein the fixed location interface unit is further configured to receive the first work status report from the central management server, the first work status report comprising a work status data generated on the central management server based on a hierarchy level associated with the supervisory user.

43. The fixed location interface unit of claim 42, wherein the electronic interface is further configured to display the first work status report to the supervisory user.

44. The fixed location interface unit of claim 43, wherein the first work status report displayed on the electronic interface comprises on icon-based work status report in which each task specified in the work status report is associated with a task status icon.

45. A central management server configured to manage work on a plurality of facilities, the central management server comprising:
   a database configured to store work schedules generated on the central management server for a plurality of facilities, and further being configured to store a plurality of facility records, a plurality of user records, a plurality of task identifiers for each task specified in the plurality of work schedules, and a plurality of instruction information records for each task;
   a first application configured to receive from a first set of information including tasks to be performed and scheduled for a first facility;
   a second application configured to retrieve a first facility record from the database and generate a plurality of first facility work schedules for a plurality of first facility users selected to perform the tasks at the first facility; wherein the second application stores the plurality of first facility work schedules in the database;
   a third application configured to generate an icon-based schedule for each of the plurality of first facility work schedules, wherein each task specified in the plurality of first facility work schedules is associated with a predetermined task icon;
   a fourth application configured to receive a first work schedule request from a first user at the first facility, wherein the first user requests the first work schedule via a fixed location interface unit configured to permit information transfer between the plurality of first facility users and the central management server, the fourth application further configured to retrieve a first work schedule for the first user and send the first work schedule to the fixed location interface unit configured to display the first work schedule to the first user, wherein the first work schedule comprises a first icon-based work schedule; and
   a fifth application configured to receive a first task status update message corresponding to the first work schedule and, responsive thereto, update a status of each task of the first work schedule based upon task completion data from the first task status update message.

46. The central management server of claim 45, wherein the second application is further configured to generate a supervisory work schedule for a supervisor at the first site, wherein the supervisory work schedule comprises an inspection work schedule generated based on the plurality of first facility work schedules.

47. The central management server of claim 45, further comprising a sixth application configured to generate a plurality of work status reports using task completion data received from the plurality of facilities, wherein the work status reports comprise a plurality of data sets, each data set associated with a predetermined access identifier.

48. The central management server of claim 47, wherein the predetermined access identifier comprises a predetermined hierarchy identifier.

49. The central management server of claim 48, wherein the predetermined hierarchy identifier comprises a facility location identifier, a regional level identifier or a company level identifier.

50. The central management server of claim 47, wherein the sixth application is further configured to receive a request for a first work status report from a first supervisory user, and, responsive thereto, the sixth application is further configured to determine an access identifier associated with the first supervisory user and based on the determined access identifier, the sixth application being further configured to send a work status report corresponding to the access identifier associated with the supervisory user.

51. The central management server of claim 50, wherein the sixth application is further configured to receive a supervisory task status update message from the supervisory user, the supervisory task status update message including at least one changed status in the work status report provided to the supervisory user.

52. The central management server of claim 51, wherein if the at least one changed status comprises a task unacceptably completed identifier for a task, the sixth application is further configured to determine an user associated with the task and mark an user record with a task unacceptably completed identifier.

53. The central management server of claim 45, further comprising a seventh application configured to track task completion on the first facility using the first work schedule and first task status update message received from the first facility.

54. The central management server of claim 53, wherein the seventh application is further configured to detect that a status for a task indicates that the task is uncompleted and, responsive thereto, reschedule the uncompleted task.

55. The central management server of claim 54 wherein the seventh application is further configured to mark an user record associated with the uncompleted task with an uncompleted task identifier.

56. The central management server of claim 55, wherein the seventh application, responsive to detecting the uncompleted task, is further configured to send an alert message to a supervisor of the first facility.

57. The central management server of claim 45 further comprising an eight application configured to generate a performance statistics record for each user using task status update messages and supervisory task status update messages being received on the central management server from the first facility.

58. The central management server of claim 57, wherein the eight application is further configured to determine if any user requires training based on the performance statistics records, and if so, the eight application is further configured to provide training instruction to each user having low performance statistics, wherein the training instructions are displayed to each user via a corresponding one of the facilities.

59. A work management database system, the system comprising:

a server configured to maintain task information relating to tasks to be scheduled and performed at a plurality of facilities, where the server maintains the task information in a predefined hierarchy based upon a business organization of the plurality of facilities, the server further maintaining data defining an access level of the hierarchy for each one of a plurality of users, where each user is permitted access to the defined access level for the user and any lower levels of the hierarchy, the server being configured to receive an access request with a user identifier corresponding to a requesting user and an access identifier corresponding to a requested level of access to the hierarchy, check whether the user is permitted access to the requested level and, if access is permitted, transmit a reply to the user that includes the task information for the requested level; and a client configured to receive a user input from one of the plurality of users, the user input including the user identifier for the user and the requested level of access and, responsive thereto, transmit to the server the access request with the user identifier and the requested level of access, the client being further configured to receive the reply from the server and, responsive thereto, display the task information for the requested level.

60. The work management database system of claim 59, where:

the server is further configured to include in the reply to the user information describing a portion of the hierarchy to which the user is permitted access; and the client device is further configured to graphically display the portion of the hierarchy to which the user is permitted access.

61. The work management database system of claim 59, where:

the client device is further configured to receive a broadcast message file from a high level user and transmit to the server a broadcast message request from that includes a user identifier for the high level user and the broadcast message file; and the server is further configured to receive the broadcast message request, determine an access level for the high level user based on the user identifier from the broadcast message request, identify from the high level user's access level all the users below the high level user's access level in the hierarchy, and, responsive to a login request from each of the identified users below the high level user's access level in the hierarchy, output the broadcast message to the user sending the login request.

62. The work management database system of claim 59, where:

the client device is further configured to receive a broadcast message file from one user and transmit to the server a broadcast message request that includes the broadcast message file; and the server is further configured to receive the broadcast message request, determine a predetermined set of users to receive the broadcast message and, responsive to a login request from each of the predetermined set of users, output the broadcast message to the user sending the login request.

\* \* \* \* \*